United States Patent
Patel et al.

(10) Patent No.: US 10,257,796 B2
(45) Date of Patent: Apr. 9, 2019

(54) METHOD OF SYNCHRONIZATION WITHIN AN LTE/LTE-A SYSTEM IN UNLICENSED SPECTRUM

(71) Applicant: QUALCOMM Incorporated, San Diego, CA (US)

(72) Inventors: Shimman Arvind Patel, San Diego, CA (US); Tao Luo, San Diego, CA (US); Naga Bhushan, San Diego, CA (US); Peter Gaal, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/789,889

(22) Filed: Oct. 20, 2017

(65) Prior Publication Data
US 2018/0041977 A1 Feb. 8, 2018

Related U.S. Application Data

(62) Division of application No. 14/552,127, filed on Nov. 24, 2014, now Pat. No. 9,801,147.
(Continued)

(51) Int. Cl.
*H04W 56/00* (2009.01)
*H04W 16/14* (2009.01)
(Continued)

(52) U.S. Cl.
CPC ......... *H04W 56/001* (2013.01); *H04W 16/14* (2013.01); *H04W 72/0426* (2013.01);
(Continued)

(58) Field of Classification Search
CPC ........... H04W 56/001; H04W 72/0446; H04W 72/0426; H04W 16/14; H04W 84/042;
(Continued)

(56) References Cited

U.S. PATENT DOCUMENTS

| 5,748,621 A | 5/1998 | Masuda et al. |
| 9,801,147 B2 | 10/2017 | Patel et al. |

(Continued)

FOREIGN PATENT DOCUMENTS

| CN | 1894989 A | 1/2007 |
| CN | 102413582 A | 4/2012 |

(Continued)

OTHER PUBLICATIONS

3GPP, "3rd Generation Partnership Project; Technical Specification Group Radio Access Network; Evolved Universal Terrestrial Radio Access (E-UTRA); TDD Home eNode B (HeNB) Radio Frequency (RF) Requirements Analysis (Release 9)", 3GPP TR 36.922 v9.1.0, Jun. 2010, 73 pgs., XP055170278, 3rd Generation Partnership Project, Sophia-Antipolis Valbonne, France.

(Continued)

*Primary Examiner* — Wayne H Cai
(74) *Attorney, Agent, or Firm* — Holland & Hart LLP

(57) ABSTRACT

Methods, systems, and devices are described for wireless communication. One method may include receiving, at a first base station, at least one clear channel assessment (CCA)-exempt transmission (CET) indicating timing information of at least a second base station over a shared spectrum. A timing of the first base station may be adjusted based on the received timing information of the second base station. Another method of wireless communication may include identifying a CCA slot assigned to a first base station for a frame, which may be associated with time synchronization, of a shared spectrum. A CCA may be performed at the identified CCA slot for the frame. When the CCA is successful, a first timing information of the first base station may be selectively transmitted during the frame. When the CCA is unsuccessful, a second timing information of a second base station may be listened for during the frame.

30 Claims, 49 Drawing Sheets

Related U.S. Application Data

(60) Provisional application No. 61/908,282, filed on Nov. 25, 2013.

(51) Int. Cl.
 *H04W 72/04* (2009.01)
 *H04W 84/04* (2009.01)
 *H04W 88/08* (2009.01)
 *H04W 28/08* (2009.01)
 *H04W 74/08* (2009.01)

(52) U.S. Cl.
 CPC ........ *H04W 72/0446* (2013.01); *H04W 28/08* (2013.01); *H04W 74/0808* (2013.01); *H04W 84/042* (2013.01); *H04W 88/08* (2013.01)

(58) Field of Classification Search
 CPC .. H04W 88/08; H04W 28/08; H04W 74/0808
 See application file for complete search history.

(56) References Cited

U.S. PATENT DOCUMENTS

| | | |
|---|---|---|
| 2003/0016647 A1 | 1/2003 | Margon |
| 2009/0122782 A1 | 5/2009 | Horn et al. |
| 2009/0279529 A1* | 11/2009 | Hamalainen ........ H04W 56/002 370/350 |
| 2010/0014460 A1 | 1/2010 | Shin et al. |
| 2010/0260168 A1 | 10/2010 | Gheorghiu et al. |
| 2011/0312330 A1 | 12/2011 | Sadek et al. |
| 2012/0155424 A1 | 6/2012 | Kim et al. |
| 2013/0242905 A1 | 9/2013 | Rasband et al. |
| 2014/0073372 A1 | 3/2014 | Lee et al. |

FOREIGN PATENT DOCUMENTS

| | | | |
|---|---|---|---|
| JP | 2007515825 A | 6/2007 | |
| JP | 2007524268 A | 8/2007 | |
| WO | WO-2004114573 A2 | 12/2004 | |
| WO | WO-2005025135 A1 | 3/2005 | |
| WO | WO-2012109195 A2 | 8/2012 | |

OTHER PUBLICATIONS

ISA/EP, International Search Report and Written Opinion of the International Searching Authority, Int'l Application No. PCT/US2014/067245, dated Jun. 1, 2015, European Patent Office, Rijswijk, NL, 17 pgs.

ISA/EPO, Partial International Search Report of the International Searching Authority, Int'l. App. No. PCT/US2014/067245, dated Feb. 26, 2015, European Patent Office, Rijswijk, NL, 6 pgs.

* cited by examiner

METHOD OF SYNCHRONIZATION WITHIN AN LTE/LTE-A SYSTEM IN UNLICENSED SPECTRUM

CROSS REFERENCES

The present Application for Patent is a Divisional of U.S. patent application Ser. No. 14/552,127 by Patel et al, entitled "Method of Synchronization Within an LTE/LTE-A System in Unlicensed Spectrum," filed Nov. 24, 2014 which claims priority to U.S. Provisional Patent Application No. 61/908,282 by Patel et al., entitled "Method Of Synchronization Within An LTE/LTE-A System In Unlicensed Spectrum," filed Nov. 25, 2013, assigned to the assignee hereof, and expressly incorporated by reference herein.

BACKGROUND

Field of Disclosure

Wireless communications networks are widely deployed to provide various communication services such as voice, video, packet data, messaging, broadcast, and the like. These wireless networks may be multiple-access networks capable of supporting multiple users by sharing the available network resources.

Description of Related Art

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points or access points employing different access technologies. An access point may communicate with a UE via downlink and uplink. The downlink (or forward link) refers to the communications link from the access point to the UE, and the uplink (or reverse link) refers to the communications link from the UE to the access point.

As cellular networks become more congested, operators are beginning to look at ways to increase capacity, including the use of unlicensed spectrum to transmit cellular communications. In such approaches, timing and frequency synchronization among network devices associated with the same operator, as well as across different operators using the same unlicensed spectrum, may be useful. Traditional methods for network synchronization, however, may be challenging to implement in the context of unlicensed spectrum. For example, in a listen-before-talk (LBT) access scheme for unlicensed spectrum, a base station may be scheduled to transmit data during a time period that collides with the transmission of timing and frequency synchronization information by a neighboring device. Such collisions may prevent the base station from listening to the timing and frequency information from the neighboring device.

SUMMARY

The described features generally relate to the transmission or reception of timing information or frequency information between base stations, and to the use of such timing information or frequency information in making timing adjustments or frequency adjustments at a base station. The disclosed methods, systems, or devices may in some cases enable a base station to synchronize a timing or frequency with the timing or frequency of another base station, or with a network as a whole.

Because of the utility associated with synchronizing cellular devices desiring to communicate over the shared spectrum, the disclosed techniques provide for the transmission of timing information or frequency information across different stratums of base stations. The timing information or frequency information may be included in or follow Clear Channel Assessment (CCA)-Exempt Transmissions (CETs) or CCA slots. Additionally, recursive techniques for frequency synchronization across different stratums of base stations are provided.

A base station may adjust its timing or frequency based on timing or frequency information received from one or multiple neighboring base stations. In some cases, base stations may be associated with timing stratums that indicate the robustness or trustworthiness of their timing information. Base stations associated with lower timing stratums may have more robust timing information (e.g., a GPS source may be associated with the lowest timing stratum). Some of the disclosed methods, systems, and devices take timing stratum information into account when making timing or frequency adjustments to a base station's timing or frequency. The disclosed methods, systems, and devices may also take into account other information, such as the line quality(ies) between a base station and its neighboring base station(s).

In some examples, a method of wireless communication includes receiving, at a first base station, at least one clear channel assessment (CCA)-exempt transmission (CET) indicating timing information of at least a second base station over a shared spectrum, and adjusting a timing of the first base station based on the received timing information of at least the second base station.

In some examples, an apparatus for wireless communication includes a processor and memory coupled to the processor. The processor may be configured to receive, at a first base station, at least one clear channel assessment (CCA)-exempt transmission (CET) indicating timing information of at least a second base station over a shared spectrum, and adjust a timing of the first base station based on the received timing information of at least the second base station.

In some examples, a method of wireless communication includes identifying a CCA slot assigned to a first base station for a frame of a shared spectrum, the frame may be associated with time synchronization, performing a CCA at the identified CCA slot for the frame, selectively transmitting a first timing information of the first base station during the frame when the CCA is successful, and listening for a second timing information of a second base station during the frame when the CCA is unsuccessful.

In some examples, an apparatus for wireless communication includes a processor and memory coupled to the processor. The processor may be configured to identify a CCA slot assigned to a first base station for a frame of a shared spectrum, the frame may be associated with time synchronization, perform a CCA at the identified CCA slot for the frame, selectively transmit a first timing information of the first base station during the frame when the CCA is successful, and listen for a second timing information of a second base station during the frame when the CCA is unsuccessful.

Various examples of the above-described methods and apparatus may include the features of, or processor configured for identifying one of the public land mobile network (PLMN)-specific portions associated with the PLMN of the second base station, wherein receiving the at least one CET comprises listening to the identified PLMN-specific portion associated with the PLMN of the second base station for the timing information of the second base station. In some cases, each of the at least one CET is received in one of a plurality of PLMN-specific portions of a CET period, each of the PLMN-specific portions assigned to one of a plurality of PLMNs, the plurality of PLMNs may include a PLMN associated with the second base station. In some examples, the first base station and the second base station are members of different PLMNs associated with different operators and the PLMNs are time synchronized with each other. The at least one CET may be received during a CET period of a plurality of periodically scheduled CET periods, and wherein each of the plurality of periodically scheduled CET periods include a plurality of PLMN-specific regions and a common transmission region. In some cases, common transmission regions of different CET periods are assigned to different PLMNs on a rotating basis, the different PLMNs may include a PLMN associated with the second base station.

In some cases, the at least one CET may include a first CET indicating the timing information of the second base station over the shared spectrum and a second CET indicating timing information of a third base station over the shared spectrum, and the first CET and the second CET may be received concurrently. In some cases, the at least one CET further indicates timing information of a third base station over the shared spectrum, and various examples of the above-described methods and apparatus may include the features of, or processor configured for adjusting the timing of the first base station based on the timing information of the third base station.

Various examples of the above-described methods and apparatus may include the features of, or processor configured for gating, based on a timing stratum of the first base station, a CCA frequency of the first base station for a plurality of frames associated with timing synchronization. In some cases, a periodicity of the gating is based on the timing stratum of the first base station.

Various examples of the above-described methods and apparatus may include the features of, or processor configured for determining that the CCA is unsuccessful, and receiving, at the first base station, a channel usage beacon signal from the second base station for the frame.

Various examples of the above-described methods and apparatus may include the features of, or processor configured for receiving the second timing information from the second base station during the frame, and adjusting a timing of the first base station based on the second timing information received from the second base station during the frame.

Various examples of the above-described methods and apparatus may include the features of, or processor configured for adjusting the timing of the first base station based on a third timing information received from a third base station.

Various examples of the above-described methods and apparatus may include the features of, or processor configured for determining that the CCA is successful, wherein the first timing information is transmitted during at least one reference signal resource element of the frame.

Various examples of the above-described methods and apparatus may include the features of, or processor configured for transmitting data to at least one user equipment (UE) during the frame, wherein the data is transmitted to the UE concurrent with the transmission of the first timing information.

Further scope of the applicability of the described methods and devices will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
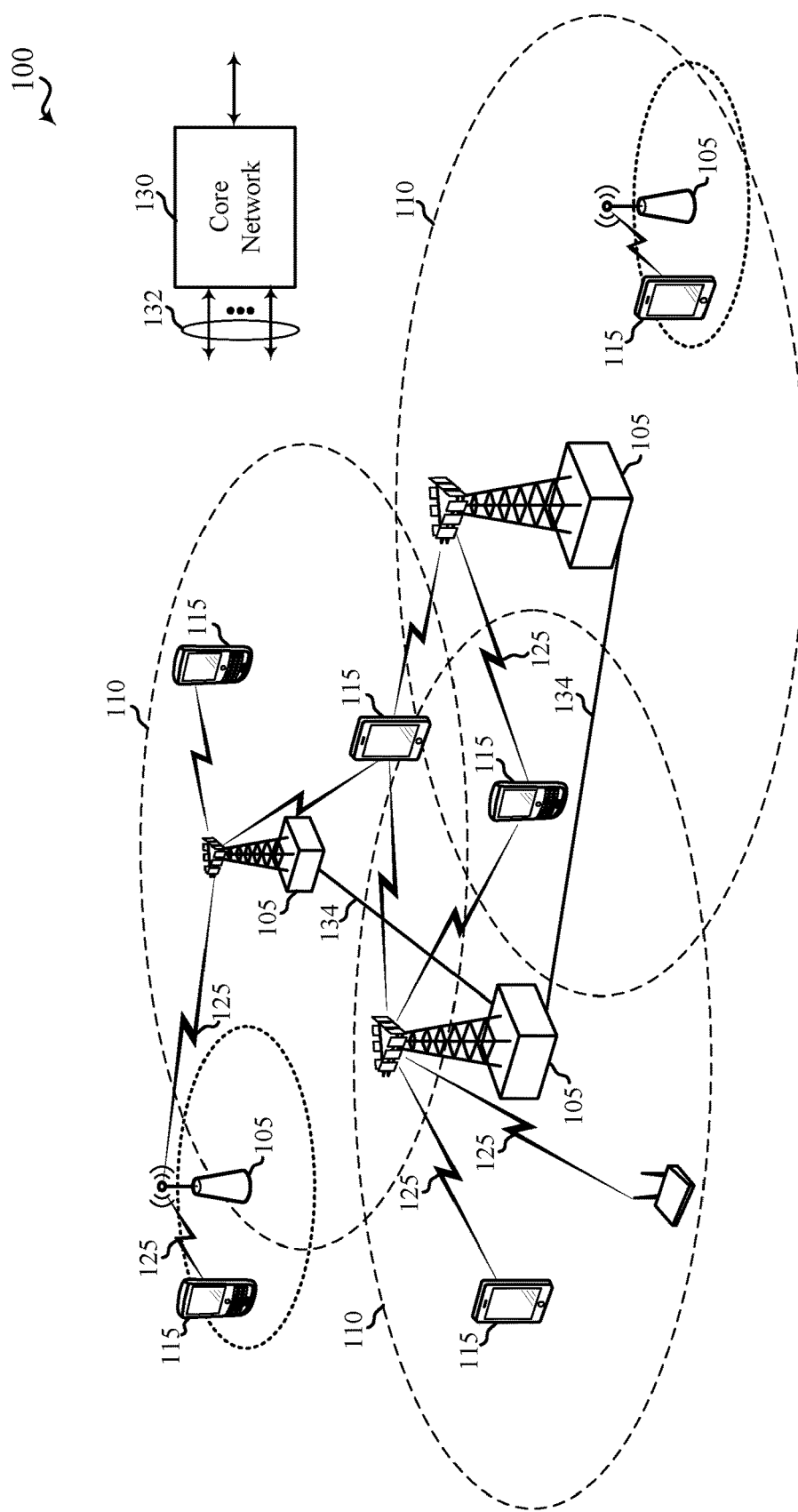
FIG. 1 shows a block diagram of a wireless communication system, in accordance with various aspects of the present disclosure.

Methods, systems, and devices are described for synchronizing base stations desiring to transmit over a shared radio frequency spectrum. Because cellular devices desiring to communicate over the shared spectrum may need to perform timing or frequency synchronization, the disclosed techniques provide for the transmission of timing information or frequency information across different stratums of base stations. The timing information or frequency information may be included in or follow Clear Channel Assessment (CCA)-Exempt Transmissions (CETs) or CCA slots. Additionally, recursive techniques for frequency synchronization across different stratums of base stations are provided.

A base station may adjust its timing or frequency based on timing or frequency information received from one or multiple neighboring base stations. In some cases, base stations may be associated with timing stratums that indicate the robustness or trustworthiness of their timing information. Base stations associated with lower timing stratums may have more robust timing information (e.g., a GPS source may be associated with the lowest timing stratum). Some of the disclosed methods, systems, and devices take timing stratum information into account when making timing or frequency adjustments to a base station's timing or frequency. The disclosed methods, systems, and devices may also take into account other information, such as the line quality(ies) between a base station and its neighboring base station(s).

In some cases, the methods, systems, and devices described herein may provide operators of cellular networks (e.g., operators of Long Term Evolution (LTE) or LTE-Advanced (LTE-A) communications networks) with better ways to synchronize the base stations that desire to use a shared unlicensed spectrum (e.g., a WLAN spectrum typically used for WiFi communications).

The techniques described herein are not limited to LTE, and may also be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows a block diagram of a wireless communications system 100, in accordance with various aspects of the present disclosure. The wireless communications system 100 includes a plurality of base stations 105 (e.g., eNBs, WLAN access points, or other access points), a number of user equipments (UEs) 115, and a core network 130. Some of the base stations 105 may communicate with the UEs 115 under the control of a base station controller (not shown), which may be part of the core network 130 or certain base stations 105 in various examples. Some of the base stations 105 may communicate control information or user data with the core network 130 through backhaul 132. In some examples, some of the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more access point antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point may be divided into sectors making up only a portion of the coverage area (not shown). The wireless communications system 100 may include base stations 105 of different types (e.g., macro, micro, or pico base stations). The base stations 105 may also utilize different radio technologies, such as cellular or WLAN radio access technologies. The base stations 105 may be associated with the same or different access networks or operator deployments. The coverage areas of different base stations 105, including the coverage areas of the same or different types of base stations 105, utilizing the same or different radio technologies, or belonging to the same or different access networks, may overlap.

In some examples, the wireless communications system 100 may include an LTE/LTE-A communications system (or network), which LTE/LTE-A communications system may support one or more modes of operation or deployment in unlicensed spectrum.

In other examples, the wireless communications system 100 may support wireless communication using access technology different from LTE/LTE-A. In LTE/LTE-A communications systems, the term evolved NodeB or eNB may be generally used to describe of the base stations 105.

The wireless communications system 100 may be a Heterogeneous LTE/LTE-A network in which different types of eNBs provide coverage for various geographical regions. For example, each eNB may provide communication coverage for a macro cell, a pico cell, a femto cell, or other types of cell. Small cells such as pico cells, femto cells, or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) or via backhaul 132 (e.g., through core network 130). The wireless communications system 100 may support synchronous or asynchronous operation. For synchronous operation, the base stations may have similar frame or gating timing, and transmissions from different base stations may be approximately aligned in time. For asynchronous operation, the base stations may have different frame or gating timing, and transmissions from different base stations may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communications system 100 may include uplinks for carrying uplink (UL) transmissions (e.g., from a UE 115 to a base station 105) or downlinks for carrying downlink (DL) transmissions (e.g., from a base station 105 to a UE 115). The UL transmissions may also be called reverse link transmissions, while the DL transmissions may also be called forward link transmissions. The downlink transmissions may be made using a licensed spectrum, an unlicensed spectrum, or both. Similarly, the uplink transmissions may be made using a licensed spectrum, an unlicensed spectrum, or both.

In some examples of the wireless communications system 100, various deployment scenarios for LTE/LTE-A in unlicensed spectrum may be supported, including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 (e.g., eNBs) as well as UEs 115 may support one or more of these or similar modes of operation. OFDMA communications signals may be used in the communications links 125 for LTE downlink transmissions in an unlicensed or a licensed spectrum, while SC-FDMA communications signals may be used in the communications links 125 for LTE uplink transmissions in an unlicensed or a licensed spectrum.

Figure 2A:
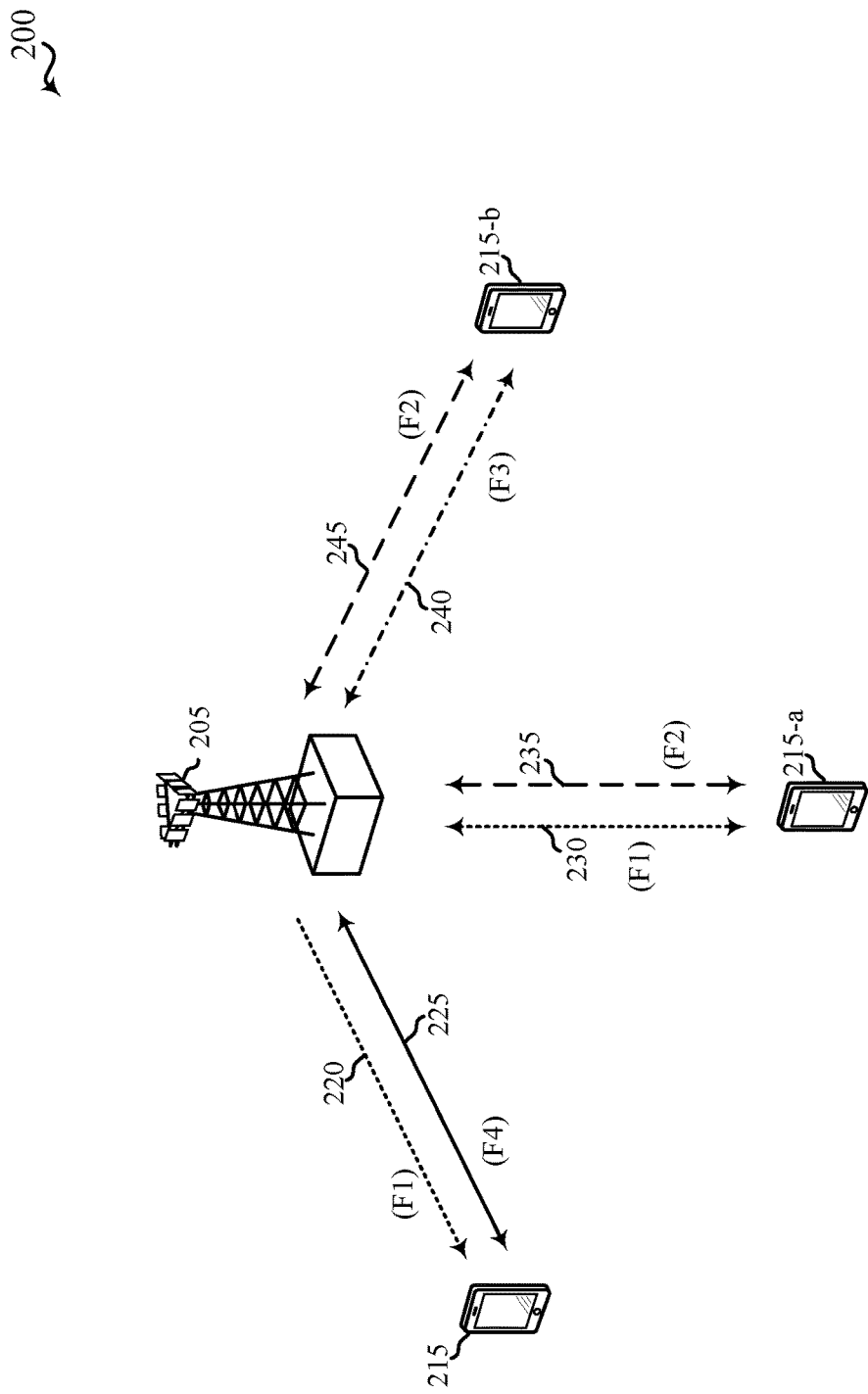
FIG. 2A shows a diagram that illustrates examples of deployment scenarios for using LTE in an unlicensed spectrum, in accordance with various aspects of the present disclosure.

FIG. 2A shows a diagram that illustrates examples of deployment scenarios for using LTE in an unlicensed spectrum, in accordance with various aspects of the present disclosure. In one example, FIG. 2A illustrates a wireless communications system 200 illustrating examples of a supplemental downlink mode and a carrier aggregation mode for an LTE network that supports deployment in unlicensed spectrum. The wireless communications system 200 may be an example of portions of the wireless communications system 100 of FIG. 1. Moreover, the base station 205 may be an example of the base stations 105 of FIG. 1, while the UEs 215, 215-a, and 215-b may be examples of the UEs 115 of FIG. 1.

In the example of a supplemental downlink mode in the wireless communications system 200, the base station 205 may transmit OFDMA communications signals to a UE 215 using a downlink 220. The downlink 220 may be associated with a frequency F1 in an unlicensed spectrum. The base station 205 may transmit OFDMA communications signals to the same UE 215 using a bidirectional link 225 and may receive SC-FDMA communications signals from that UE 215 using the bidirectional link 225. The bidirectional link 225 may be associated with a frequency F4 in a licensed spectrum. The downlink 220 in the unlicensed spectrum and the bidirectional link 225 in the licensed spectrum may operate concurrently. The downlink 220 may provide a downlink capacity offload for the base station 205. In some examples, the downlink 220 may be used for unicast services (e.g., addressed to one UE) services or for multicast services (e.g., addressed to several UEs). This scenario may occur with any service provider (e.g., traditional mobile network operator (MNO)) that uses a licensed spectrum and needs to relieve some of the traffic or signaling congestion.

In one example of a carrier aggregation mode in the wireless communications system 200, the base station 205 may transmit OFDMA communications signals to a UE 215-*a* using a bidirectional link 230 and may receive SC-FDMA communications signals from the same UE 215-*a* using the bidirectional link 230. The bidirectional link 230 may be associated with the frequency F1 in the unlicensed spectrum. The base station 205 may also transmit OFDMA communications signals to the same UE 215-*a* using a bidirectional link 235 and may receive SC-FDMA communications signals from the same UE 215-*a* using the bidirectional link 235. The bidirectional link 235 may be associated with a frequency F2 in a licensed spectrum. The bidirectional link 230 may provide a downlink and uplink capacity offload for the base station 205. Like the supplemental downlink described above, this scenario may occur with any service provider (e.g., MNO) that uses a licensed spectrum and needs to relieve some of the traffic or signaling congestion.

In another example of a carrier aggregation mode in the wireless communications system 200, the base station 205 may transmit OFDMA communications signals to a UE 215-*b* using a bidirectional link 240 and may receive SC-FDMA communications signals from the same UE 215-*b* using the bidirectional link 240. The bidirectional link 240 may be associated with a frequency F3 in an unlicensed spectrum. The base station 205 may also transmit OFDMA communications signals to the same UE 215-*b* using a bidirectional link 245 and may receive SC-FDMA communications signals from the same UE 215-*b* using the bidirectional link 245. The bidirectional link 245 may be associated with the frequency F2 in the licensed spectrum. The bidirectional link 240 may provide a downlink and uplink capacity offload for the base station 205. This example and those provided above are presented for illustrative purposes and there may be other similar modes of operation or deployment scenarios that combine LTE/LTE-A in licensed and unlicensed spectrum for capacity offload.

As described above, the typical service provider that may benefit from the capacity offload offered by using LTE/LTE-A in unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and a secondary component carrier (SCC) on the unlicensed spectrum.

In the carrier aggregation mode, data and control may generally be communicated in the licensed spectrum (e.g., bidirectional links 225, 235, and 245) while data may generally be communicated in the unlicensed spectrum (e.g., bidirectional links 230 and 240). The carrier aggregation mechanisms supported when using unlicensed spectrum may fall under a hybrid frequency division duplexing-time division duplexing (FDD-TDD) carrier aggregation or a TDD-TDD carrier aggregation with different symmetry across component carriers.

Figure 2B:
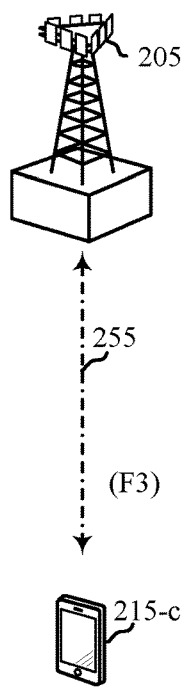
FIG. 2B shows a wireless communication system that illustrates an example of a standalone mode for LTE/LTE-A in unlicensed spectrum, in accordance with various aspects of the present disclosure.

FIG. 2B shows a wireless communication system 250 that illustrates an example of a standalone mode for LTE/LTE-A in unlicensed spectrum, in accordance with various aspects of the present disclosure. The wireless communication system 250 may be an example of portions of the wireless communications system 100 of FIG. 1 or 200 of FIG. 2A. Moreover, the base station 205 may be an example of the base stations 105 or 205 described with reference to FIG. 1 or 2A, while the UE 215-*c* may be an example of the UEs 115 or 215 of FIG. 1 or 2A.

In the example of a standalone mode in the wireless communication system 250, the base station 205 may transmit OFDMA communications signals to the UE 215-*c* using a bidirectional link 255 and may receive SC-FDMA communications signals from the UE 215-*c* using the bidirectional link 255. The bidirectional link 255 may be associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event host, hotel, enterprise, or large corporation that does not have licensed spectrum.

In some examples, a transmitting device such as a base station 105, 205 described with reference to FIG. 1, 2A, or 2B, or a UE 115 or 215 described with reference to FIG. 1, 2A, or 2B, may use a gating interval to gain access to a channel of the shared spectrum (e.g., to a physical channel of the licensed or unlicensed spectrum). The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting device needs to perform a Clear Channel Assessment (CCA). The outcome of the CCA may indicate to the transmitting device whether a channel of the shared unlicensed spectrum is available or in use. When the CCA indicates that the channel is available (e.g., "clear" for use), the gating interval may allow the transmitting device to use the channel—typically for a predefined transmission interval. When the CCA indicates that the channel is not available (e.g., in use or reserved), the gating interval may prevent the transmitting device from using the channel during the transmission interval.

In some cases, it may be useful for a transmitting device to generate a gating interval on a periodic basis and synchronize at least one boundary of the gating interval with at least one boundary of a periodic frame structure. For example, it may be useful to generate a periodic gating interval for a cellular downlink in a shared spectrum, and to synchronize at least one boundary of the periodic gating interval with at least one boundary of a periodic frame structure (e.g., LTE/LTE-A radio frame) associated with the cellular downlink. Examples of such synchronization are shown in FIG. 3.

Figure 3:
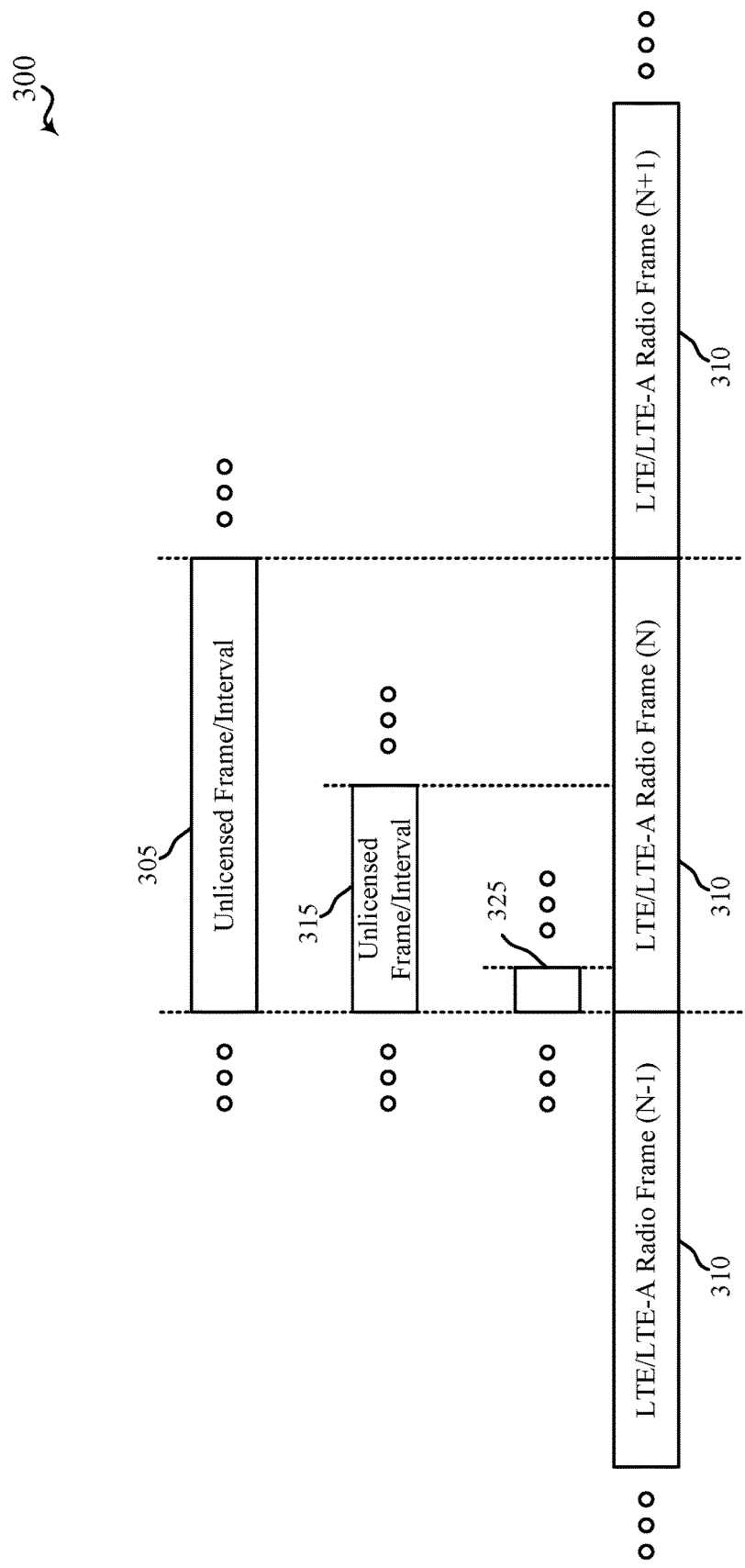
FIG. 3 shows examples of an unlicensed frame/interval for a cellular downlink in an unlicensed spectrum, in accordance with various aspects of the present disclosure.

FIG. 3 shows examples 300 of an unlicensed frame/interval 305, 315, or 325 for a cellular downlink in an unlicensed spectrum, in accordance with various aspects of the present disclosure. The unlicensed frame/interval 305, 315, or 325 may be used as a periodic gating interval by an eNB that supports transmissions over the unlicensed spectrum. Examples of such an eNB may include the base stations 105, 205 described with reference to FIG. 1, 2A, or 2B. The unlicensed frame/interval 305, 315, or 325 may be used with the wireless communications system 100, 200, or 250 described with reference to FIG. 1, 2A, or 2B.

By way of example, the duration of the unlicensed frame/interval 305 is shown to be equal to (or approximately equal to) a duration of an LTE/LTE-A radio frame 310 of a periodic frame structure associated with a cellular downlink. In some examples, "approximately equal" means the duration of the unlicensed frame/interval 305 is within a cyclic prefix (CP) duration of the duration of the periodic frame structure.

At least one boundary of the unlicensed frame/interval 305 may be synchronized with at least one boundary of the periodic frame structure that includes the LTE/LTE-A radio frames N−1 to N+1. In some cases, the unlicensed frame/interval 305 may have boundaries that are aligned with the frame boundaries of the periodic frame structure. In other cases, the unlicensed frame/interval 305 may have boundaries that are synchronized with, but offset from, the frame boundaries of the periodic frame structure. For example, the boundaries of the unlicensed frame/interval 305 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 310 may have a duration of ten milliseconds, for example, and the unlicensed frame/interval 305 may also have a duration of ten milliseconds. In these cases, the boundaries of the unlicensed frame/interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the duration of the unlicensed frames/intervals 315 and 325 are shown to be sub-multiples of (or approximate sub-multiples of) the duration of the periodic frame structure associated with the cellular downlink. In some examples, an "approximate sub-multiple of" means the duration of the unlicensed frame/interval 315, 325 is within a cyclic prefix (CP) duration of the duration of a sub-multiple of (e.g., half or one-tenth) the periodic frame structure. For example, the unlicensed frame/interval 315 may have a duration of five milliseconds and the unlicensed frame/interval 325 may have a duration of 1 or 2 milliseconds.

Figure 4:
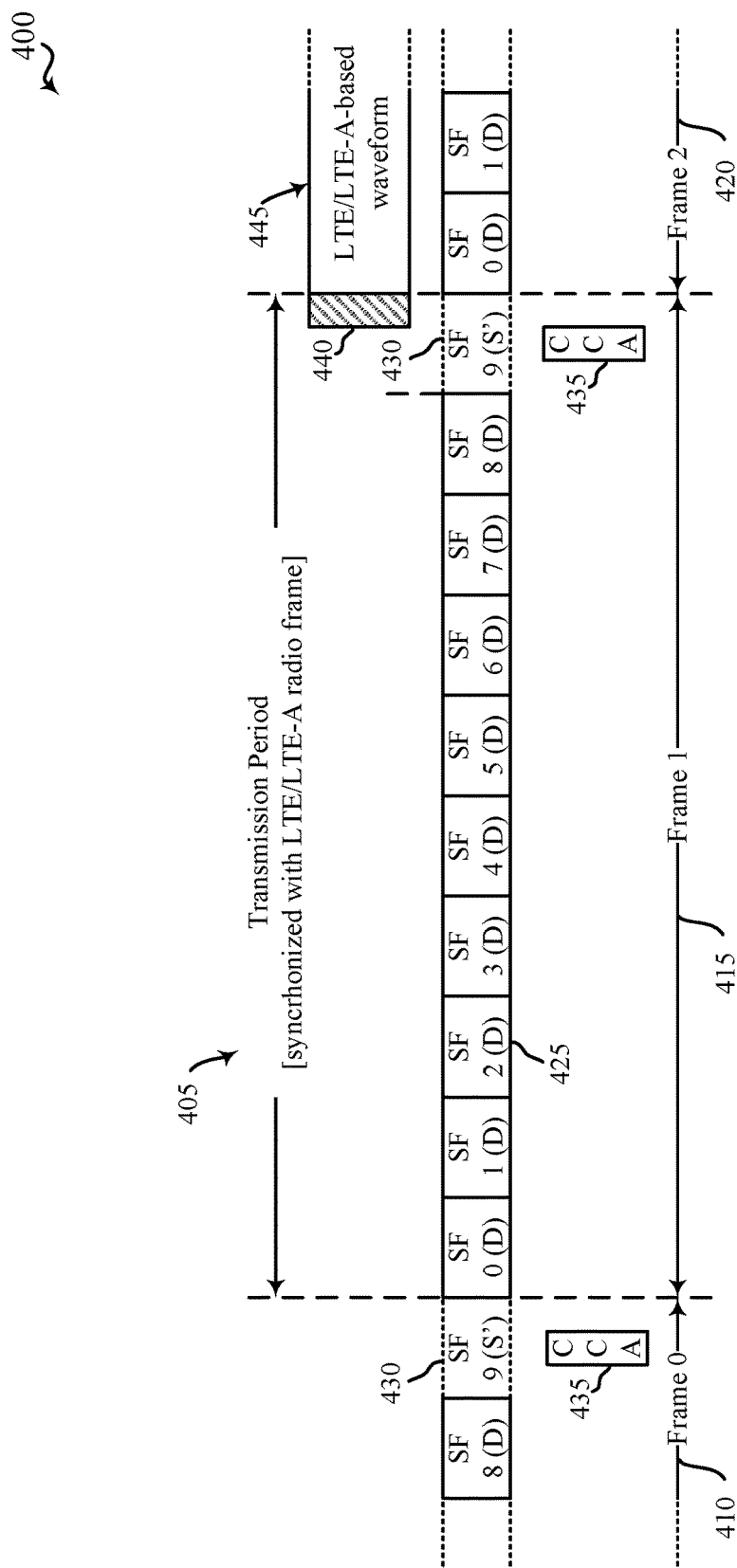
FIG. 4 illustrates an example of a periodic gating interval for a cellular downlink in an unlicensed spectrum, in accordance with various aspects of the present disclosure.

FIG. 4 illustrates an example 400 of a periodic gating interval 405 for a cellular downlink in an unlicensed spectrum. The periodic gating interval 405 may be used by a base station that supports communication in a shared spectrum. Examples of such a base station include the base stations 105 and 205 described with reference to FIG. 1, 2A, or 2B. The periodic gating interval 405 may be used with the wireless communications system 100, 200, or 250 of FIG. 1, 2A, and or 2B.

By way of example, the duration of the periodic gating interval 405 is shown to be equal to (or approximately equal to) the duration of a periodic frame structure 410, 415, 420 associated with the cellular downlink. The boundaries of the periodic gating interval 405 may be synchronized with (e.g., aligned with) the boundaries of the periodic frame structure 410, 415, 420.

The periodic frame structure 410, 415, 420 may include an LTE/LTE-A radio frame 415 having ten subframes (e.g., SF0, SF1, ... , SF9). Subframes SF0 through SF8 may be downlink (D) subframes 425, and subframe SF9 may be a special (S') subframe 430. The D subframes 425 may collectively define a channel occupancy time of the LTE radio frame, and at least part of the S' subframe 430 may define a channel idle time. Under the current LTE/LTE-A standards, an LTE/LTE-A radio frame may have a maximum channel occupancy time (ON time) between one and 9.5 milliseconds, and a minimum channel idle time (OFF time) of five percent of the channel occupancy time (e.g., a minimum of 50 microseconds). To ensure compliance with the LTE/LTE-A standards, the periodic gating interval 405 may abide by these requirements of the LTE/LTE-A standard by providing a 0.5 millisecond guard period (i.e., OFF time) as part of the S' subframe 430.

Because the S' subframe 430 has a duration of one millisecond, it may include one or more CCA slots 435 in which the transmitting devices contending for a particular physical channel of an unlicensed spectrum may perform their CCAs. When a transmitting device's CCA indicates the physical channel is available, but the device's CCA is completed before the end of the periodic gating interval 405, the device may transmit one or more signals 440 to reserve the channel until the end of the periodic gating interval 405. The one or more signals 440 may in some cases include a Channel Usage Pilot Signal (CUPS), a Channel Usage Beacon Signal (CUBS), or a cell-specific reference signal (CRS). As used in the present disclosure and the appended claims, the terms "Channel Usage Pilot Signal (CUPS)" and "Channel Usage Beacon Signal (CUBS)" are interchangeable. CUPS or a CRS may be used for both channel synchronization and channel reservation. That is, a device that performs a CCA for the channel after another device begins to transmit CUPS on the channel may detect the energy of the CUPS and determine that the channel is currently unavailable.

Following a transmitting device's successful completion of CCA for a physical channel or the transmission of CUPS over a physical channel, the transmitting device may use the physical channel for up to a predetermined period of time (e.g., one LTE/LTE-A radio frame) to transmit a waveform (e.g., an LTE-based waveform 445 associated with a physical carrier).

Figure 5:
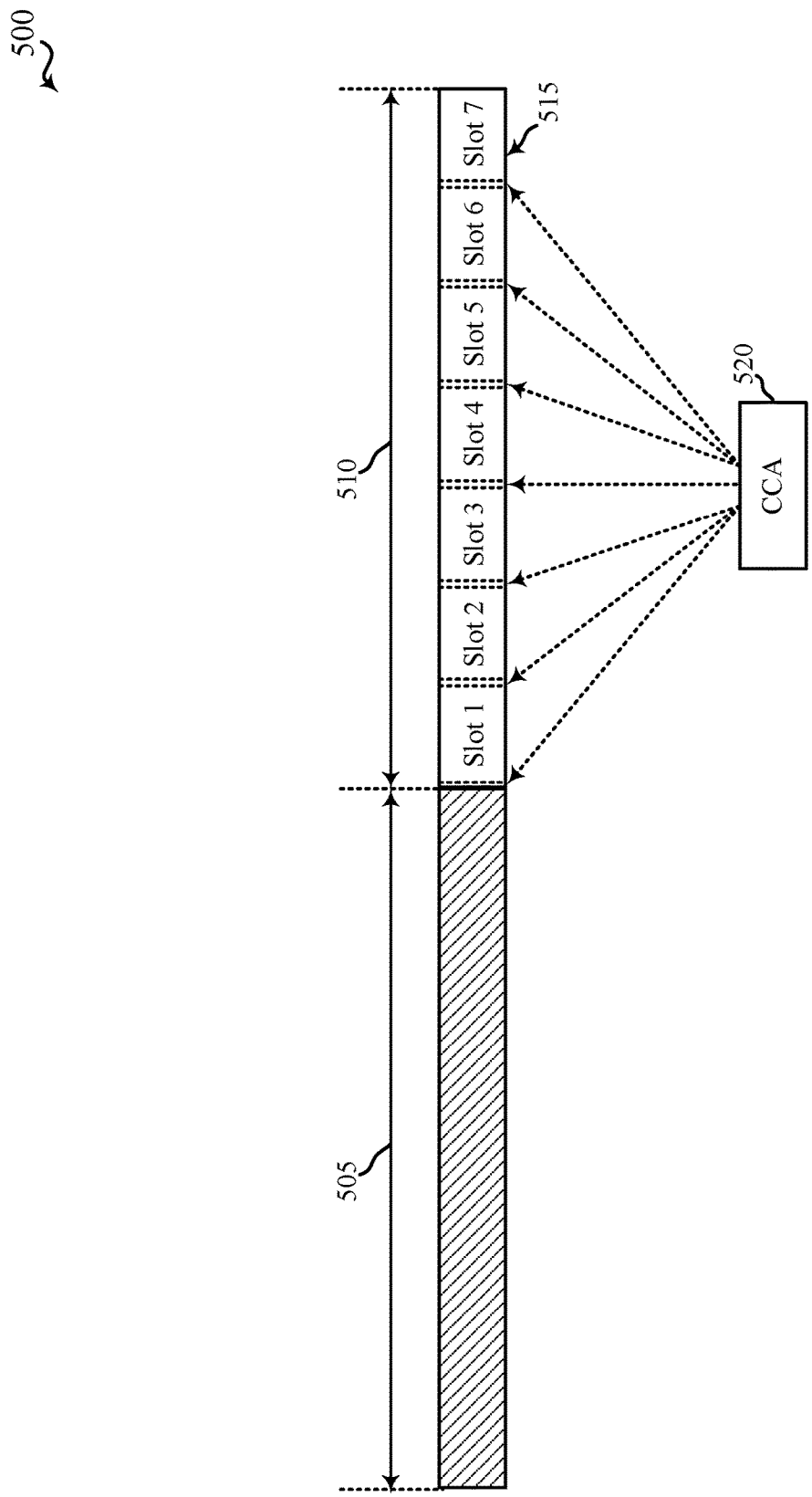
FIG. 5 illustrates how a contention-based protocol such as LBT may be implemented within an S' subframe of a gating interval, in accordance with various aspects of the present disclosure.

FIG. 5 illustrates how a contention-based protocol such as LBT may be implemented within an S' subframe 500 of a gating interval, such as an S' subframe of the ten millisecond periodic gating interval 405 described with reference to FIG. 4. The contention-based protocol may be used with, for example, the wireless communications system 100, 200, or 250, base stations 105 or 205, or UEs 115 or 215 described with reference to FIG. 1, 2A, or 2B.

The S' subframe 500 may have a guard period (or silent period) 505 and a CCA period 510. By way of example, each of the guard period 505 and the CCA period 510 may have a duration of 0.5 milliseconds and include seven OFDM symbol positions 515 (labeled in FIG. 5 as Slots 1 through 7). In some cases, a base station may select one or more of the OFDM symbol positions 515 to perform a CCA 520 for a subsequent transmission interval of an unlicensed spectrum, to determine whether the transmission interval of the unlicensed spectrum is available for a transmission during the transmission interval. In some cases, different ones of the OFDM symbol positions 515 may be pseudo-randomly identified or selected by a base station in different occurrences of the S' subframe 500 (i.e., in different S' subframes used to perform CCA 520 for different transmission intervals of the unlicensed spectrum). The pseudo-random identification or selection of OFDM symbol positions may be controlled using a hopping sequence.

The base stations of a wireless communications system may be operated by the same or different operators. In some examples, the base stations operated by different operators (e.g., the base stations belonging to different Public Land Mobile Networks (PLMNs) may select different ones of the OFDM symbol positions 515 in a particular S' subframe 500, thereby avoiding CCA collisions between different operators. If the pseudo-random selection mechanisms of different operators are coordinated, OFDM symbol positions 515 may be pseudo-randomly selected by a plurality of different operators such that the base stations of the different operators each have an equal opportunity to perform CCA 520 in the earliest OFDM symbol position (i.e., Slot 1) for certain transmission intervals. Thus, over time, the base stations of the different operators may each have an opportunity to perform CCA 520 first and gain access to a transmission interval of the unlicensed spectrum regardless of the needs of eNBs of other operators. After a successful CCA 520, a base station may transmit CUPS to prevent other devices or operators from using one or more physical channels of the transmission interval of the unlicensed spectrum.

Figure 6:
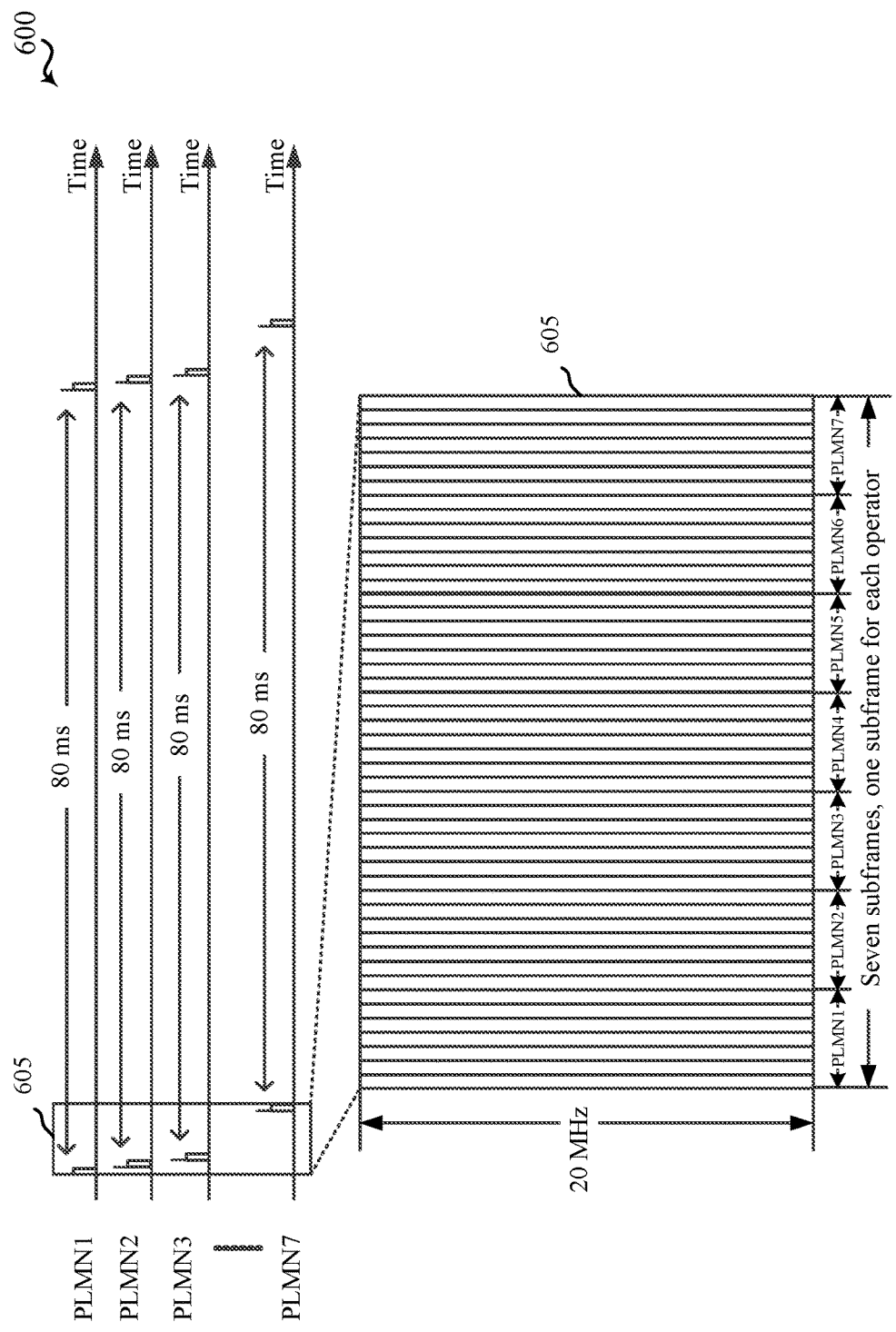
FIG. 6 shows an example of CCA Exempt Transmissions (CETs), in accordance with various aspects of the present disclosure.

FIG. 6 shows an example 600 of CCA Exempt Transmissions (CETs), in accordance with various aspects of the present disclosure. As shown, an allocation of resources for CETs may be made, for example, once every eighty milliseconds (80 ms). Each of a number of operators in the unlicensed spectrum (e.g., different PLMNs) may be provided a separate subframe for transmitting CETs. By way of example, FIG. 6 shows adjacent CET subframes for seven different operators (e.g., operators PLMN1, PLMN2, . . . , PLMN7). Such a structure may be applicable to both downlink and uplink subframes.

In a wireless communications spectrum shared by cellular and WiFi devices, the WiFi devices operate in an ad hoc manner and do not provide timing or frequency references to which cellular devices may sync. Methods and devices that enable cellular devices to operate in a synchronous manner over such a network may therefore be desirable.

In the context of an LTE network, 3GPP TR 36.922 V9.1.0 (2010-07) describes a "network listening" technique for synchronizing a first Home eNB (HeNB) to a second HeNB or an eNB. The network listening technique introduces the concept of a "synchronization stratum," which is defined as the smallest number of hops between a particular HeNB and a GPS source (e.g., a GPS-synchronized HeNB or eNB).

Figure 7:
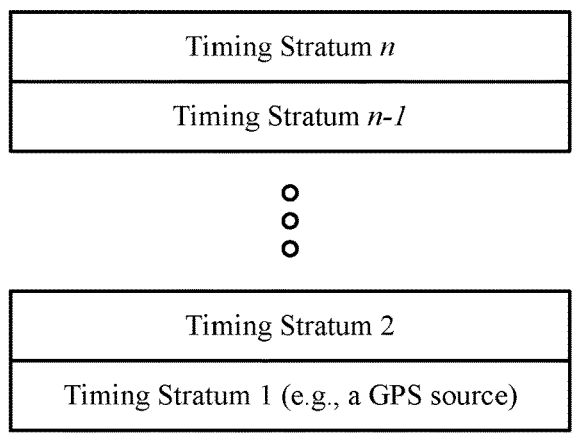
FIG. 7 illustrates an example of a synchronization stratum for a device operating in Timing Stratum n, in accordance with various aspects of the present disclosure.

FIG. 7 illustrates an example of a synchronization stratum 700 for a device operating in Timing Stratum n. The device operating in the Timing Stratum n may obtain (e.g., track) timing information from a device operating in Timing Stratum n−1 and so on. A device operating in Timing Stratum 2 may obtain timing information from a device operating in Timing Stratum 1. The device operating in Timing Stratum 1 may be a GPS source or other trusted synchronization source. When devices in a lower stratum are scheduled to transmit and receive timing information, devices in a higher stratum (e.g., a next higher stratum) may listen for timing information transmitted by the devices of a lower stratum (e.g., a next lower stratum). In some cases, a listening device may gate its transmissions when listening for timing information, to mitigate interference with its receipt of timing information.

As described in 3GPP TR 36.922, the timing information of a device may be obtained from one or more signals transmitted by the device, including, for example, a Common Reference Signal (CRS) transmitted by the device. The one or more signals carrying the timing information may in some cases be transmitted in a non-MBSFN part of a Multicast-Broadcast Single-Frequency Network (MBSFN) subframe or a guard period of a special subframe. In some cases, information indicating a correspondence between timing stratums and the timings of timing synchronization signals may be provided to all network devices (e.g., in messages defined by RAN3), such that a device's timing synchronization signals (e.g., CRS) may convey the timing stratum of the device.

Figure 9:
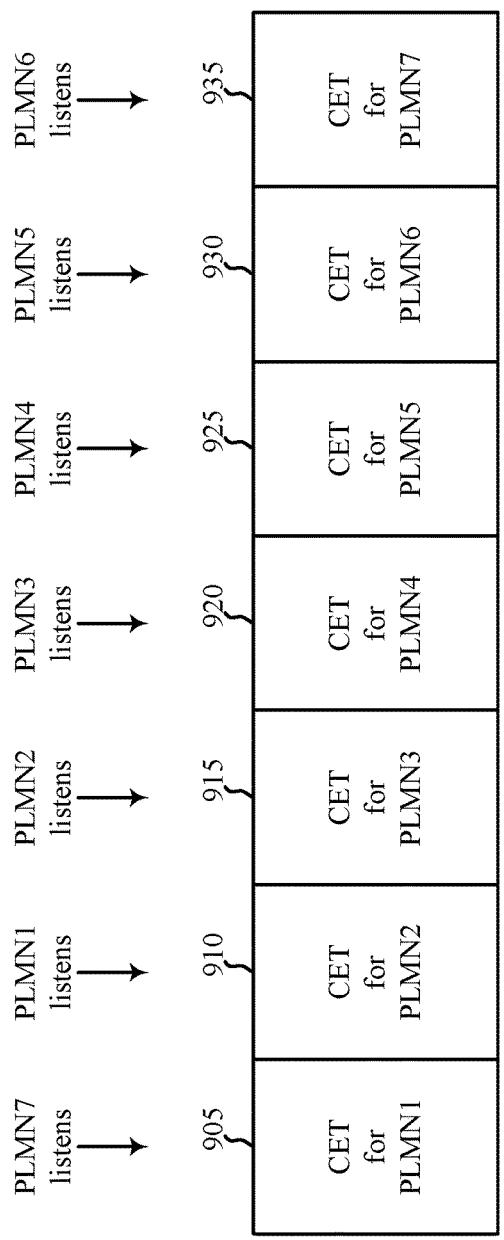
FIG. 9 illustrates an example of inter-PLMN timing adjustments, in accordance with various aspects of the present disclosure.
Figure 10:
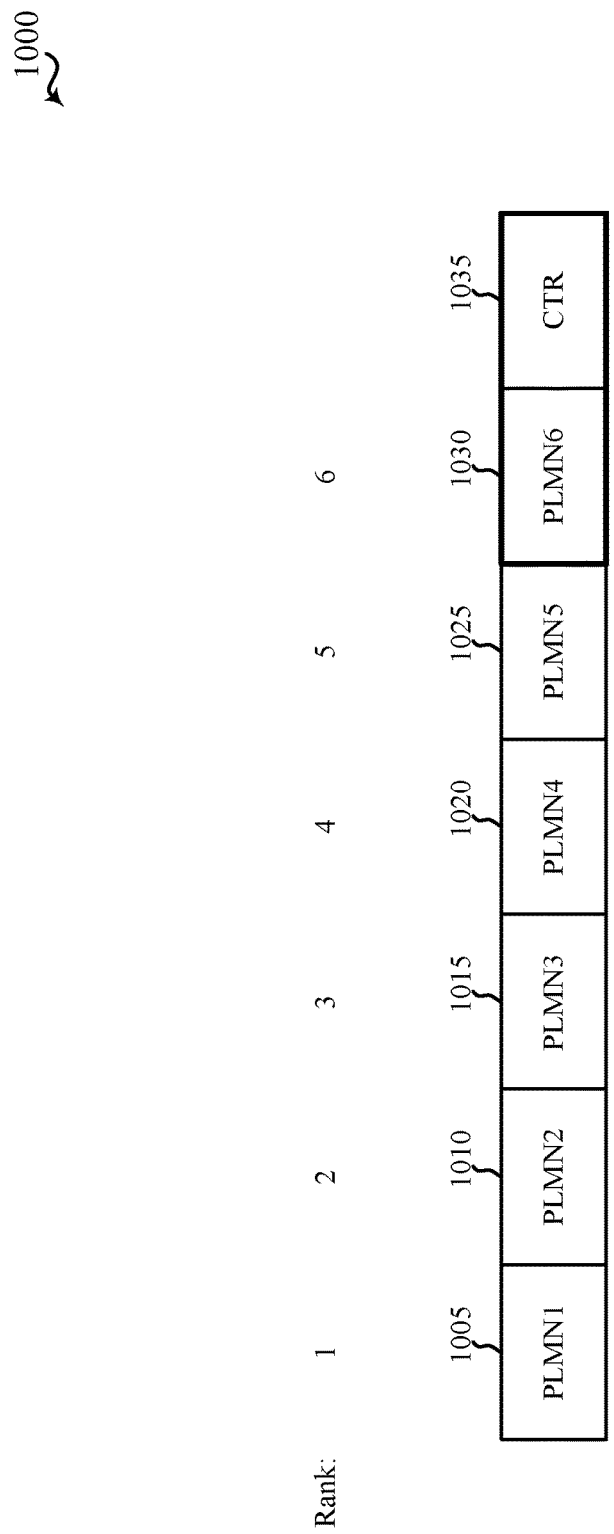
FIG. 10 illustrates an example of a CET period having a plurality of PLMN-specific regions and a common transmission region (CTR), in accordance with various aspects of the present disclosure.
Figure 11:
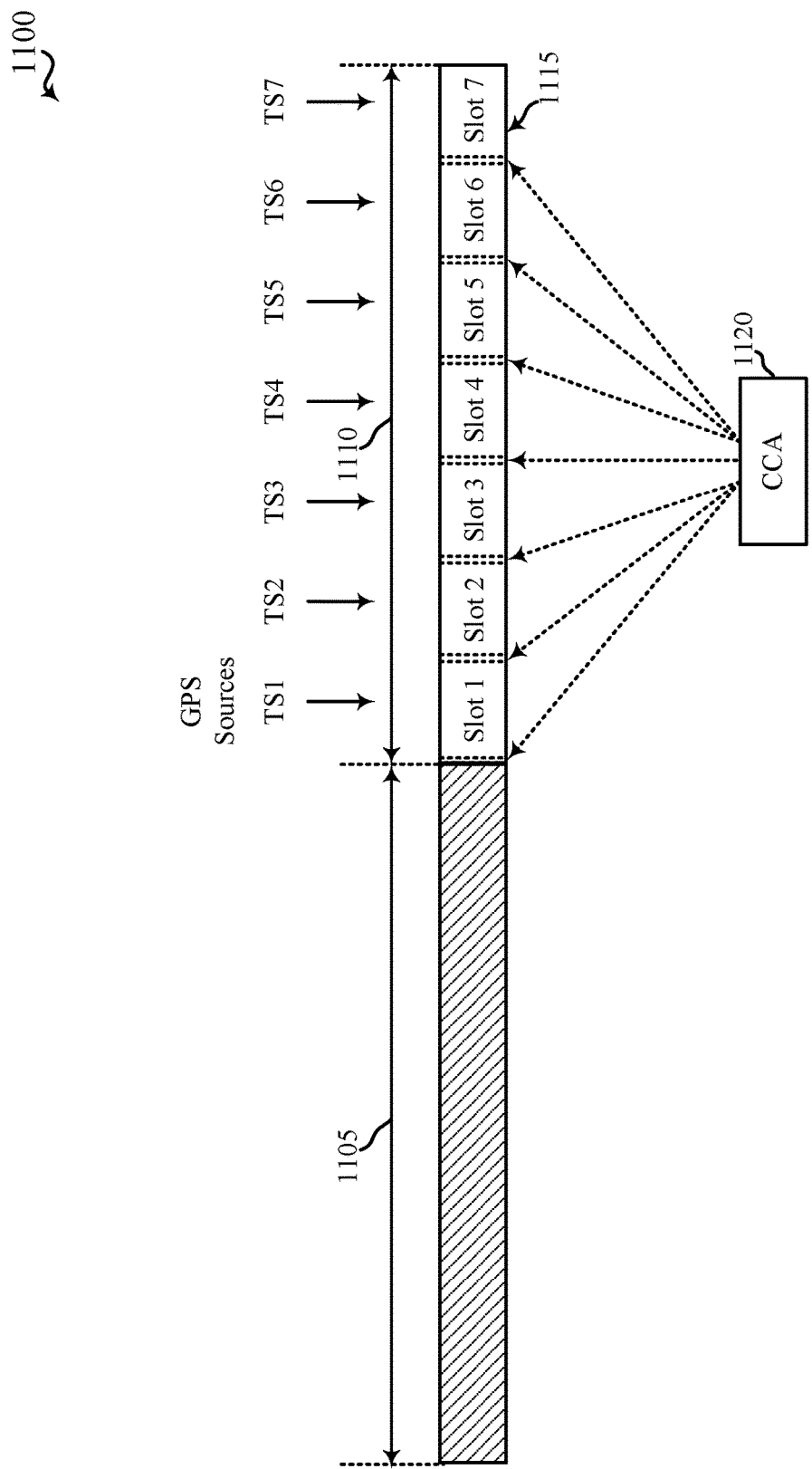
FIG. 11 illustrates an example of a CCA period having a plurality of CCA slots that are usable, at least in part, to acquire access to a shared spectrum for the purpose of performing timing or frequency synchronization over the shared spectrum, in accordance with various aspects of the present disclosure.
Figure 12:
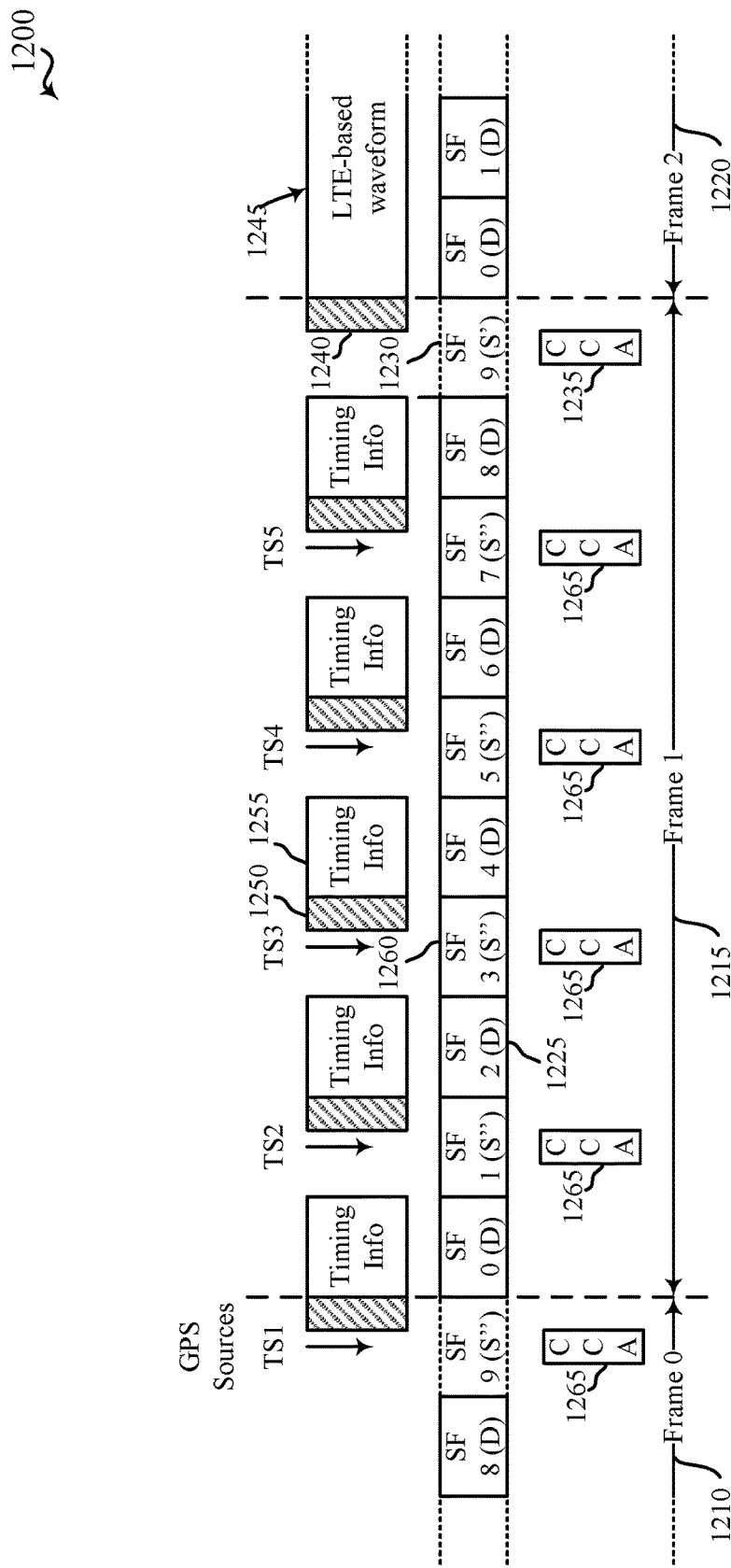
FIG. 12 illustrates an example of a timing synchronization frame, in accordance with various aspects of the present disclosure.

Described below are various ways to adjust (e.g., synchronize) the timing and frequency of cellular devices using a shared spectrum. The described timing and frequency adjustment techniques may extend certain aspects of the 3GPP TR 36.922 "network listening" technique to LTE/LTE-A networks operating in unlicensed spectrum. The timing adjustment techniques described with reference to FIGS. 8-10 are CET-based, whereas the timing adjustment techniques described with reference to FIGS. 11 and 12 are CCA-based.

Figure 8:
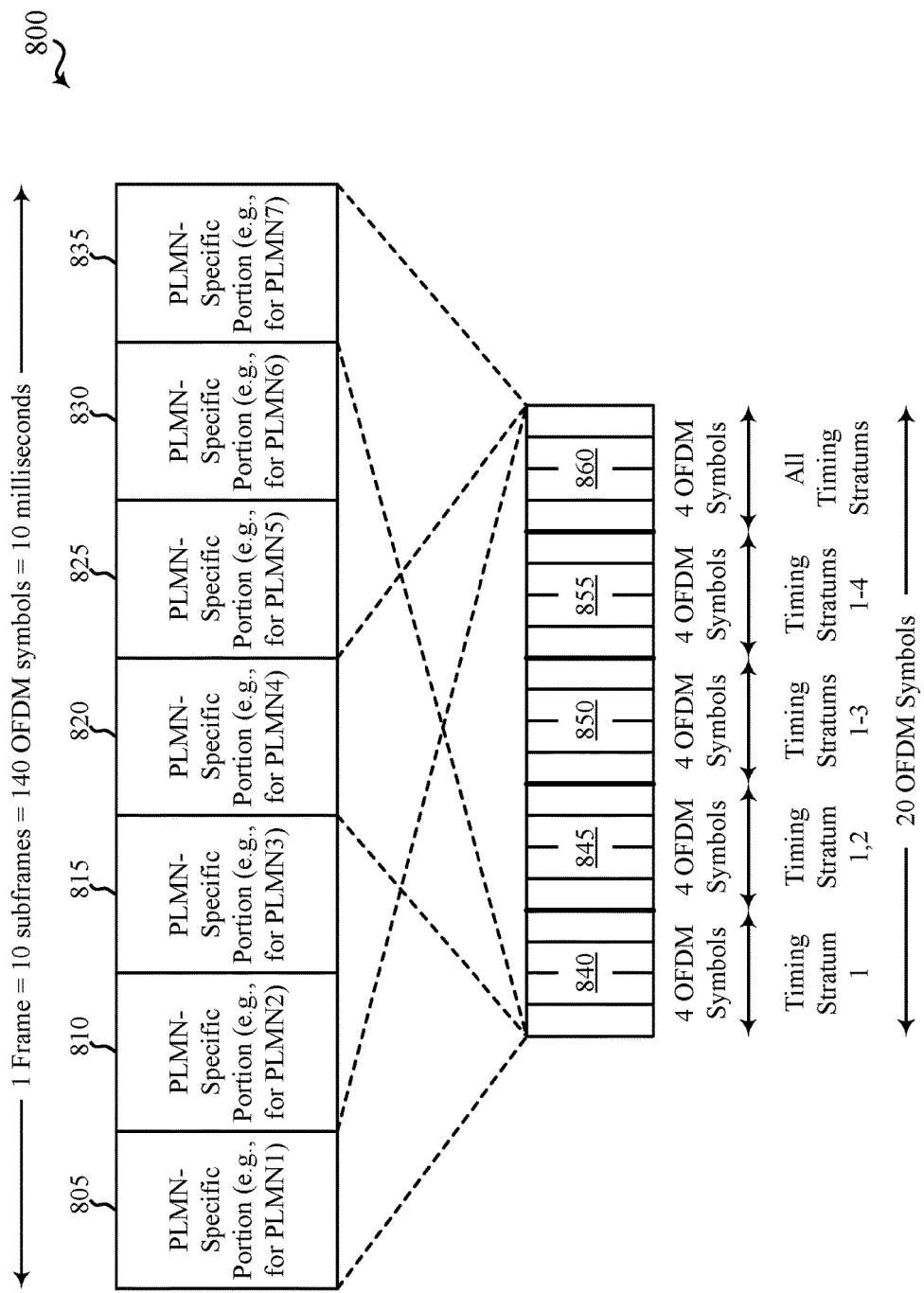
FIG. 8 illustrates an example of a Super CET period, in accordance with various aspects of the present disclosure.

FIG. 8 illustrates an example of a Super CET period 800. In contrast to the CET period described with reference to FIG. 6, the Super CET period 800 may be expanded to include, for example, the entirety of an LTE radio frame (e.g., 10 subframes, 140 OFDM symbols, and 10 milliseconds). To amortize the overhead of the Super CET period 800, the Super CET period 800 may be allocated, for example, once every 800 milliseconds. A Super CET period 800 consuming one LTE radio frame (10 milliseconds) every 800 milliseconds provides an overhead rate of 1.25%. If Super CET periods replace regular CET periods (e.g., every 10th CET period), the increase in overhead attributable to Super CET periods may be less than 1.25%.

As shown, a Super CET period 800 may include a plurality of PLMN-specific portions 805, 810, 815, 820, 825, 830, 835. Each PLMN-specific portion may be assigned to one of a plurality of different PLMNs (e.g., one of seven different PLMNs, noted in FIG. 8 as PLMN1, PLMN2, PLMN3, PLMN4, PLMN5, PLMN6, and PLMN7). By way of example, each PLMN-specific portion may include 20 OFDM symbols. Each set of 20 OFDM symbols may provide five slots (e.g., slots 840, 845, 850, 855, and 860) in which to transmit a CET corresponding to a particular PLMN. Each slot may be four OFDM symbols long and may carry a regular CET waveform.

Devices (e.g., base stations) associated with lower timing stratums may transmit a CET multiple times (e.g., up to five times) within one PLMN-specific portion. However (and assuming there are no more than five timing stratums), the devices of every stratum may be provided a slot in which to transmit a CET without interference from higher stratums. For example, the devices of Timing Stratum 1 in PLMN1 may each transmit a CET in the first four OFDM symbols of a PLMN-specific portion; the devices of Timing Stratum 1 and Timing Stratum 2 in PLMN1 may each transmit a CET in the second four OFDM symbols; the devices of Timing Stratums 1-3 may each transmit a CET in the third four OFDM symbols; the devices of Timing Stratums 1-4 may each transmit a CET in the fourth four OFDM symbols; and all devices of all timing stratums may each transmit a CET in the fifth four OFDM symbols.

Inter-PLMN orthogonality is maintained in the Super CET period, and every device of a timing stratum higher than Timing Stratum 1 may have an opportunity to listen for timing information of another device, with the other device being in a lower stratum of the same PLMN (i.e., in the same operator deployment).

Although the Super CET period 800 shown in FIG. 8 is intended for downlink synchronization, a similar structure may be used for UE-assisted uplink synchronization.

FIG. 9 illustrates an example 900 of inter-PLMN timing adjustments, where a device (e.g., a base station) that is a member of a PLMN associated with one operator (e.g., a first operator) listens for timing information, and adjusts its timing, based on the timing information it receives from another device, which other device may be a member of a PLMN associated with a different operator (e.g., a second operator).

As shown, and by way of example, the devices of PLMN1 may adjust their timing based on timing information received in one or more CETs 910 from devices of PLMN2; the devices of PLMN2 may adjust their timing based on timing information received in one or more CETs 915 from devices of PLMN3; the devices of PLMN3 may adjust their timing based on timing information received in one or more CETs 920 from devices of PLMN4; the devices of PLMN4 may adjust their timing based on timing information received in one or more CETs 925 from devices of PLMN5; the devices of PLMN5 may adjust their timing based on timing information received in one or more CETs 930 from devices of PLMN6; the devices of PLMN6 may adjust their timing based on timing information received in one or more CETs 935 from devices of PLMN7; and the devices of PLMN7 may adjust their timing based on timing information received in one or more CETs 905 from devices of PLMN1.

In some cases, a device may adjust its timing based on a strongest neighbor (i.e., strongest neighbor device) of another PLMN. In some cases, a different timing stratum may be present in a different PLMN as the dominant neighbor. This may be taken advantage of, for example, by encoding the timing stratum number in a System Information Block 0 (i.e., SIB0). The frequency of timing stratum number change may be restricted.

Some potential advantages of the timing adjustment technique described with reference to FIG. 9 are that 1) it may require relatively little effort to setup or manage, and 2) it may enable good reuse among PLMNs, with a guaranteed receive opportunity. Some potential disadvantages are that it does not work in the case of a single PLMN (e.g., because there is no other PLMN to sync to); time tracking accuracy may be questionable due to low duty cycle (e.g., 80 milliseconds); and frequency tracking may be questionable due to a less than three millisecond useful observation window.

FIG. 10 illustrates an example of a CET period 1000 having a plurality of PLMN-specific regions 1005, 1010, 1015, 1020, 1025, 1030 and a common transmission region (CTR) 1035. The CET period 1000 may have a structure similar to the CET period 699 described with reference to FIG. 6, but with the last slot of the CET period being replaced with the CTR 1035. The CTR 1035 may be assigned to different PLMNs in different CET periods on a rotating basis. Thus, when the CET period 1000 occurs every 80 milliseconds and provides PLMN-specific regions 1005, 1010, 1015, 1020, 1025, 1030 for six PLMNS, a PLMN may have access to the CTR 1035 every 480 milliseconds.

In some cases, the PLMN-specific regions 1005, 1010, 1015, 1020, 1025, 1030 may have a time rank order, and PLMN-specific regions having different time ranks may be assigned to different PLMNs in different CET periods. In these cases, the CTR 1035 may be assigned to different PLMNs in different CET periods based on the PLMN assignment of a PLMN-specific region having a particular time rank. For example, the PLMN-specific region having the highest time rank (i.e., the PLMN-specific region 1030 having time rank 5 in FIG. 10) may determine the CTR assignment, such that the PLMN-specific region 1030 having the highest time rank and the CTR 1035 are assigned to a common PLMN.

When a PLMN has access to the CTR 1035, and in some examples, the base stations of the PLMN may transmit CETs with their respective timing information over a shared spectrum during the CTR 1035. CETs may be concurrently transmitted during the CTR 1035, regardless of stratum. Each CET transmitted in the CTR 1035 may include the same MB SFN-like synchronization signal. Base stations associated with the lowest timing stratum (e.g., GPS sync sources) may always transmit CETs during the CTR 1035. Base stations associated with higher timing stratums may track the CTR 1035 to acquire timing and frequency synchronization information, and may then transmit their own CETs during the CTR 1035. Base stations associated with higher timing stratums may periodically gate (i.e., not transmit) their CETs, in order to listen for timing information of other base stations and maintain their time and frequency synchronization. Gating activity may be evenly distributed among the higher stratum devices of a PLMN.

When base stations of a PLMN concurrently transmit CETs in a particular CTR 1035, regardless of stratum, a base station of a higher stratum may track to an aggregate path delay profile of its PLMN, as measured by the CTR signal. The frequency of a base station's tracking rate may be reduced by its gating rate. Thus, for a 25% gating rate, a base station's tracking rate may be reduced to 4*6*(80 milliseconds)=1.92 seconds.

Also, when base stations of a PLMN concurrently transmit CETs in a particular CTR 1035, regardless of stratum, there is no guarantee of convergence to Timing Stratum 1 timing (e.g., GPS timing), and there is a possibility of time and frequency oscillations (e.g., Base Station A syncs to Base Station B, Base Station B syncs to Base Station C, and Base Station C syncs to Base Station A). The possibility of time and frequency oscillations increases when operating, for example, in a standalone mode without a GPS source, where all base stations may be required to periodically sync to their neighbors.

In some examples, the CTR 1035 may be further assigned to one of a plurality of timing stratums of the assigned PLMN on a rotating basis. Stated another way, the CTR 1035 may be assigned to different combinations of PLMN and timing stratum on a rotating basis. Thus, when the CET period occurs every 80 milliseconds and provides slots for six PLMNS having four timing stratums, a PLMN may have access to the CTR 1035 every 1.92 seconds. In these examples, a base station may adjust its timing in response to a lower stratum (or stratums), which may mitigate the possibility of synchronization loops or misconvergence issues.

With any of the timing adjustment techniques described in FIG. 8-10, a base station may periodically gate a transmission of its own CET to capture timing information of another base station in its own PLMN. The gating may be performed according to a periodic gating schedule that indicates particular CET period(s) in which the CET of the base station should be gated to mitigate interference with the base station's receipt of a CET of at least one other base station in its PLMN. The periodic gating schedule may have a low periodicity. Gating activity may be evenly distributed among the higher stratum devices of a PLMN.

Also with any of the timing adjustment techniques described in FIG. 8, 9, or 10, a Physical Broadcast Control Channel (PBCCH) may be used to assign timing stratums to base stations.

FIG. 11 illustrates an example 1100 of a CCA period 1110 having a plurality of CCA slots 1115 (e.g., Slot 1, Slot 2, Slot 3, Slot 4, Slot 5, Slot 6, and Slot 7) that are usable, at least in part, to acquire access to a shared spectrum for the purpose of performing timing or frequency synchronization over the shared spectrum. The CCA period 1110 may in some cases be part of a subframe (e.g., an S subframe). The subframe may also include a guard period 1105.

In some examples, a different timing stratum (e.g., TS1, TS2, TS3, TS4, TS5, TS6, or TS7) may be assigned to each of the CCA slots 1115.

In use, a device (e.g., a base station such as the base station 105 or 205 described with reference to FIG. 1, 2A, or 2B) may perform a CCA 1120 in a CCA slot 1115 to which its associated timing stratum is assigned. Thus, a device associated with timing stratum 1 (e.g., a GPS source) would perform a CCA 1120 in Slot 1, whereas a device associated with timing stratum 4 would perform a CCA 1120 in Slot 4. Upon successfully performing a CCA 1120, a device may transmit a signal such as a CUBS or a CRS to reserve the frame following the CCA period 1110. The device may then transmit timing information in the reserved frame (e.g., a CRS).

In contrast to the CCA period 510 described with reference to FIG. 5, different timing stratums, instead of different PLMNs, are assigned to the CCA slots 1115. Every device sharing a particular timing stratum therefore performs a CCA in the CCA slot 1115 assigned to its timing stratum.

FIG. 12 illustrates an example 1200 of a timing synchronization frame 1215. The timing synchronization frame 1215 has a plurality of CCA 1265 slots that are usable in a cellular downlink to acquire access to a shared spectrum for the purpose of performing timing or frequency synchronization over the shared spectrum. The timing synchronization frame 1215 may be bounded by other types of frames 1210, 1220 and may periodically repeat.

The timing synchronization frame 1215 may include an LTE/LTE-A radio frame having ten subframes (e.g., SF0, SF1, . . . , SF9). Even numbered subframes SF0, SF2, SF4, SF6, and SF8 may be downlink (D) subframes 1225, subframes SF1, SF3, SF5, and SF7 may be special (S") subframes 1260, and subframe SF9 may be a special (S') subframe 1230. The S' subframe SF9 may be used by a base station to perform a CCA 1235. The CCA 1235 may be similar to the CCA described with reference to FIG. 4 or 5. When the CCA 1235 is successful, a device performing the CCA 1235 may transmit a signal (e.g., CUBS 1240) to reserve a subsequent transmission period 1245 of the shared spectrum. The S" subframes SF1, SF3, SF5, and SF7 may be used by a base station to perform a CCA 1265. The CCA 1265 may be similar to the CCA described with reference to FIG. 11. That is, each of the CCA 1265 shown in FIG. 12 may be associated with a different timing stratum. When a device successfully performs a CCA 1265, the device performing the CCA 1265 may transmit a signal (e.g., CUBS 1250) to reserve a subsequent transmission period 1255 in which the device may transmit timing information. Because each CCA slot enables the devices associated with a timing stratum to access the shared spectrum for only a limited period of time within the timing synchronization frame 1215, devices associated with other timing stratums may also be provided opportunities to access the shared spectrum and transmit timing information. The time synchronization frame 1215 shown in FIG. 12 may provide more efficient and timely use of synchronization frame resources.

Figure 13:
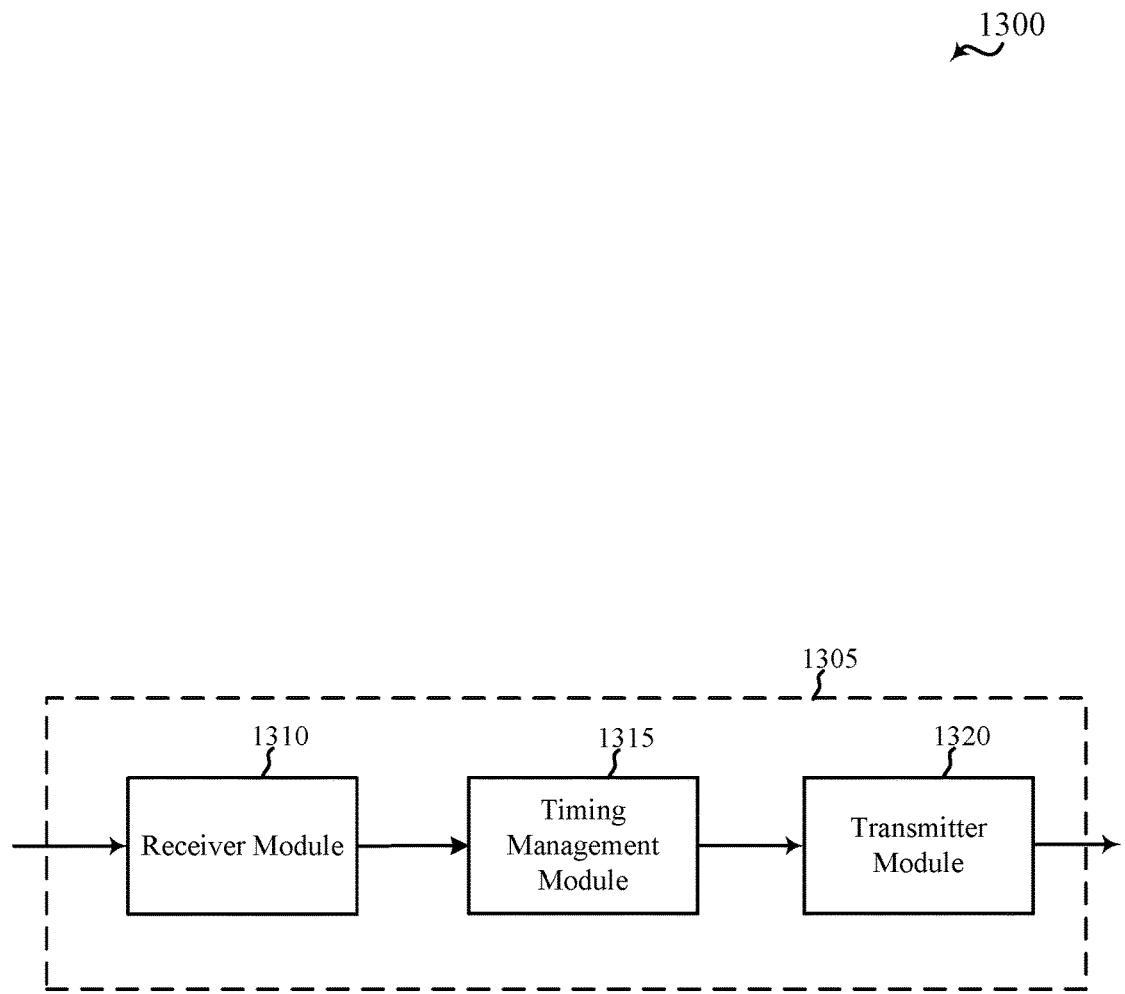
FIG. 13 shows a block diagram of an illustrative device for use in wireless communication, and more particularly CET-based timing synchronization, in accordance with various aspects of the present disclosure.

FIG. 13 shows a block diagram 1300 of a device 1305 for use in wireless communication, in accordance with various aspects of the present disclosure. In some examples, the device 1305 may be an example of one or more aspects of one of the base stations 105 or 205 described with reference to FIG. 1, 2A, or 2B. The device 1305 may also be a processor. The device 1305 may include a receiver module 1310, a timing management module 1315, and a transmitter module 1320. Each of these components may be in communication with each other.

The components of the device 1305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may be or include a radio frequency (RF) receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The receiver module 1310 may be used to receive various types of data or control signals (i.e., transmissions) over one or more communication links of a wireless communications system including the first and second spectrums, such as one or more communication links of the wireless communications system 100, 200, or 250 described with reference to FIG. 1, 2A, or 2B.

In some examples, the transmitter module 1320 may be or include an RF transmitter, such as an RF transmitter operable to transmit in the first spectrum or the second spectrum. The transmitter module 1320 may be used to transmit various types of data or control signals (i.e., transmissions) over one or more communication links of the wireless communications system including the first spectrum and the second spectrum.

In some examples, the timing management module 1315 may receive timing information of at least a second device (e.g., at least a second base station) over a shared spectrum. The timing management module 1315 may use the received timing information to adjust the timing of the device 1305. The timing management module 1315 may also transmit timing information of the device 1305 to other devices (e.g., other base stations). As described below with reference to FIGS. 14-18, timing information may in some cases be transmitted or received during a CET period. Timing information may alternately (or also) be transmitted or received during a CCA period, as described below with reference to FIGS. 19-21.

Figure 14:
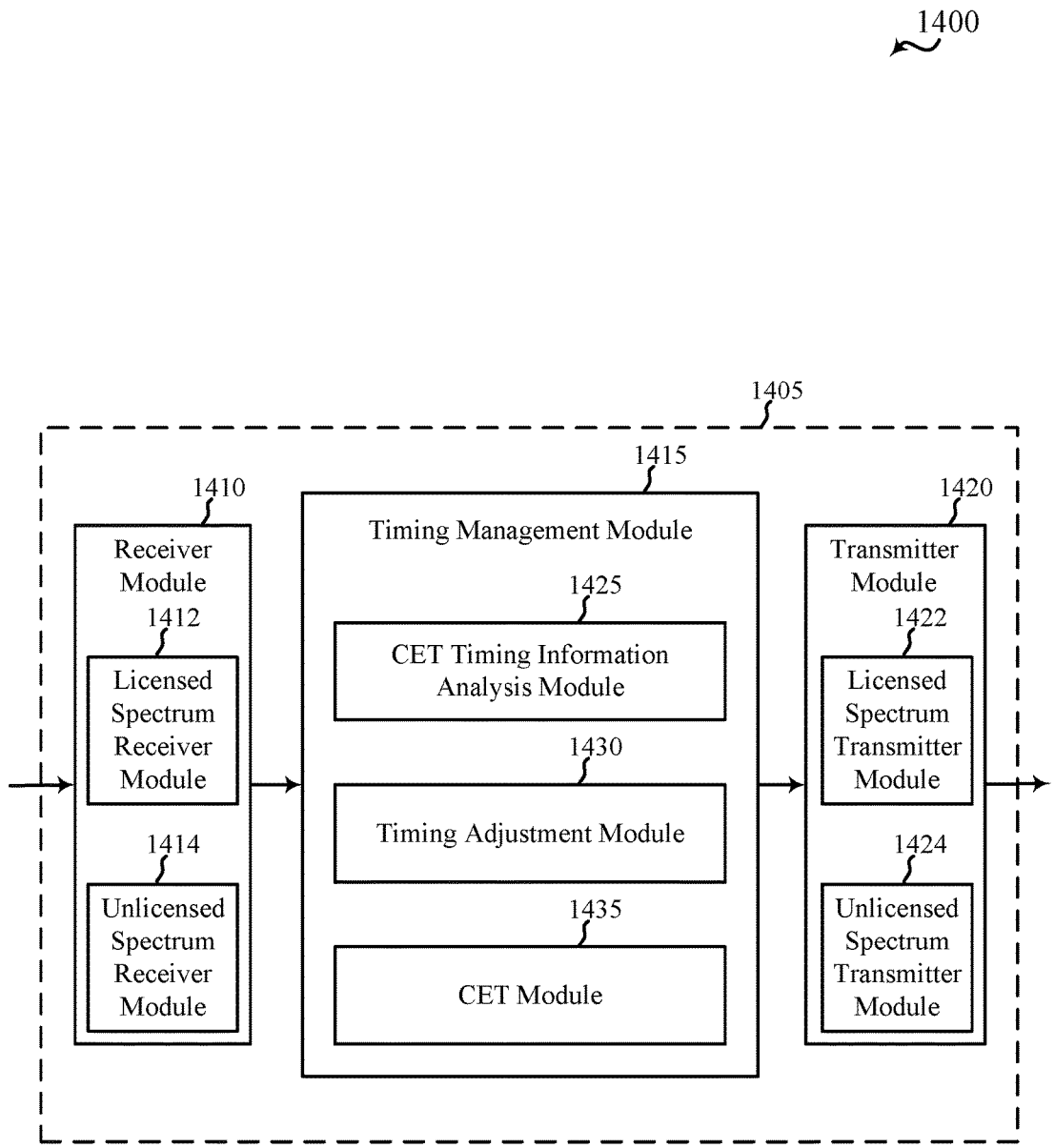
FIG. 14 shows a block diagram of an illustrative device for use in wireless communication, and more particularly CET-based timing synchronization, in accordance with various aspects of the present disclosure.

FIG. 14 shows a block diagram 1400 of a device 1405 for use in wireless communication, in accordance with various aspects of the present disclosure. In some examples, the device 1405 may be an example of one or more aspects of one of the base stations 105 or 205 described with reference to FIG. 1 or 2, or the device 1305 described with reference to FIG. 13. The device 1405 may also be a processor. The device 1405 may include a receiver module 1410, a timing management module 1415, and a transmitter module 1420. Each of these components may be in communication with each other.

The components of the device 1405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1410 may be or include an RF receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The RF receiver may include separate receivers for the first spectrum and the second spectrum. The separate receivers may in some cases take the form of a licensed spectrum receiver module 1412 for communicating over the first spectrum, and an unlicensed spectrum receiver module 1414 for communicating over the second spectrum. The receiver module 1410, including the licensed spectrum receiver module 1412 or the unlicensed spectrum receiver module 1414, may be used to receive various types of data or control signals (i.e., transmissions) over one or more communication links of a wireless communications system including the licensed and unlicensed spectrums, such as one or more communication links of the wireless communications system 100, 200, or 250 described with reference to FIG. 1, 2A, or 2B.

In some examples, the transmitter module 1420 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 1422 for communicating over the first spectrum, and an unlicensed spectrum transmitter module 1424 for communicating over the second spectrum. The transmitter module 1420, including the licensed spectrum transmitter module 1422 or the unlicensed spectrum transmitter module 1424, may be used to transmit various types of data or control signals (i.e., transmissions) over one or more communication links of the wireless communications system including the licensed spectrum and the unlicensed spectrum.

In some examples, the timing management module 1415 may be an example of one or more aspects of the timing management module 1315 described with reference to FIG. 13 and may include a CET timing information analysis module 1425 or a timing adjustment module 1430.

In some examples, the CET timing information analysis module 1425 may be used to receive at least one CET via the unlicensed spectrum receiver module 1414 of the receiver module 1410. The at least one CET may indicate timing information of at least a second device (e.g., a second base station) over a shared spectrum. The at least one CET may also indicate a timing stratum of at least the second device. In some examples, the at least one CET may be received during a CET period.

In some examples, the at least one CET received by the CET timing information analysis module 1425 may include a first CET indicating the timing information of the second device over the shared spectrum and a second CET indicating timing information of a third device over the shared spectrum. The first CET and the second CET may be received at the device 1405 concurrently or at different times.

In some examples, the at least one CET may further indicate timing information for a third device over the shared spectrum. In these examples, the timing of the device 1405 may in some cases be adjusted based on the timing information of the second device and the timing information of the third device. More generally, the timing of the first device may be adjusted based on the timing information of any number of devices.

In some examples, the timing adjustment module 1430 may adjust a timing of the device 1405 based on the received timing information of at least the second device. The timing adjustment may include synchronizing a timing of the device 1405 to a timing of at least the second device based on the received timing information.

In some cases, the device 1405 and other devices from which the device 1405 receives timing information may be members of a common PLMN. In other cases, the device 1405 and other devices may be members of different PLMNs associated with different operators. The different PLMNs may be synchronized with each other.

In some examples, the timing management module 1415 may further include a CET module 1435. The CET module 1435 may be used to transmit a CET of the device 1405 via the unlicensed spectrum transmitter module 1424 of the transmitter module 1420. The CET of the device 1405 may indicate timing information of the device 1405 over the shared spectrum, as well as provide an indication of a timing stratum of the device 1405.

In some examples, the at least one CET may be received at the device 1405 during a particular CET period of a plurality of periodically scheduled CET periods. Each of the CET periods may include at least one PLMN-specific region and a common transmission region. In some cases, the timing information of at least the second base station may be received during the common transmission region of the particular CET period, or a CET of the first base station may be transmitted during the common transmission region.

Figure 15:
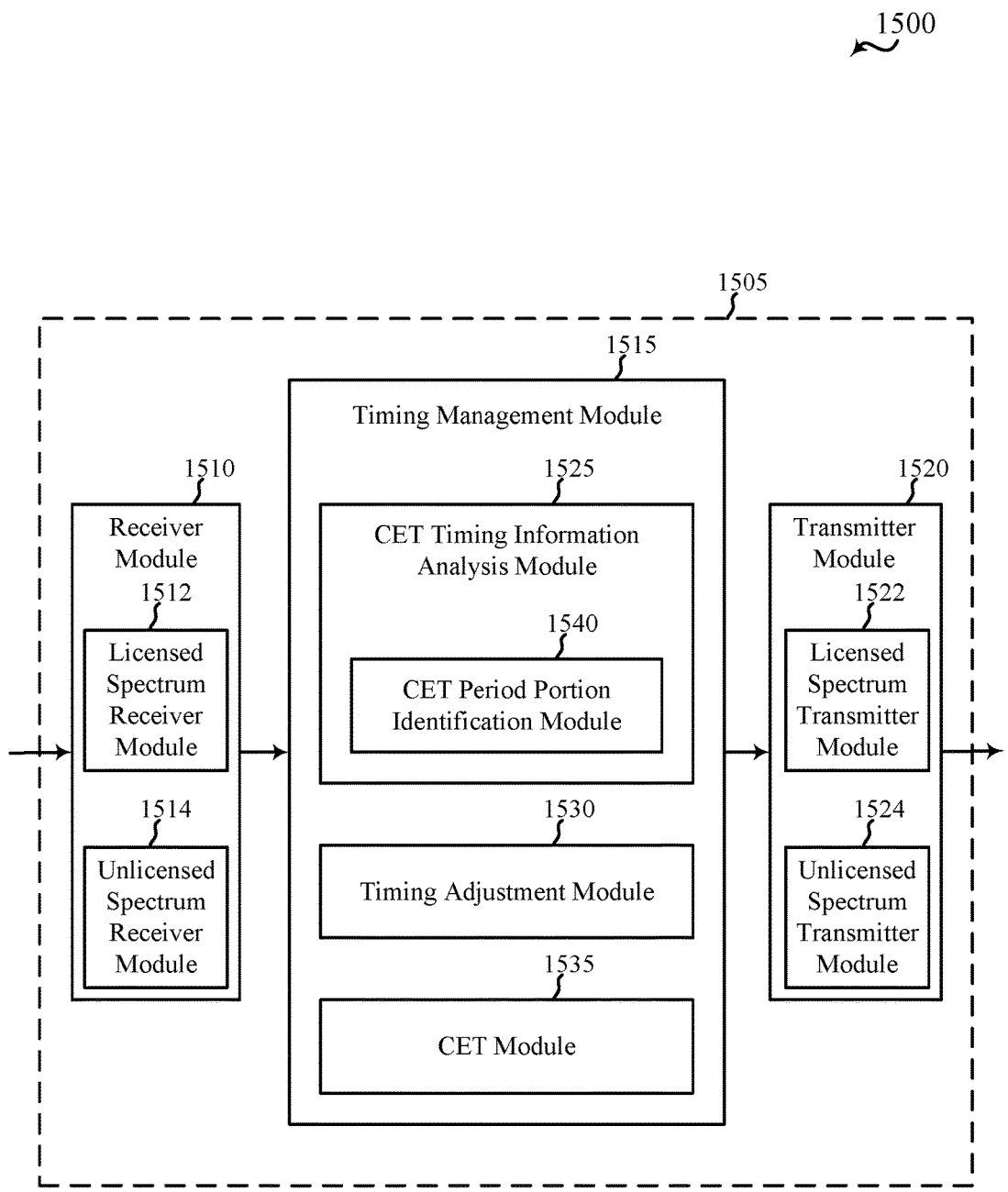
FIG. 15 shows a block diagram of an illustrative device for use in wireless communication, and more particularly CET-based timing synchronization, in accordance with various aspects of the present disclosure.

FIG. 15 shows a block diagram 1500 of a device 1505 for use in wireless communication, in accordance with various aspects of the present disclosure. In some examples, the device 1505 may be an example of one or more aspects of one of the base stations 105 or 205 described with reference to FIG. 1 or 2, or the device 1305 or 1405 described with reference to FIG. 13 or 14. The device 1505 may also be a processor. The device 1505 may include a receiver module 1510, a timing management module 1515, and a transmitter module 1520. Each of these components may be in communication with each other.

The components of the device 1505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1510 may be or include an RF receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The RF receiver may include separate receivers for the first spectrum and the second spectrum. The separate receivers may in some cases take the form of a licensed spectrum receiver module 1512 for communicating over the first spectrum, and an unlicensed spectrum receiver module 1514 for communicating over the second spectrum. The receiver module 1510, including the licensed spectrum receiver module 1512 or the unlicensed spectrum receiver module 1514, may be used to receive various types of data or control signals (i.e., transmissions) over one or more communication links of a wireless communications system including the licensed and unlicensed spectrums, such as one or more communication links of the wireless communications system 100, 200, or 250 described with reference to FIG. 1, 2A, or 2B.

In some examples, the transmitter module 1520 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 1522 for communicating over the first spectrum, and an unlicensed spectrum transmitter module 1524 for communicating over the second spectrum. The transmitter module 1520, including the licensed spectrum transmitter module 1522 or the unlicensed spectrum transmitter module 1524, may be used to transmit various types of data or control signals (i.e., transmissions) over one or more communication links of the wireless communications system including the licensed spectrum and the unlicensed spectrum.

The device 1505 presumes that CETs are transmitted or received during a CET period. The CET period may include a plurality of timing stratum-specific portions or a plurality of PLMN-specific portions, as described, for example, with reference to FIG. 8. When a CET period includes a plurality of timing stratum-specific portions, each of the timing stratum-specific portions may be assigned to one of a plurality of timing stratums. When a CET period includes a plurality of PLMN-specific portions, each of the PLMN-specific portions may be assigned to one of a plurality of PLMNs. When a CET period includes a plurality of timing stratum-specific portions and a plurality of PLMN-specific portions, both a timing stratum-specific portion and a PLMN-specific portion may be assigned to a particular combination of timing stratum and PLMN.

In some examples, the timing management module 1515 may be an example of one or more aspects of the timing management module 1315 or 1415 described with reference to FIG. 13 or 14 and may include a CET timing information analysis module 1525 or a timing adjustment module 1530.

In some examples, the CET timing information analysis module 1525 may be an example of one or more aspects of the CET timing information analysis module 1425 described with reference to FIG. 14 and may include a CET period portion identification module 1540. The CET period portion identification module 1540 may be used to identify a timing stratum-specific portion associated with a timing stratum of a second device (e.g., a second base station) or a PLMN-specific portion associated with a PLMN of the second device (i.e., both a timing stratum-specific portion associated with the timing stratum of the second device and a PLMN-specific portion associated with the PLMN of the second device, when both are available).

In some examples, the timing stratum-specific portion associated with the timing stratum of the second device or the PLMN-specific portion associated with the PLMN of the second device may be identified because the timing stratum associated with the second device is a lower stratum than the timing stratum associated with the device 1505. In some cases, the timing stratum associated with the second device may be a next lower stratum than the timing stratum associated with the device 1505.

In some examples, the CET timing information analysis module 1525 may be used to receive at least one CET via the unlicensed spectrum receiver module 1514 of the receiver module 1510. Each of the at least one CET may be received during a timing stratum-specific portion or a PLMN-specific portion of the CET period. The at least one CET may indicate timing information of at least the second device over a shared spectrum. The at least one CET may also indicate a timing stratum of at least the second device. The timing information of the second device may be received by listening to the identified timing stratum-specific portion or the identified PLMN-specific portion (i.e., both the timing stratum-specific portion associated with the timing stratum of the second device and the PLMN-specific portion associated with the PLMN of the second device, when both are available).

In some examples, the at least one CET received by the CET timing information analysis module 1525 may include a first CET indicating the timing information of the second device over the shared spectrum and a second CET indicating timing information of a third device over the shared spectrum. The first CET and the second CET may be received at the device 1505 concurrently (e.g., in the same timing stratum-specific portion or PLMN-specific portion of a CET period (i.e., both the same timing stratum-specific portion and the same PLMN-specific portion, when both are available)) or at different times (e.g., in different timing stratum-specific portions or different PLMN-specific portions).

In some examples, the at least one CET may further indicate timing information for a third device over the shared spectrum. In these examples, the timing of the device 1505 may in some cases be adjusted based on the timing information of the second device and the timing information of the third device. More generally, the timing of the first device may be adjusted based on the timing information of any number of devices.

In some examples, the timing adjustment module 1530 may be an example of one or more aspects of the timing adjustment module 1430 described with reference to FIG. 14. The timing adjustment module 1530 may be used to adjust a timing of the device 1505 based on the received timing information of at least the second device. The timing adjustment may include synchronizing a timing of the device 1505 to a timing of at least the second device based on the received timing information.

In some examples, the timing management module 1515 may further include a CET module 1535. The CET module 1535 may be used to transmit a CET of the device 1505. The CET of the device 1505 may indicate timing information of the device 1505 over the shared spectrum, as well as provide an indication of a timing stratum of the device 1505.

Figure 16:
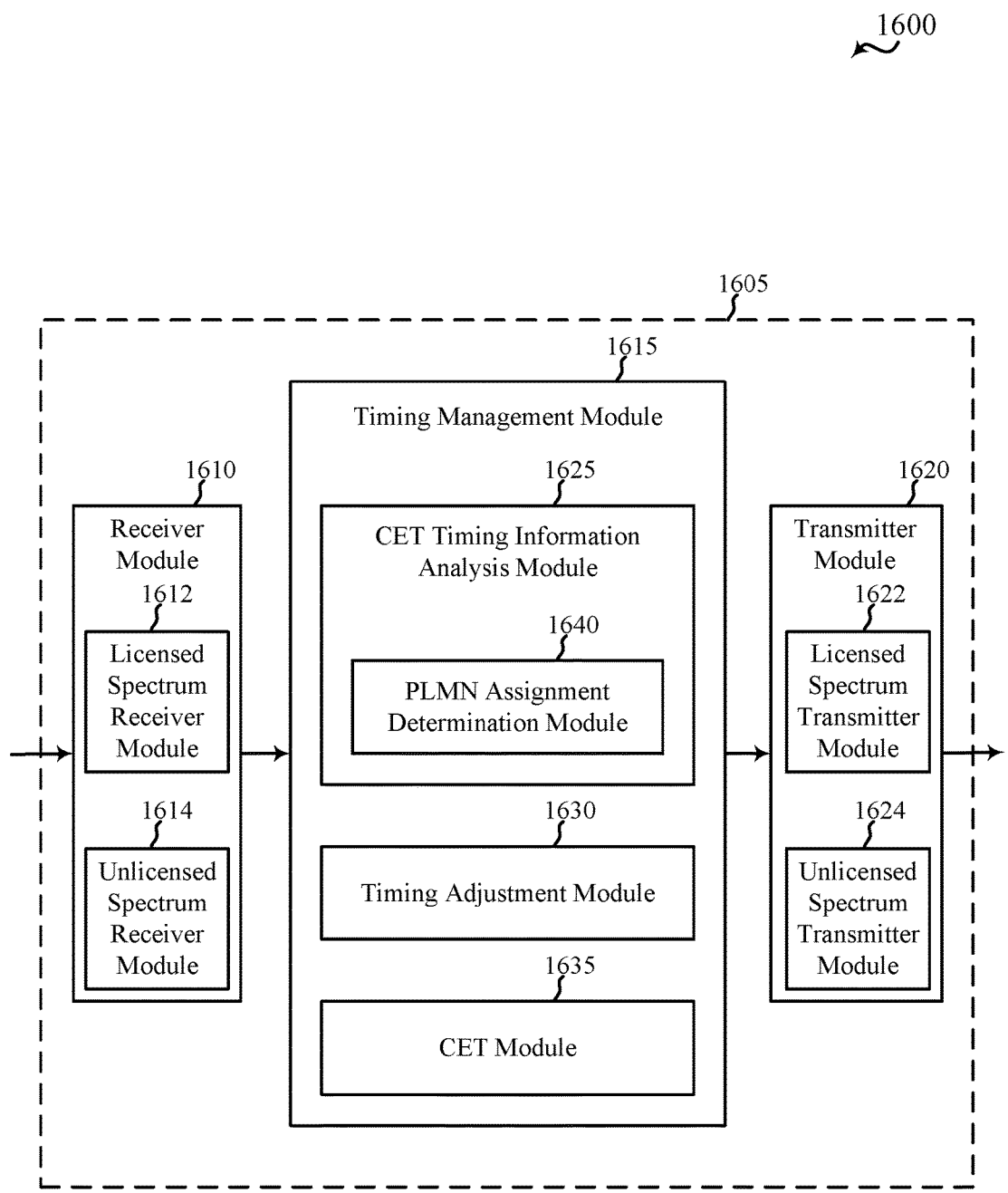
FIG. 16 shows a block diagram of an illustrative device for use in wireless communication, and more particularly CET-based timing synchronization, in accordance with various aspects of the present disclosure.

FIG. 16 shows a block diagram 1600 of a device 1605 for use in wireless communication, in accordance with various aspects of the present disclosure. In some examples, the device 1605 may be an example of one or more aspects of one of the base stations 105 or 205 described with reference to FIG. 1 or 2, or the device 1305 or 1405 described with reference to FIG. 13 or 14. The device 1605 may also be a processor. The device 1605 may include a receiver module 1610, a timing management module 1615, and a transmitter module 1620. Each of these components may be in communication with each other.

The components of the device 1605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1610 may be or include an RF receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The RF receiver may include separate receivers for the first spectrum and the second spectrum. The separate receivers may in some cases take the form of a licensed spectrum receiver module 1612 for communicating over the first spectrum, and an unlicensed spectrum receiver module 1614 for communicating over the second spectrum. The receiver module 1610, including the licensed spectrum receiver module 1612 or the unlicensed spectrum receiver module 1614, may be used to receive various types of data or control signals (i.e., transmissions) over one or more communication links of a wireless communications system including the licensed and unlicensed spectrums, such as one or more communication links of the wireless communications system 100, 200, or 250 described with reference to FIG. 1, 2A, or 2B.

In some examples, the transmitter module 1620 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 1622 for communicating over the first spectrum, and an unlicensed spectrum transmitter module 1624 for communicating over the second spectrum. The transmitter module 1620, including the licensed spectrum transmitter module 1622 or the unlicensed spectrum transmitter module 1624, may be used to transmit various types of data or control signals (i.e., transmissions) over one or more communication links of the wireless communications system including the licensed spectrum and the unlicensed spectrum.

The device 1605 presumes that CETs are transmitted or received during a CET period. The CET period may be one of a plurality of periodically scheduled CET periods, in which each of the plurality of periodically scheduled CET periods may include a plurality of PLMN-specific regions and a common transmission region, as described, for example, with reference to FIG. 10. The PLMN-specific regions of each CET period may have a time rank order, and PLMN-specific regions of different time rank may be assigned to different PLMNs in different CET periods. Likewise, the common transmission regions of different CET periods may be assigned to different PLMNs in different CET periods. In some cases, the PLMN-specific regions or the common transmission regions may be assigned to different PLMNs in different CET periods on a rotating basis.

In some examples, the timing management module 1615 may be an example of one or more aspects of the timing management module 1315 or 1415 described with reference to FIG. 13 or 14 and may include a CET timing information analysis module 1625 or a timing adjustment module 1630.

In some examples, the CET timing information analysis module 1625 may be an example of one or more aspects of the CET timing information analysis module 1425 described with reference to FIG. 14 and may include a PLMN assignment determination module 1640. The CET timing information analysis module 1625 may be used to receive at least one CET via the unlicensed spectrum receiver module 1614 of the receiver module 1610. Each of the at least one CET may be received during a particular CET period of the plurality of periodically scheduled CET periods. The at least one CET may indicate timing information of at least a second device (e.g., a second base station) over a shared spectrum. The at least one CET may also indicate a timing stratum of at least the second device. In some cases, the timing information of at least the second device may be received during one of the PLMN-specific regions. In other cases, the timing information of at least the second device may be received during the common transmission region.

In some examples, the PLMN assignment determination module 1640 may be used to determine the PLMN assignments of the PLMN-specific regions or common transmission region for a particular CET period. The determination may include a determination of which PLMN-specific region is assigned to the PLMN of the second device, as well as a determination of whether the common transmission region is assigned to the PLMN of the second device. In some cases, it may be determined (e.g., inferred) that the common transmission region is assigned to the PLMN of the second device based on an assignment of a PLMN-specific region having a particular time rank (e.g., the last PLMN-specific region in time rank order) to the PLMN of the second device for the particular CET period.

In some examples, the timing adjustment module 1630 may be used to adjust a timing of the device 1605 based on the received timing information of at least the second device. The timing adjustment may include synchronizing a timing of the device 1605 to a timing of at least the second device based on the received timing information.

In some examples, the at least one CET received by the CET timing information analysis module 1625 may include a first CET indicating the timing information of the second device over the shared spectrum and a second CET indicating timing information of a third device over the shared spectrum. The first CET and the second CET may be received at the device 1605 concurrently or at different times.

In some examples, the at least one CET may further indicate timing information for a third device over the shared spectrum. In these examples, the timing of the device 1605 may in some cases be adjusted based on the timing information of the second device and the timing information of the third device. More generally, the timing of the first device may be adjusted based on the timing information of any number of devices.

In some cases, the first base station and the second base station may be members of a common PLMN. In other cases, the first base station and the second base station may be members of different PLMNs associated with different operators. The different PLMNs may be synchronized with each other.

In some examples, the timing management module 1615 may further include a CET module 1635. The CET module 1635 may be used to transmit a CET of the device 1605. The CET of the device 1605 may indicate timing information of the device 1605 over the shared spectrum, as well as provide an indication of a timing stratum of the device 1605.

Figure 17:
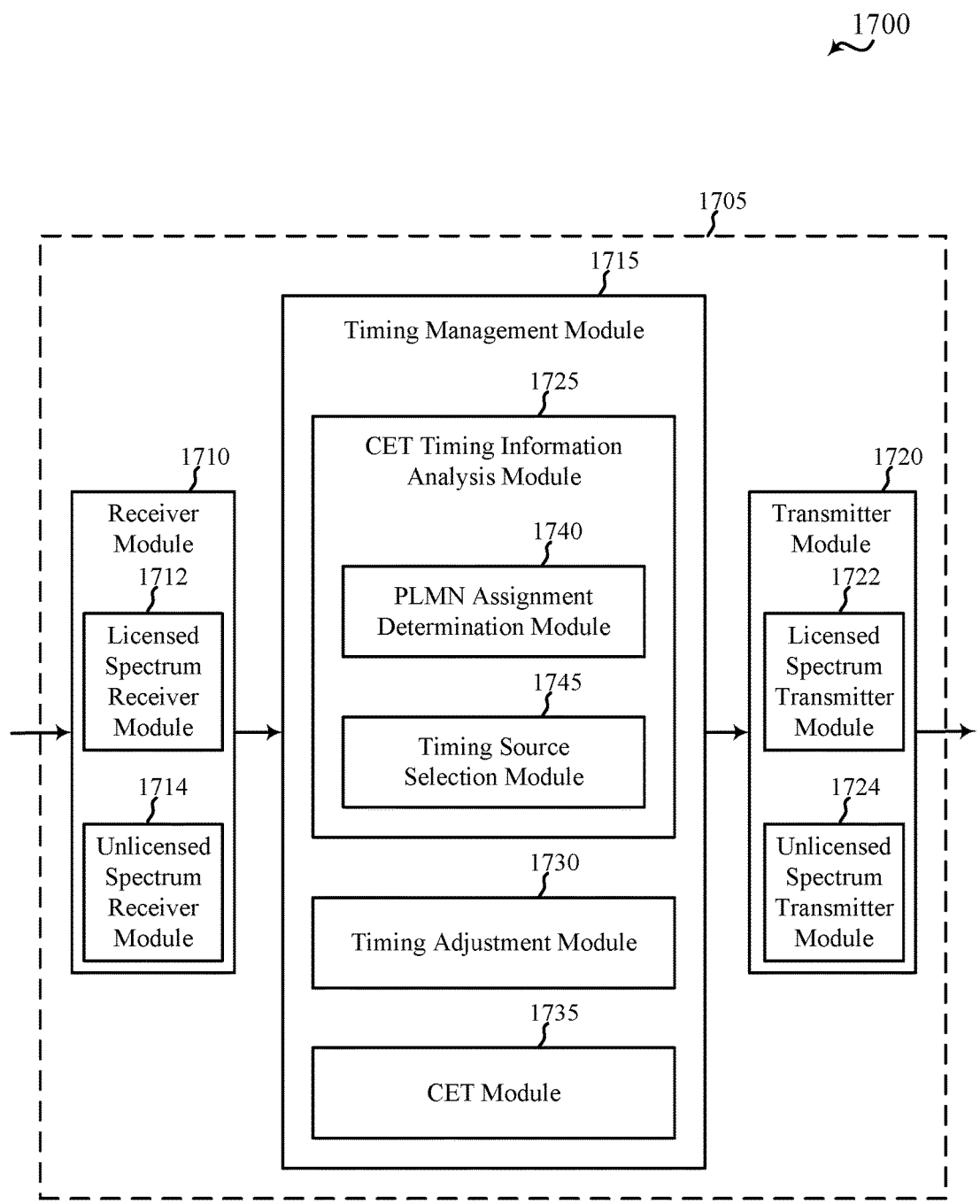
FIG. 17 shows a block diagram of an illustrative device for use in wireless communication, and more particularly CET-based timing synchronization, in accordance with various aspects of the present disclosure.

FIG. 17 shows a block diagram 1700 of a device 1705 for use in wireless communication, in accordance with various aspects of the present disclosure. In some examples, the device 1705 may be an example of one or more aspects of one of the base stations 105 or 205 described with reference to FIG. 1 or 2, or the device 1305 or 1405 described with reference to FIG. 13 or 14. The device 1705 may also be a processor. The device 1705 may include a receiver module 1710, a timing management module 1715, and a transmitter module 1720. Each of these components may be in communication with each other.

The components of the device 1705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1710 may be or include an RF receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The RF receiver may include separate receivers for the first spectrum and the second spectrum. The separate receivers may in some cases take the form of a licensed spectrum receiver module 1712 for communicating over the first spectrum, and an unlicensed spectrum receiver module 1714 for communicating over the second spectrum. The receiver module 1710, including the licensed spectrum receiver module 1712 or the unlicensed spectrum receiver module 1714, may be used to receive various types of data or control signals (i.e., transmissions) over one or more communication links of a wireless communications system including the licensed and unlicensed spectrums, such as one or more communication links of the wireless communications system 100, 200, or 250 described with reference to FIG. 1, 2A, or 2B.

In some examples, the transmitter module 1720 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 1722 for communicating over the first spectrum, and an unlicensed spectrum transmitter module 1724 for communicating over the second spectrum. The transmitter module 1720, including the licensed spectrum transmitter module 1722 or the unlicensed spectrum transmitter module 1724, may be used to transmit various types of data or control signals (i.e., transmissions) over one or more communication links of the wireless communications system including the licensed spectrum and the unlicensed spectrum.

The device 1705 presumes that CETs are transmitted or received during a CET period. The CET period may be one of a plurality of periodically scheduled CET periods, in which each of the plurality of periodically scheduled CET periods may include a plurality of PLMN-specific regions and a common transmission region, as described, for example, with reference to FIG. 10. The PLMN-specific regions of each CET period may have a time rank order, and PLMN-specific regions of different time rank may be assigned to different PLMNs in different CET periods. The common transmission regions of different CET periods may be assigned to different combinations of PLMNs and timing stratums in different CET periods. In some cases, the PLMN-specific regions may be assigned to different PLMNs in different CET periods on a rotating basis. Likewise, the common transmission regions may be assigned to different combinations of PLMNs and timing stratums in different CET periods on a rotating basis.

In some examples, the timing management module 1715 may be an example of one or more aspects of the timing management module 1315 or 1415 described with reference to FIG. 13 or 14 and may include a CET timing information analysis module 1725 or a timing adjustment module 1730.

In some examples, the CET timing information analysis module 1725 may be an example of one or more aspects of the CET timing information analysis module 1425 described with reference to FIG. 14 and may include a PLMN assignment determination module 1740 or a timing source selection module 1745. The CET timing information analysis module 1725 may be used to receive at least one CET via the unlicensed spectrum receiver module 1714 of the receiver module 1710. Each of the at least one CET may be received during a particular CET period of the plurality of periodically scheduled CET periods. The at least one CET may indicate timing information of at least a second device (e.g., a second base station) over a shared spectrum. The at least one CET may also indicate a timing stratum of at least the second device. In some cases, the timing information of at least the second device may be received during one of the PLMN-specific regions. In other cases, the timing information of at least the second device may be received during the common transmission region.

In some examples, the PLMN assignment determination module 1740 may be used to determine the PLMN assignments of the PLMN-specific regions or common transmission region for a particular CET period. The determination may include a determination of which PLMN-specific region is assigned to the PLMN of the second device, as well as a determination of whether the common transmission region is assigned to the PLMN of the second device. In some cases, it may be determined (e.g., inferred) that the common transmission region is assigned to the PLMN of the second device based on an assignment of a PLMN-specific region having a particular time rank (e.g., the last PLMN-specific region in time rank order) to the PLMN of the second device for the particular CET period.

In some examples, the timing source selection module 1745 may be used to determine that the second device includes a compatible timing stratum synchronization source for the device 1705. In some cases, the second device may be determined to include a compatible timing stratum synchronization source because the timing stratum associated with the second device is a lower stratum than the timing stratum associated with the device 1705. In some cases, the second device may be determined to include a compatible timing stratum synchronization source because the timing stratum associated with the second device is a next lower stratum than the timing stratum associated with the device 1705. The timing source selection module 1745 may also be used to select the second device, based on the aforesaid determination, as a basis for adjusting the timing of the device 1705.

In some examples, the timing adjustment module 1730 may be used to adjust a timing of the device 1705 based on the received timing information of at least the second device. The timing adjustment may include synchronizing a timing of the device 1705 to a timing of at least the second device based on the received timing information.

In some examples, the at least one CET received by the CET timing information analysis module 1725 may include a first CET indicating the timing information of the second device over the shared spectrum and a second CET indicating timing information of a third device over the shared spectrum. The first CET and the second CET may be received at the device 1705 concurrently or at different times.

In some examples, the at least one CET may further indicate timing information for a third device over the shared spectrum. In these examples, the timing of the device 1705 may in some cases be adjusted based on the timing information of the second device and the timing information of the third device. More generally, the timing of the first device may be adjusted based on the timing information of any number of devices.

In some cases, the first base station and the second base station may be members of a common PLMN. In other cases, the first base station and the second base station may be members of different PLMNs associated with different operators. The different PLMNs may be synchronized with each other.

In some examples, the timing management module 1715 may further include a CET module 1735. The CET module 1735 may be used to transmit a CET of the device 1705. The CET of the device 1705 may indicate timing information of the device 1705 over the shared spectrum, as well as provide an indication of a timing stratum of the device 1705.

Figure 18:
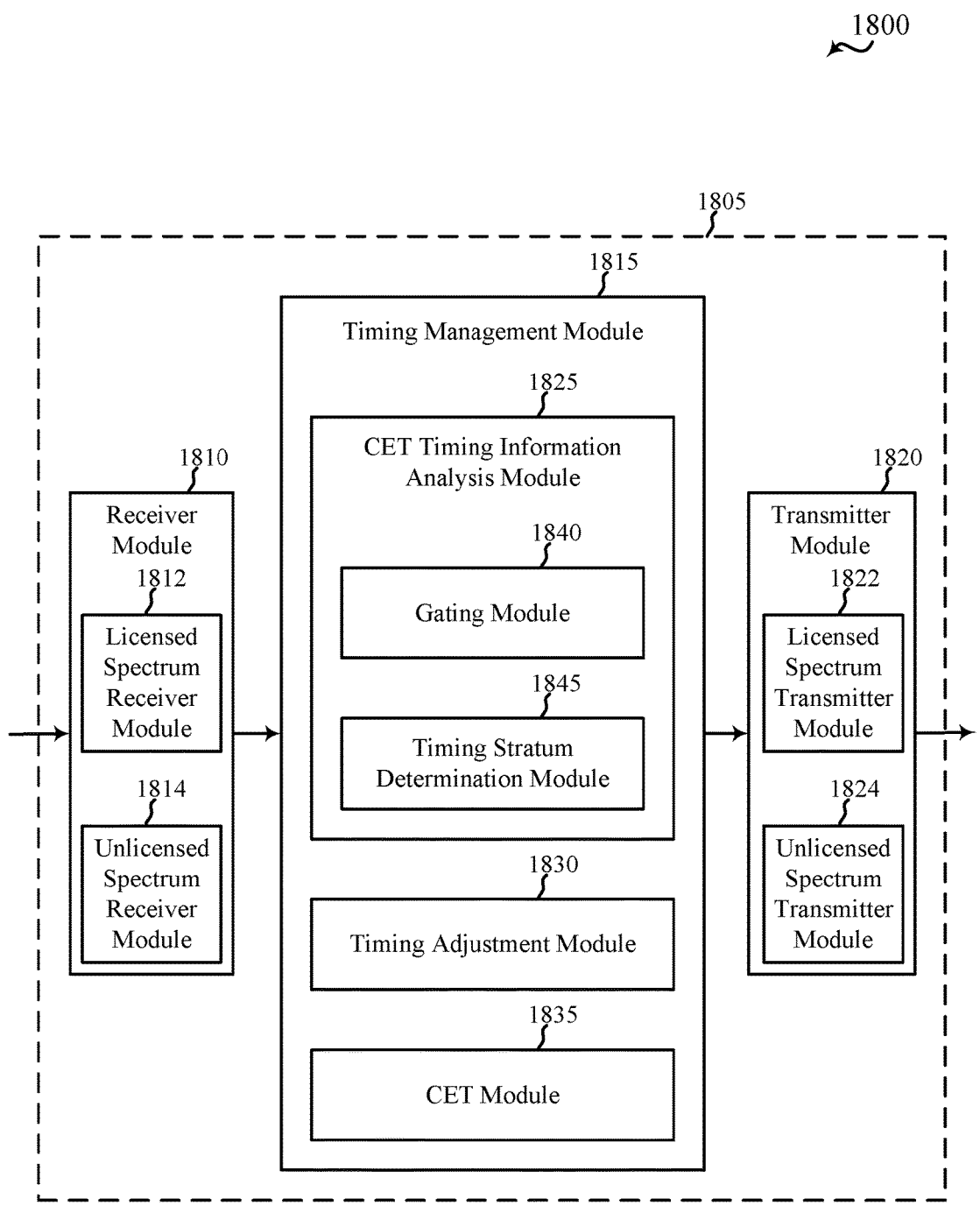
FIG. 18 shows a block diagram of an illustrative device for use in wireless communication, and more particularly CET-based timing synchronization, in accordance with various aspects of the present disclosure.

FIG. 18 shows a block diagram 1800 of a device 1805 for use in wireless communication, in accordance with various aspects of the present disclosure. In some examples, the device 1805 may be an example of one or more aspects of one of the base stations 105 or 205 described with reference to FIG. 1 or 2, or the device 1305 or 1405 described with reference to FIG. 13 or 14. The device 1805 may also be a processor. The device 1805 may include a receiver module 1810, a timing management module 1815, and a transmitter module 1820. Each of these components may be in communication with each other.

The components of the device 1805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1810 may be or include an RF receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The RF receiver may include separate receivers for the first spectrum and the second spectrum. The separate receivers may in some cases take the form of a licensed spectrum receiver module 1812 for communicating over the first spectrum, and an unlicensed spectrum receiver module 1814 for communicating over the second spectrum. The receiver module 1810, including the licensed spectrum receiver module 1812 or the unlicensed spectrum receiver module 1814, may be used to receive various types of data or control signals (i.e., transmissions) over one or more communication links of a wireless communications system including the licensed and unlicensed spectrums, such as one or more communication links of the wireless communications system 100, 200, or 250 described with reference to FIG. 1, 2A, or 2B.

In some examples, the transmitter module 1820 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 1822 for communicating over the first spectrum, and an unlicensed spectrum transmitter module 1824 for communicating over the second spectrum. The transmitter module 1820, including the licensed spectrum transmitter module 1822 or the unlicensed spectrum transmitter module 1824, may be used to transmit various types of data or control signals (i.e., transmissions) over one or more communication links of the wireless communications system including the licensed spectrum and the unlicensed spectrum.

The device 1805 presumes that the device 1805 and at least a second device (e.g., at least a second base station) share a periodic CET timing. Because of the shared CET timing, the transmission of a CET by the device 1805 may interfere with the device's receipt of a CET of at least the second device (e.g., because the respective CETs may be received and transmitted concurrently).

In some examples, the timing management module 1815 may be an example of one or more aspects of the timing management module 1315 or 1415 described with reference to FIG. 13 or 14 and may include a CET timing information analysis module 1825, a timing adjustment module 1830, or a CET module 1835.

In some examples, the CET timing information analysis module 1825 may be an example of one or more aspects of the CET timing information analysis module 1425 described with reference to FIG. 14 and may include a gating module 1840 or a timing stratum determination module 1845. The gating module 1840 may be used to access a periodic gating schedule to determine whether the CET of the device 1805 should be gated (i.e., not transmitted) in a current CET period. The periodic gating schedule may indicate particular CET period(s) in which the CET of the device 1805 should be gated to mitigate interference with the device's receipt of the CET of at least a second device (e.g., a second base station).

In some examples, the timing stratum determination module 1845 may be used to determine a timing stratum of the device 1805.

In some examples, the CET timing information analysis module 1825 may be used to receive at least one CET via the unlicensed spectrum receiver module 1814 of the receiver module 1810. Each of the at least one CET may be received during a current CET period of a plurality of periodically scheduled CET periods. The at least one CET may indicate timing information of at least a second device (e.g., a second base station) over a shared spectrum. The at least one CET may also indicate a timing stratum of at least the second device.

In some examples, the timing adjustment module 1830 may be used to adjust a timing of the device 1805 based on the received timing information of at least the second device. The timing adjustment may include synchronizing a timing of the device 1805 to a timing of at least the second device based on the received timing information.

In some examples, the at least one CET received by the CET timing information analysis module 1825 may include a first CET indicating the timing information of the second device over the shared spectrum and a second CET indicating timing information of a third device over the shared spectrum. The first CET and the second CET may be received at the device 1805 concurrently or at different times.

In some examples, the at least one CET may further indicate timing information for a third device over the shared spectrum. In these examples, the timing of the device 1805 may in some cases be adjusted based on the timing information of the second device and the timing information of the third device. More generally, the timing of the first device may be adjusted based on the timing information of any number of devices.

In some cases, the first base station and the second base station may be members of a common PLMN. In other cases, the first base station and the second base station may be members of different PLMNs associated with different operators. The different PLMNs may be synchronized with each other.

In some examples, the CET module 1835 may be used to transmit a CET of the device 1805. The CET of the device 1805 may indicate timing information of the device 1805 over the shared spectrum, as well as provide an indication of a timing stratum of the device 1805. The CET module 1835 may be prohibited from transmitting a CET of the device 1805 in CET periods gated by the gating module 1840.

In some examples, the at least one CET may be received during a particular CET period of a plurality of periodically scheduled CET periods. Each of the CET periods may include at least one PLMN-specific region and a common transmission region. In some cases, the timing information of at least the second device may be received during the common transmission region of the particular CET period or a CET of the device 1805 may be transmitted during the common transmission region.

Figure 19:
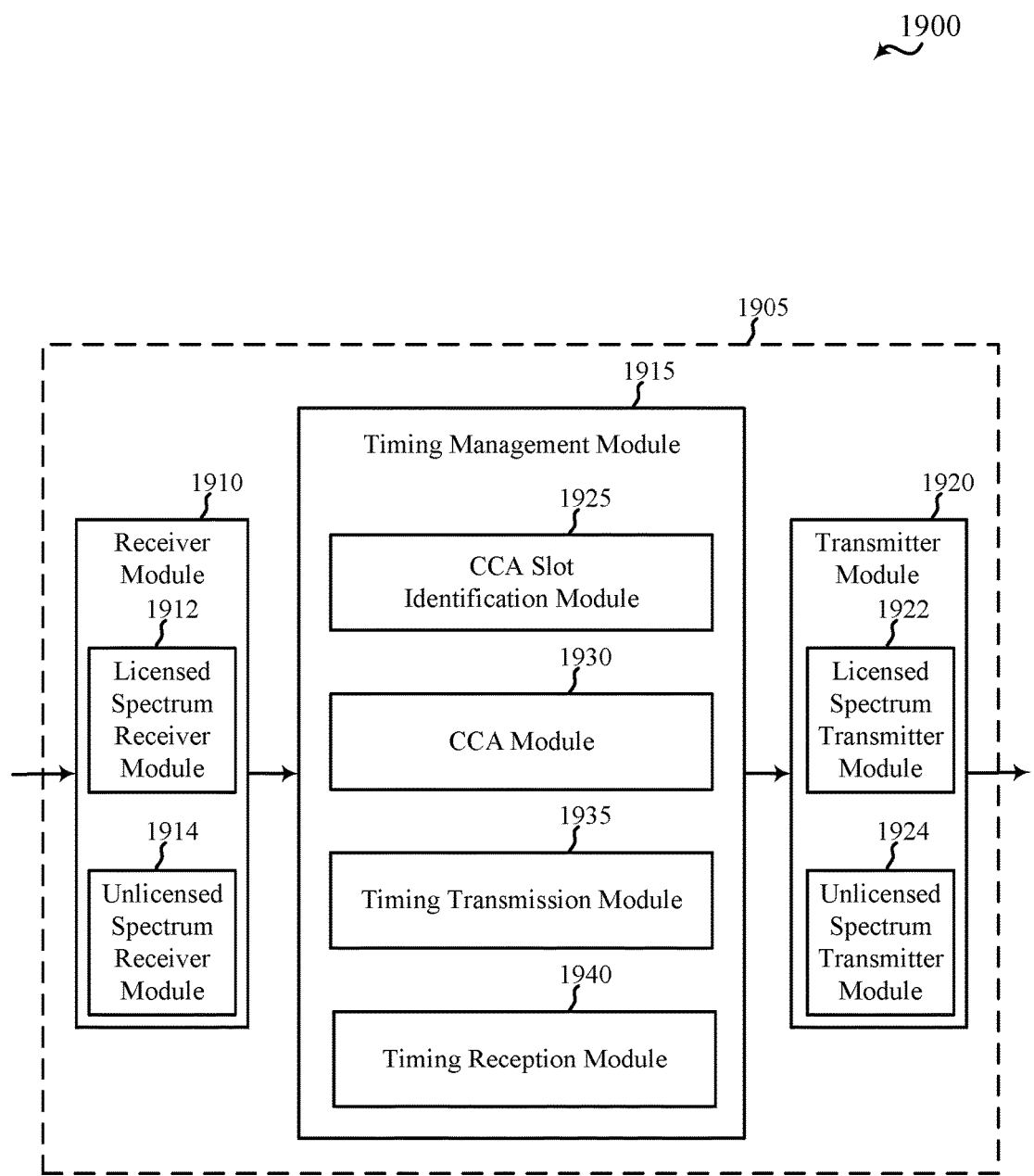
FIG. 19 shows a block diagram of an illustrative device for use in wireless communication, and more particularly CCA-based timing synchronization, in accordance with various aspects of the present disclosure.

FIG. 19 shows a block diagram 1900 of a device 1905 for use in wireless communication, in accordance with various aspects of the present disclosure. In some examples, the device 1905 may be an example of one or more aspects of one of the base stations 105 or 205 described with reference to FIG. 1 or 2, or the device 1305 described with reference to FIG. 13. The device 1905 may also be a processor. The device 1905 may include a receiver module 1910, a timing management module 1915, and a transmitter module 1920. Each of these components may be in communication with each other.

The components of the device 1905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1910 may be or include an RF receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The RF receiver may include separate receivers for the first spectrum and the second spectrum. The separate receivers may in some cases take the form of a licensed spectrum receiver module 1912 for communicating over the first spectrum, and an unlicensed spectrum receiver module 1914 for communicating over the second spectrum. The receiver module 1910, including the licensed spectrum receiver module 1912 or the unlicensed spectrum receiver module 1914, may be used to receive various types of data or control signals (i.e., transmissions) over one or more communication links of a wireless communications system including the licensed and unlicensed spectrums, such as one or more communication links of the wireless communications system 100, 200, or 250 described with reference to FIG. 1, 2A, or 2B.

In some examples, the transmitter module 1920 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 1922 for communicating over the first spectrum, and an unlicensed spectrum transmitter module 1924 for communicating over the second spectrum. The transmitter module 1920, including the licensed spectrum transmitter module 1922 or the unlicensed spectrum transmitter module 1924, may be used to transmit various types of data or control signals (i.e., transmissions) over one or more communication links of the wireless communications system including the licensed spectrum and the unlicensed spectrum.

In some examples, the timing management module 1915 may be an example of one or more aspects of the timing management module 1315 described with reference to FIG. 13 and may include a CCA slot identification module 1925, a CCA module 1930, a timing transmission module 1935, or a timing reception module 1940.

In some examples, the CCA slot identification module 1925 may be used to identify a CCA slot assigned to the device 1905 for a frame of a shared spectrum. The frame may be a frame associated with time synchronization, as described, for example, with reference to FIG. 11. In some cases, the frame may be one of a plurality of periodic sync frames.

In some examples, the CCA slot assigned to the first base station for a frame of the shared spectrum may be identified based on a timing stratum of the first base station In some examples, the CCA slot assigned to the first base station may occur earlier in a frame than one or more CCA slots associated with timing stratums that are higher than the timing stratum of the first base station (e.g., if the first base station is associated with a lower timing stratum and is a GPS source, or is associated with a timing stratum that is closer to a GPS source in a synchronization stratum than other base stations, the first base station may perform CCA in a CCA slot that occurs earlier in a frame than one or more other CCA slots). In general, base stations associated with lower timing stratums may be assigned CCA slots that occur earlier in a frame.

In some examples, the CCA module 1930 may be used to perform a CCA at the CCA slot identified for the frame by the CCA slot identification module 1925.

In some examples (e.g., when the CCA is successful), the timing transmission module 1935 may be used to selectively transmit a first timing information of the device 1905.

In some examples (e.g., when the CCA is unsuccessful), the timing reception module 1940 may be used to listen for a second timing information of a second device (e.g., a second base station) during the frame. In some cases, the timing reception module 1940 may also listen for a third timing information of a third device during the frame (or listen for and receive additional timing information of additional devices). The second timing information and the third timing information (as well as other timing information) may in some cases be received concurrently.

Figure 20:
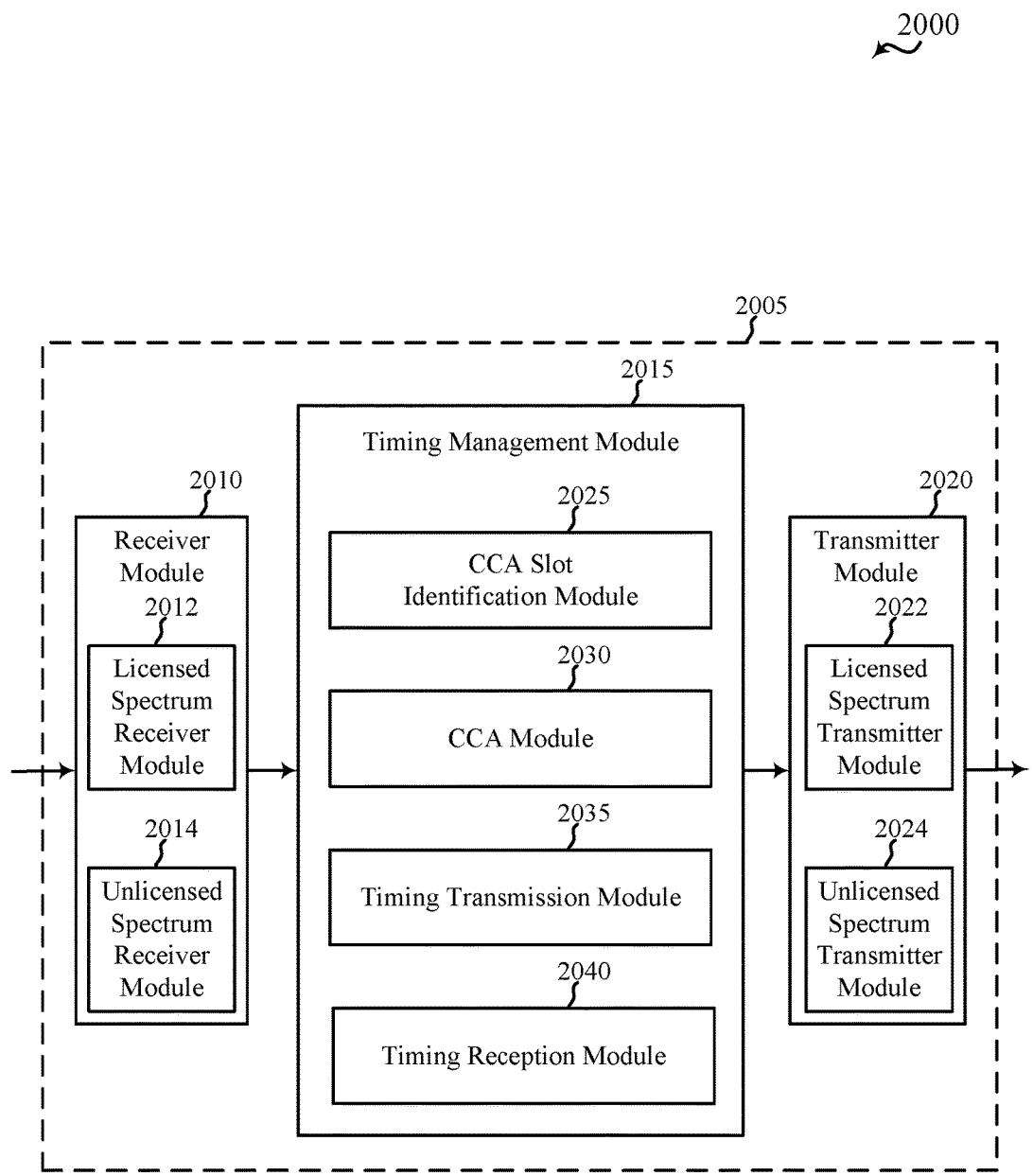
FIG. 20 shows a block diagram of an illustrative device for use in wireless communication, and more particularly CCA-based timing synchronization, in accordance with various aspects of the present disclosure.

FIG. 20 shows a block diagram 2000 of a device 2005 for use in wireless communication, in accordance with various aspects of the present disclosure. In some examples, the device 2005 may be an example of one or more aspects of one of the base stations 105 or 205 described with reference to FIG. 1 or 2, or the device 1305 described with reference to FIG. 13. The device 2005 may also be a processor. The device 2005 may include a receiver module 2010, a timing management module 2015, and a transmitter module 2020. Each of these components may be in communication with each other.

The components of the device 2005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2010 may be or include an RF receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The RF receiver may include separate receivers for the first spectrum and the second spectrum. The separate receivers may in some cases take the form of a licensed spectrum receiver module 2012 for communicating over the first spectrum, and an unlicensed spectrum receiver module 2014 for communicating over the second spectrum. The receiver module 2010, including the licensed spectrum receiver module 2012 or the unlicensed spectrum receiver module 2014, may be used to receive various types of data or control signals (i.e., transmissions) over one or more communication links of a wireless communications system including the licensed and unlicensed spectrums, such as one or more communication links of the wireless communications system 100, 200, or 250 described with reference to FIG. 1, 2A, or 2B.

In some examples, the transmitter module 2020 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 2022 for communicating over the first spectrum, and an unlicensed spectrum transmitter module 2024 for communicating over the second spectrum. The transmitter module 2020, including the licensed spectrum transmitter module 2022 or the unlicensed spectrum transmitter module 2024, may be used to transmit various types of data or control signals (i.e., transmissions) over one or more communication links of the wireless communications system including the licensed spectrum and the unlicensed spectrum.

In some examples, the timing management module 2015 may be an example of one or more aspects of the timing management module 1315 described with reference to FIG. 13 and may include a CCA slot identification module 2025, a CCA module 2030, a timing transmission module 2035, or a timing reception module 2040.

In some examples, the CCA slot identification module 2025 may be used to identify a CCA slot assigned to the device 2005 for a frame of a shared spectrum. The frame may be a frame associated with time synchronization. In some cases, the frame may be one of a plurality of periodic sync frames. In some cases, a timing of the CCA slot assigned to the first base station may be delayed with respect to a CCA period associated with a CCA slot assigned to a base station having a timing stratum that is lower than a timing stratum of the first base station, as described, for example, with reference to FIG. 12.

In some examples, the CCA slot assigned to the first base station for a frame of the shared spectrum may be identified based on a timing stratum of the first base station In some examples, the CCA slot assigned to the first base station may occur earlier in a frame than one or more CCA slots associated with timing stratums that are higher than the timing stratum of the first base station (e.g., if the first base station is associated with a lower timing stratum and is a GPS source, or is associated with a timing stratum that is closer to a GPS source in a synchronization stratum than other base stations, the first base station may perform CCA in a CCA slot that occurs earlier in a frame than one or more other CCA slots). In general, base stations associated with lower timing stratums may be assigned CCA slots that occur earlier in a frame. However, when the first base station is associated with a higher stratum and the timing of the CCA slot assigned to the first base station is delayed with respect to a CCA period associated with a CCA slot assigned to a base station having a lower timing stratum, the delay may enable the first base station to gain access to the shared spectrum regardless of another base station gaining access to the shared spectrum during an earlier part of the frame.

In some examples, the CCA module 2030 may be used to perform a CCA at the CCA slot identified for the frame by the CCA slot identification module 2025.

In some examples (e.g., when the CCA is successful), the timing transmission module 2035 may be used to selectively transmit a first timing information of the device 2005.

In some examples (e.g., when the CCA is unsuccessful), the timing reception module 2040 may be used to listen for a second timing information of a second device (e.g., a second base station) during the frame. In some cases, the timing reception module 2040 may also listen for a third timing information of a third device during the frame (or listen for and receive additional timing information of additional devices). The second timing information and the third timing information (as well as other timing information) may in some cases be received concurrently.

Figure 21:
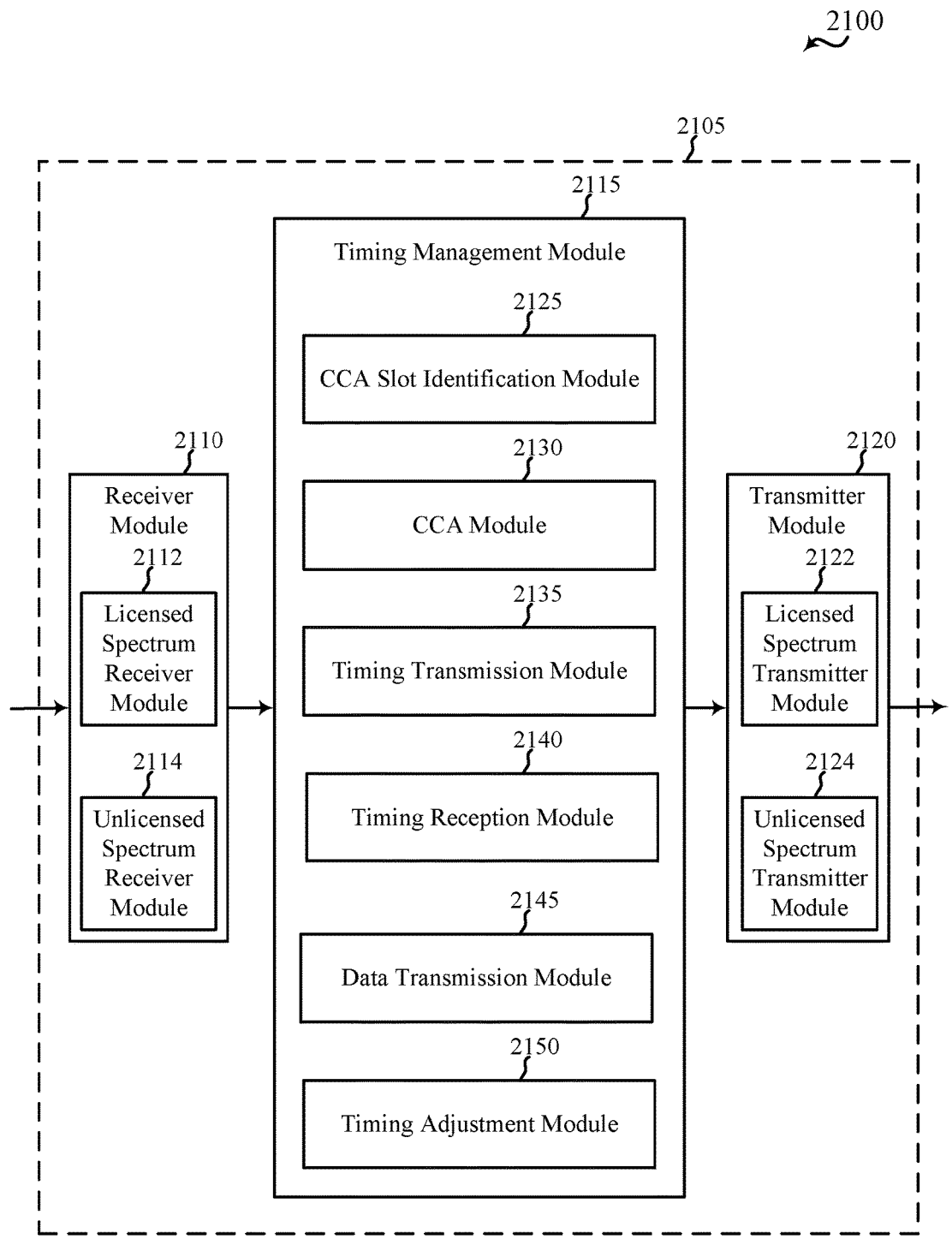
FIG. 21 shows a block diagram of an illustrative device for use in wireless communication, and more particularly CCA-based timing synchronization, in accordance with various aspects of the present disclosure.

FIG. 21 shows a block diagram 2100 of a device 2105 for use in wireless communication, in accordance with various aspects of the present disclosure. In some examples, the device 2105 may be an example of one or more aspects of one of the base stations 105 or 205 described with reference to FIG. 1 or 2, or the device 1305, 1905, or 2005 described with reference to FIG. 13, 19, or 20. The device 2105 may also be a processor. The device 2105 may include a receiver module 2110, a timing management module 2115, and a transmitter module 2120. Each of these components may be in communication with each other.

The components of the device 2105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2110 may be or include an RF receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The RF receiver may include separate receivers for the first spectrum and the second spectrum. The separate receivers may in some cases take the form of a licensed spectrum receiver module 2112 for communicating over the first spectrum, and an unlicensed spectrum receiver module 2114 for communicating over the second spectrum. The receiver module 2110, including the licensed spectrum receiver module 2112 or the unlicensed spectrum receiver module 2114, may be used to receive various types of data or control signals (i.e., transmissions) over one or more communication links of a wireless communications system including the licensed and unlicensed spectrums, such as one or more communication links of the wireless communications system 100, 200, or 250 described with reference to FIG. 1, 2A, or 2B.

In some examples, the transmitter module 2120 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 2122 for communicating over the first spectrum, and an unlicensed spectrum transmitter module 2124 for communicating over the second spectrum. The transmitter module 2120, including the licensed spectrum transmitter module 2122 or the unlicensed spectrum transmitter module 2124, may be used to transmit various types of data or control signals (i.e., transmissions) over one or more communication links of the wireless communications system including the licensed spectrum and the unlicensed spectrum.

In some examples, the timing management module 2115 may be an example of one or more aspects of the timing management module 1315 or 1915 described with reference to FIG. 13 or 19 and may include a CCA slot identification module 2125, a CCA module 2130, a timing transmission module 2135, a timing reception module 2140, a data transmission module 2145, or a timing adjustment module 2150.

In some examples, the CCA slot identification module 2125 may be used to identify a CCA slot assigned to the device 2105 for a frame of a shared spectrum. The frame may be associated with time synchronization, as described, for example, with reference to FIG. 11 or 12.

In some examples, the CCA slot assigned to the first base station for a frame of a shared spectrum may be identified based on a timing stratum of the first base station In some examples, the CCA slot assigned to the first base station may be earlier than one or more CCA slots associated with timing stratums that are higher than the timing stratum of the first base station (e.g., if the first base station is associated with a lower timing stratum and is a GPS source, or is associated with a timing stratum that is closer to a GPS source in a synchronization stratum than other base stations, the first base station may perform CCA in a CCA slot that occurs earlier than one or more other CCA slots).

In some examples, a CCA slot timing of the first base station may be delayed based on a timing stratum of the first base station, as described, for example, with reference to FIG. 12.

In some examples, the CCA module 2130 may be used to perform a CCA at the CCA slot identified for the frame by the CCA slot identification module 2125.

The timing transmission module 2135 may be an example of the timing transmission module 1935 or 2035 described with reference to FIG. 19 or 20. In some examples (e.g., when a CCA performed by the CCA module 2130 is successful), the timing transmission module 2135 may be used to selectively transmit a first timing information of the device 2105. The first timing information may in some cases be transmitted during at least one reference signal resource element of a frame for which CCA is successful.

The timing reception module 2140 may be an example of the timing reception module 1940 or 2040 described with reference to FIG. 19 or 20. In some examples (e.g., when a CCA performed by the CCA module 2130 is unsuccessful), the timing reception module 2140 may be used to listen for a second timing information of a second device (e.g., a second base station), during a frame for which CCA is successful, by listening for a channel usage beacon signal from the second device. In some cases, the timing reception module 2140 may also listen for a third timing information of a third base station during the frame (or listen for and receive additional timing information of additional base station). The second timing information and the third timing information (as well as other timing information) may in some cases be received concurrently.

The data transmission module 2145 may be used to transmit data to at least one UE during a frame for which CCA is successful. The data may in some cases be transmitted to the at least one UE concurrent with the transmission of the first timing information transmitted by the timing transmission module 2135.

The timing adjustment module 2150 may be used to adjust a timing of the device 2105 based on the second timing information. In some cases, the timing of the device 2105 may also be adjusted based on a third timing information received from a third device, or on timing information received from any number of devices. The timing information received from the third device may be received during the same or a different frame in which the second timing information is received.

In some examples, the timing adjustment module 2150 may determine a timing of the second device based on the second timing information, and the timing of the device 2105 may be adjusted by synchronizing the timing of the device 2105 to the timing of the second device.

Figure 22:
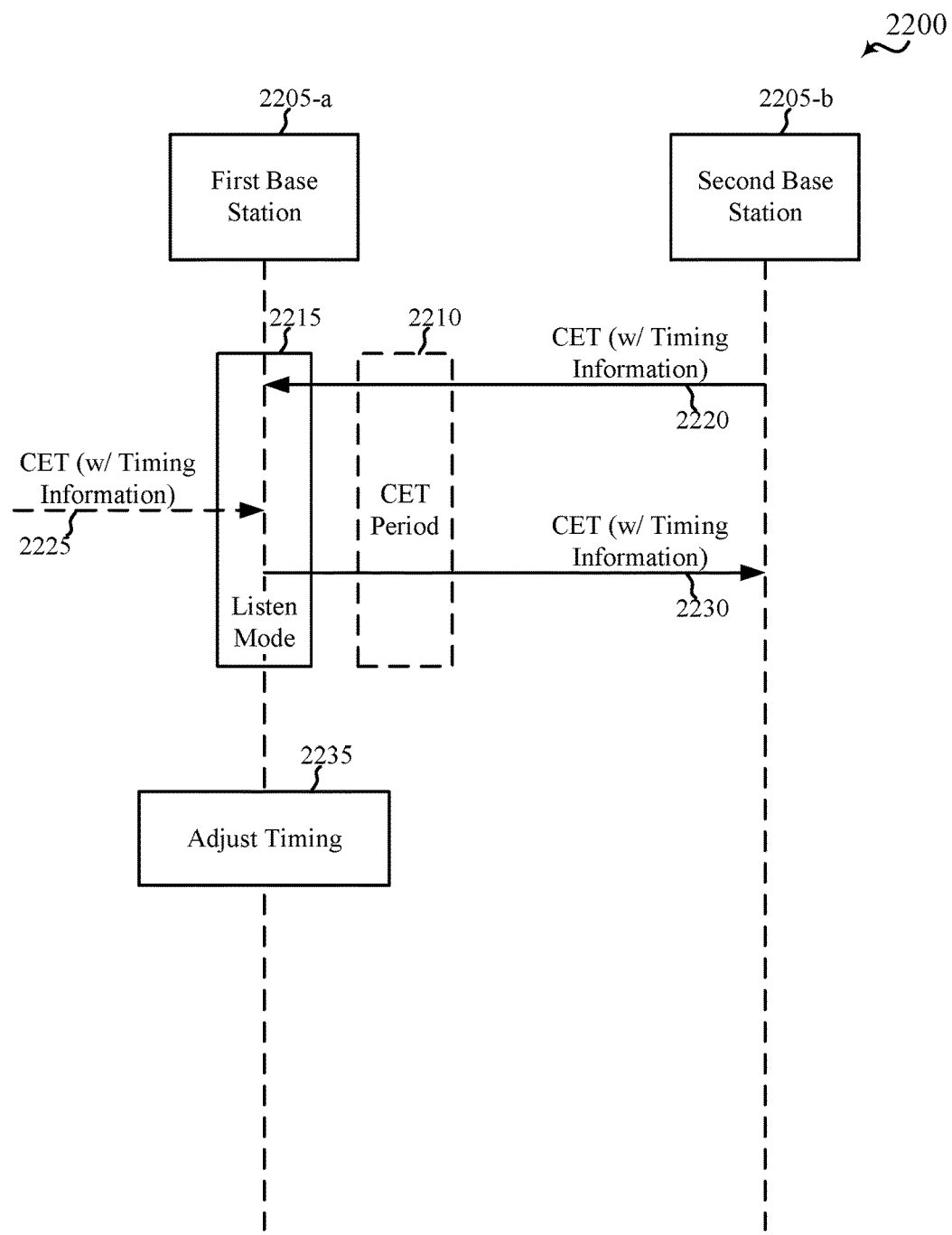
FIG. 22 is a message flow diagrams showing wireless communications between a first base station and a second base station, to exchange CET-based timing information, in accordance with various aspects of the present disclosure.

FIG. 22 is a message flow diagram 2200 illustrating wireless communication between a first base station 2205-a and a second base station 2205-b. The first base station 2205-a may in some cases be associated with a higher timing stratum (e.g., TS2) than the timing stratum (e.g., TS1) of the second base station 2205-b. In some cases, the first base station 2205-a and the second base station 2205-b may be members of a common PLMN. In other cases, the first base station 2205-a and the second base station 2205-b may be members of different PLMNs associated with different operators. The different PLMNs may be synchronized with each other.

In some examples, each of the first base station 2205-a or the second base station 2205-b may be an example of one or more aspects of the base station 105 or 205 described with reference to FIG. 1 or 2, or the device 1305, 1405, 1505, 1605, 1705, or 1805 described with reference to FIG. 13, 14, 15, 16, 17, or 18.

By way of example, the message flow may begin during a CET period 2210. During the CET period 2210, the first base station 2205-a may be in a listen mode 2215. While in the listen mode 2215, the first base station 2205-a may receive at least one CET indicating timing information of at least the second base station 2205-b over a shared spectrum. The at least one CET may also indicate a timing stratum of at least the second base station 2205-b. The at least one CET may include a CET 2220 of the second base station 2205-b.

As shown, the first base station 2205-a may in some cases receive a CET 2225 of a third base station or other base stations. The CET 2225 of the third base station may be received concurrently with, or at a different time than, the CET 2220 of the second base station 2205-b. The first base station 2205-a may also transmit its own CET 2230 during its listen mode 2215, which CET 2230 may indicate timing information of the first base station 2205-a over the shared spectrum as well as a timing stratum of the first base station 2205-a.

At block 2235, a timing of the first base station 2205-a may be adjusted based on the received timing information of at least the second base station 2205-b. In some cases, the timing adjustment may include synchronizing a timing of the first base station 2205-a to a timing of at least the second base station 2205-b based on the received timing information. The timing of the first base station 2205-a may also be synchronized with other base stations, such as the third base station.

Figure 23:
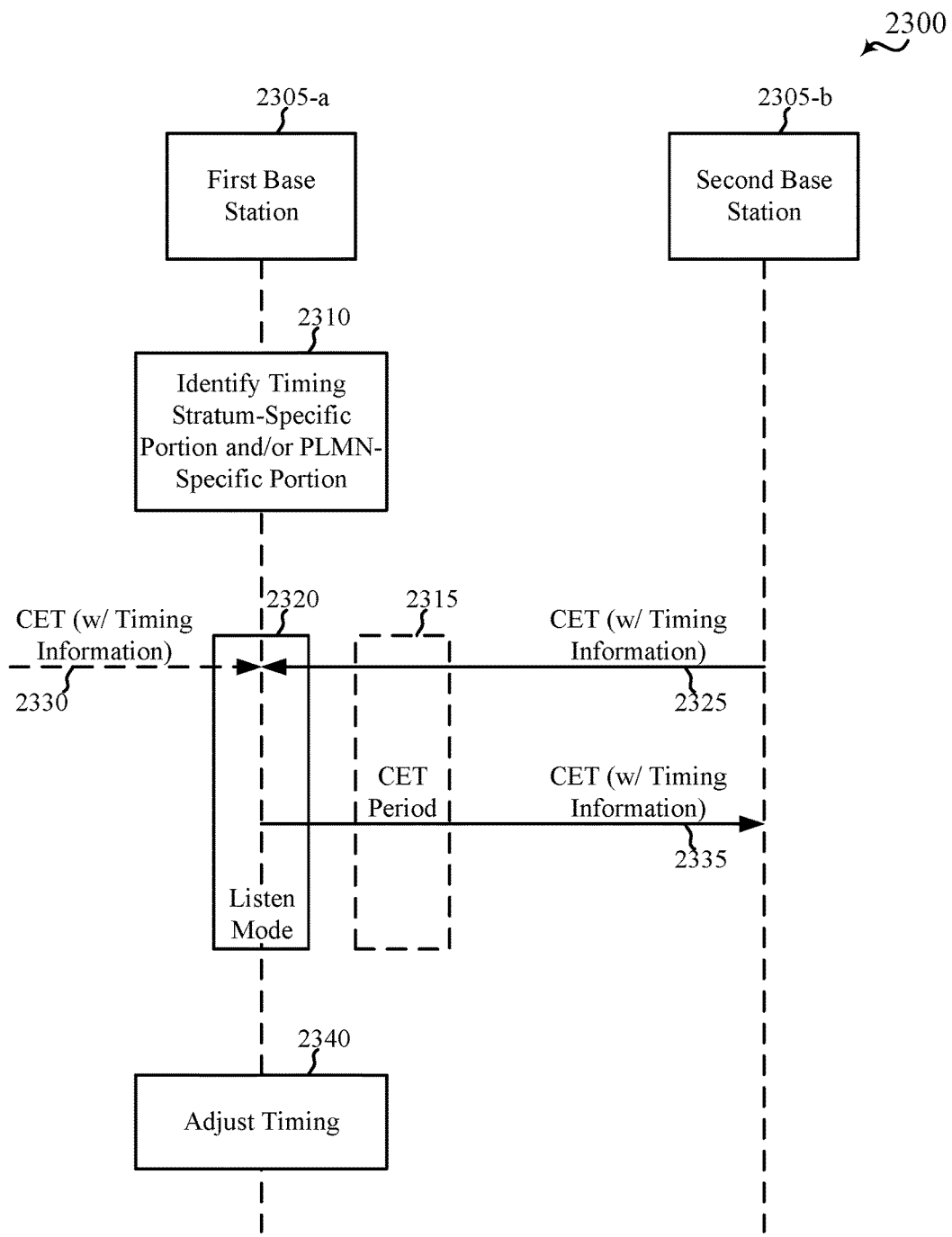
FIG. 23 is a message flow diagrams showing wireless communications between a first base station and a second base station, to exchange CET-based timing information, in accordance with various aspects of the present disclosure.

FIG. 23 is a message flow diagram 2300 illustrating wireless communication between a first base station 2305-a and a second base station 2305-b. The first base station 2305-a may in some cases be associated with a higher timing stratum (e.g., TS2) than the timing stratum (e.g., TS1) of the second base station 2305-b. In some cases, the first base station 2305-a and the second base station 2305-b may be members of a common PLMN. In other cases, the first base station 2305-a and the second base station 2305-b may be members of different PLMNs associated with different operators. The different PLMNs may be synchronized with each other.

In some examples, each of the first base station 2305-a or the second base station 2305-b may be an example of one or more aspects of the base station 105 or 205 described with reference to FIG. 1 or 2, or the device 1305, 1405, or 1505 described with reference to FIG. 13, 14, or 15.

By way of example, the message flow may begin at block 2310, with the first base station 2305-a identifying, within a CET period 2315, a timing stratum-specific portion associated with a timing stratum of the second base station 2305-b or a PLMN-specific portion associated with a PLMN of the second base station 2305-b (i.e., both a timing stratum-specific portion associated with the timing stratum of the second base station 2305-b and a PLMN-specific portion associated with the PLMN of the second base station 2305-b, when both are available). In some cases, the operation(s) at block 2310 may be performed during or after the listen mode 2320.

During the CET period 2315, the first base station 2305-a may be in a listen mode 2320. While in the listen mode 2320, the first base station 2305-a may receive at least one CET indicating timing information of at least the second base station 2305-b over a shared spectrum. The at least one CET may also indicate a timing stratum of at least the second base station 2305-b. The at least one CET may include a CET 2325 of the second base station 2305-b, which CET 2325 may be received during the timing stratum-specific portion and the PLMN-specific portion identified at block 2310.

As shown, the first base station 2305-a may in some cases receive a CET 2330 of a third base station or other base stations. The CET 2230 of the third base station may be received concurrently with, or at a different time than, the CET 2325 of the second base station. The first base station 2305-a may also transmit its own CET 2335 during its listen mode 2320, which CET 2335 may indicate timing information of the first base station 2305-a over the shared spectrum as well as a timing stratum of the first base station 2305-a.

At block 2340, a timing of the first base station 2305-a may be adjusted based on the received timing information of at least the second base station 2305-b. In some cases, the timing adjustment may include synchronizing the timing of the first base station 2305-a to a timing of at least the second base station 2305-b based on the received timing information. The timing of the first base station 2305-a may also be synchronized with other base stations, such as the third base station.

Figure 24:
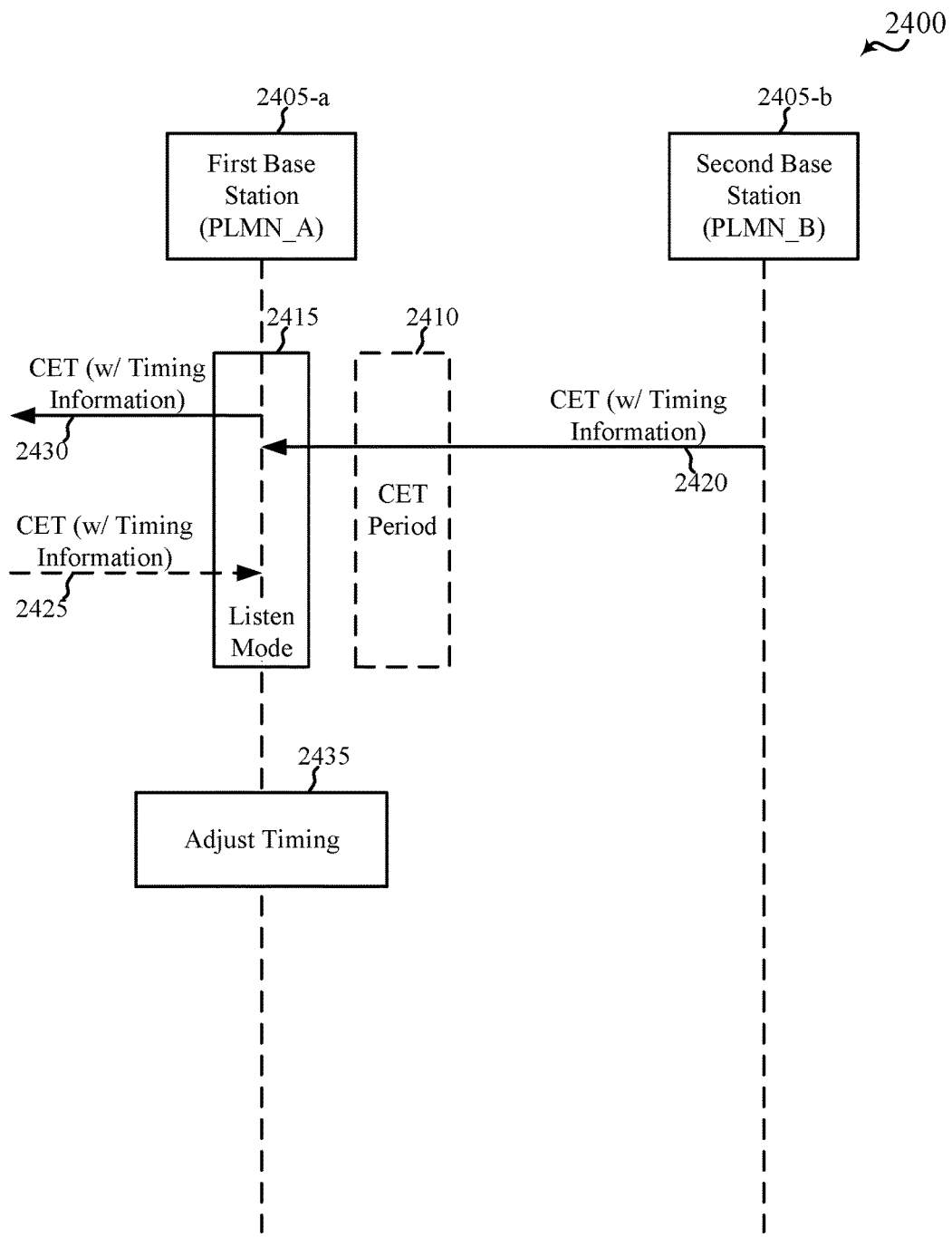
FIG. 24 is a message flow diagrams showing wireless communications between a first base station and a second base station, to exchange CET-based timing information, in accordance with various aspects of the present disclosure.

FIG. 24 is a message flow diagram 2400 illustrating wireless communication between a first base station 2405-a and a second base station 2405-b. The first base station 2405-a may in some cases be associated with a higher timing stratum (e.g., TS2) than the timing stratum (e.g., TS1) of the second base station 2405-b. In some cases, the first base station 2405-a may be a member of a PLMN_A and the second base station 2405-b may be a member of a PLMN_B. The different PLMNs may be synchronized with each other.

In some examples, each of the first base station 2405-a or the second base station 2405-b may be an example of one or more aspects of the base station 105 or 205 described with reference to FIG. 1 or 2, or the device 1305 or 1405 described with reference to FIG. 13 or 14.

By way of example, the message flow may begin during a CET period 2410. During the CET period 2410, the first base station 2405-a may be in a listen mode 2415. While in the listen mode 2415, the first base station 2405-a may receive at least one CET indicating timing information of at least the second base station 2405-b over a shared spectrum. The at least one CET may also indicate a timing stratum of at least the second base station 2405-b. The at least one CET may include a CET 2420 of the second base station 2405-b.

As shown, the first base station 2405-a may in some cases receive a CET 2425 of a third base station or other base stations. The CET 2425 of the third base station may be received concurrently with, or at a different time than, the CET 2420 of the second base station 2405-b. The first base station 2405-a may also transmit its own CET 2430 during its listen mode 2415, which CET 2430 may indicate timing information of the first base station 2405-a over the shared spectrum as well as a timing stratum of the first base station 2405-a.

At block 2435, a timing of the first base station 2405-a may be adjusted based on the received timing information of at least the second base station 2405-b. In some cases, the timing adjustment may include synchronizing a timing of the first base station 2405-a to a timing of at least the second base station 2405-b based on the received timing information. In this manner, the timing of a base station associated with one PLMN may be adjusted based on the timing of another base station associated with another PLMN. The timing of the first base station 2405-a may also be synchronized with other base stations, such as the third base station.

Figure 25:
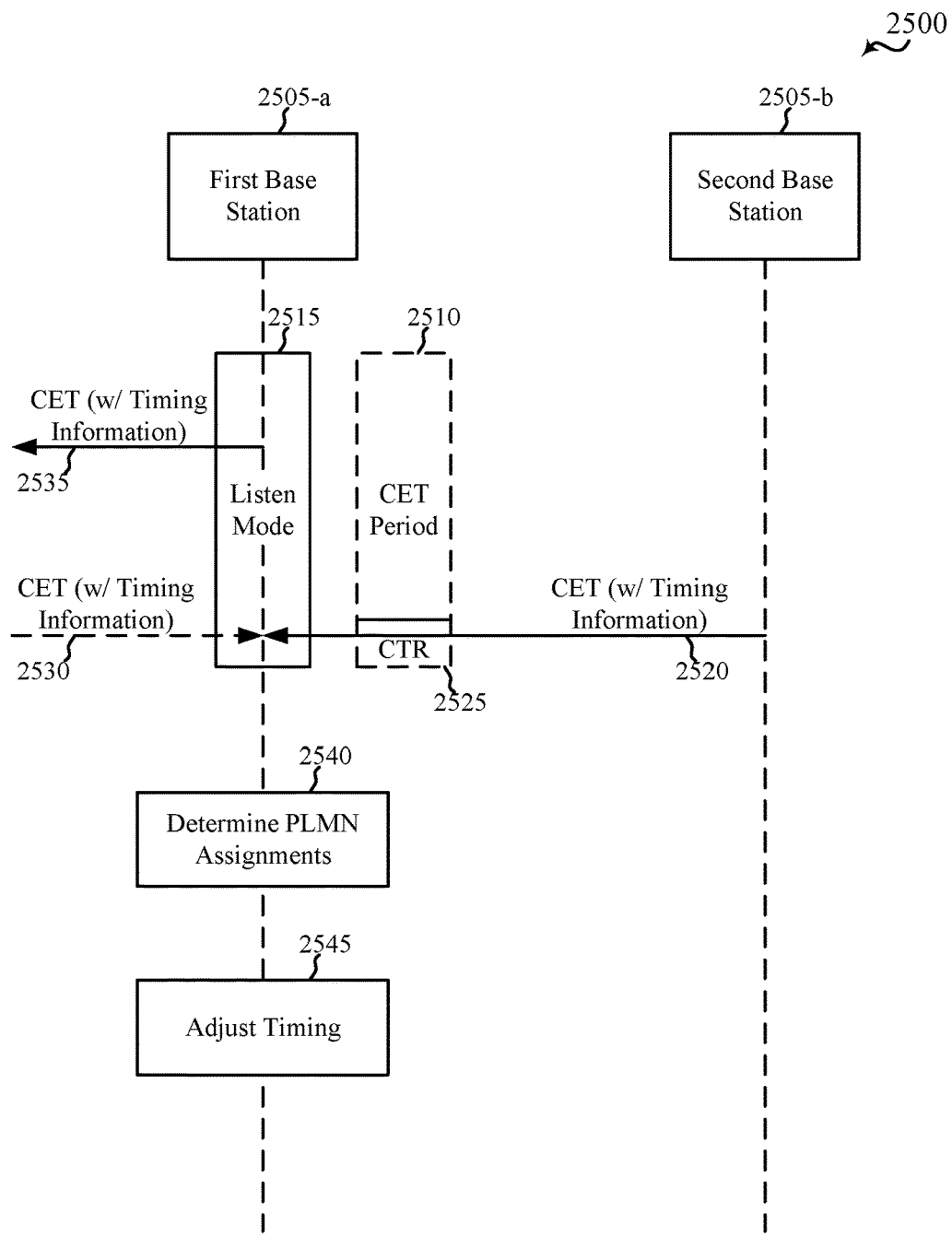
FIG. 25 is a message flow diagrams showing wireless communications between a first base station and a second base station, to exchange CET-based timing information, in accordance with various aspects of the present disclosure.

FIG. 25 is a message flow diagram 2500 illustrating wireless communication between a first base station 2505-a and a second base station 2505-b. The first base station 2505-a may in some cases be associated with a higher timing stratum (e.g., TS2) than the timing stratum (e.g., TS1) of the second base station 2505-b. In some cases, the first base station 2505-a and the second base station 2505-b may be members of a common PLMN. In other cases, the first base station 2505-a and the second base station 2505-b may be members of different PLMNs associated with different operators. The different PLMNs may be synchronized with each other.

In some examples, each of the first base station 2505-a or the second base station 2505-b may be an example of one or more aspects of the base station 105 or 205 described with reference to FIG. 1 or 2, or the device 1305, 1405, or 1605 described with reference to FIG. 13, 14, or 16.

By way of example, the message flow may begin during a CET period 2510. During the CET period 2510, the first base station 2505-a may be in a listen mode 2515. While in the listen mode 2515, the first base station 2505-a may receive at least one CET indicating timing information of at least the second base station 2505-b over a shared spectrum. The at least one CET may also indicate a timing stratum of at least the second base station 2505-b. The at least one CET may include a CET 2520 of the second base station 2505-b, which CET 2520 may be received during one of a plurality of PLMN-specific regions of a CET period 2510 or during a common transmission region 2525 of the CET period 2510. By way of example, the CET 2520 is shown to be received during the common transmission region 2525.

As shown, the first base station 2505-a may in some cases receive a CET 2530 of a third base station or other base stations. The CET 2530 of the third base station may be received concurrently with, or at a different time than, the CET 2520 of the second base station 2505-b. The first base station 2505-a may also transmit its own CET 2535 during its listen mode 2515, which CET 2535 may indicate timing information of the first base station 2505-a over the shared spectrum as well as a timing stratum of the first base station 2505-a.

At block 2540, the first base station 2505-a may determine PLMN assignments of the PLMN-specific regions or common transmission region 2525 of the CET period 2510. The determination may include a determination of which PLMN-specific region is assigned to the PLMN of the second base station 2505-b, as well as a determination of whether the common transmission region 2525 is assigned to the PLMN of the second base station 2505-b. In some cases, it may be determined (e.g., inferred) that the common transmission region 2525 is assigned to the PLMN of the second base station 2505-b based on an assignment of a PLMN-specific region having a particular time rank (e.g., the last PLMN-specific region in time rank order) to the PLMN of the second base station 2505-b for the particular CET period 2510. In some cases, the operation(s) at block 2540 may be performed before or during the listen mode 2515.

At block 2545, a timing of the first base station 2505-a may be adjusted based on the received timing information of at least the second base station 2505-b. In some cases, the timing adjustment may include synchronizing the timing of the first base station 2505-a to a timing of at least the second base station 2505-b based on the received timing information. The timing of the first base station 2505-a may also be synchronized with other base stations, such as the third base station.

Figure 26:
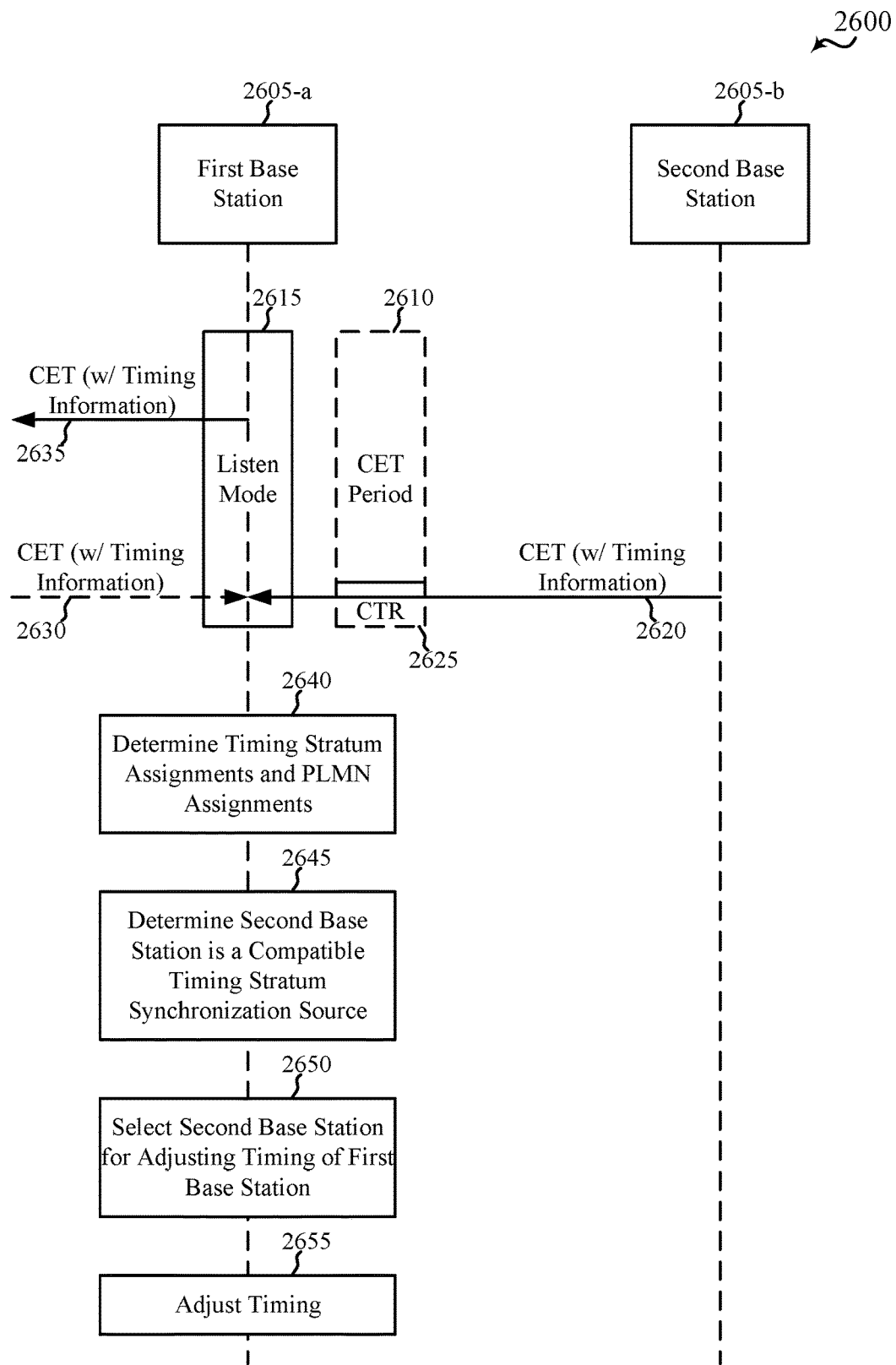
FIG. 26 is a message flow diagrams showing wireless communications between a first base station and a second base station, to exchange CET-based timing information, in accordance with various aspects of the present disclosure.

FIG. 26 is a message flow diagram 2600 illustrating wireless communication between a first base station 2605-a and a second base station 2605-b. The first base station 2605-a may in some cases be associated with a higher timing stratum (e.g., TS2) than the timing stratum (e.g., TS1) of the second base station 2605-b. In some cases, the first base station 2605-a and the second base station 2605-b may be members of a common PLMN. In other cases, the first base station 2605-a and the second base station 2605-b may be members of different PLMNs associated with different operators. The different PLMNs may be synchronized with each other.

In some examples, each of the first base station 2605-a or the second base station 2605-b may be an example of one or more aspects of the base station 105 or 205 described with reference to FIG. 1 or 2, or the device 1305, 1405, or 1705 described with reference to FIG. 13, 14, or 17.

By way of example, the message flow may begin during a CET period 2610. During the CET period 2610, the first base station 2605-a may be in a listen mode 2615. While in the listen mode 2615, the first base station 2605-a may receive at least one CET indicating timing information of at least the second base station 2605-b over a shared spectrum. The at least one CET may also indicate a timing stratum of at least the second base station 2605-b. The at least one CET may include a CET 2620 of the second base station 2605-b, which CET 2620 may be received during one of a plurality of PLMN-specific regions of a CET period 2610 or during a common transmission region 2625 of the CET period 2610. By way of example, the CET 2620 is shown to be received during the common transmission region 2625.

As shown, the first base station 2605-a may in some cases receive a CET 2630 of a third base station or other base stations. The CET 2630 of the third base station may be received concurrently with, or at a different time than, the CET 2620 of the second base station 2605-b. The first base station 2605-a may also transmit its own CET 2635 during its listen mode 2615, which CET 2635 may indicate timing information of the first base station 2605-*a* over the shared spectrum as well as a timing stratum of the first base station 2605-*a*.

At block 2640, the first base station 2605-*a* may determine PLMN assignments of the PLMN-specific regions or PLMN and timing stratum assignments of the common transmission region 2625 of the CET period 2610. The determinations may include a determination of which PLMN-specific region is assigned to the PLMN of the second base station 2605-*b*, as well as a determination of whether the common transmission region 2625 is assigned to the timing stratum and PLMN of the second base station 2605-*b*. In some cases, it may be determined (e.g., inferred) that the common transmission region 2625 is assigned to the PLMN of the second base station 2605-*b* based on an assignment of a PLMN-specific region having a particular time rank (e.g., the last PLMN-specific region in time rank order) to the PLMN of the second base station 2605-*b* for the particular CET period 2610.

At block 2645, the first base station 2605-*a* may determine that the second base station 2605-*b* includes a compatible timing stratum synchronization source for the first base station 2605-*a*. In some cases, the second base station 2605-*b* may be determined to include a compatible timing stratum synchronization source because the timing stratum associated with the second base station 2605-*b* is a lower stratum than the timing stratum associated with the first base station 2605-*a*. In some cases, the second base station 2605-*b* may be determined to include a compatible timing stratum synchronization source because the timing stratum associated with the second base station 2605-*b* is a next lower stratum than the timing stratum associated with the first base station 2605-*a*.

At block 2650, the second base station 2605-*b* may be selected as a basis for adjusting the timing of the first base station 2605-*a*. The second base station 2605-*b* may be selected in response to the determination(s) made at block 2645.

In some cases, the operation(s) at block 2640 or block 2645 may be performed before or during the listen mode 2615.

At block 2655, a timing of the first base station 2605-*a* may be adjusted based on the received timing information of at least the second base station 2605-*b*. In some cases, the timing adjustment may include synchronizing the timing of the first base station 2605-*a* to a timing of at least the second base station 2605-*b* based on the received timing information. The timing of the first base station 2605-*a* may also be synchronized with other base stations, such as the third base station.

Figure 27:
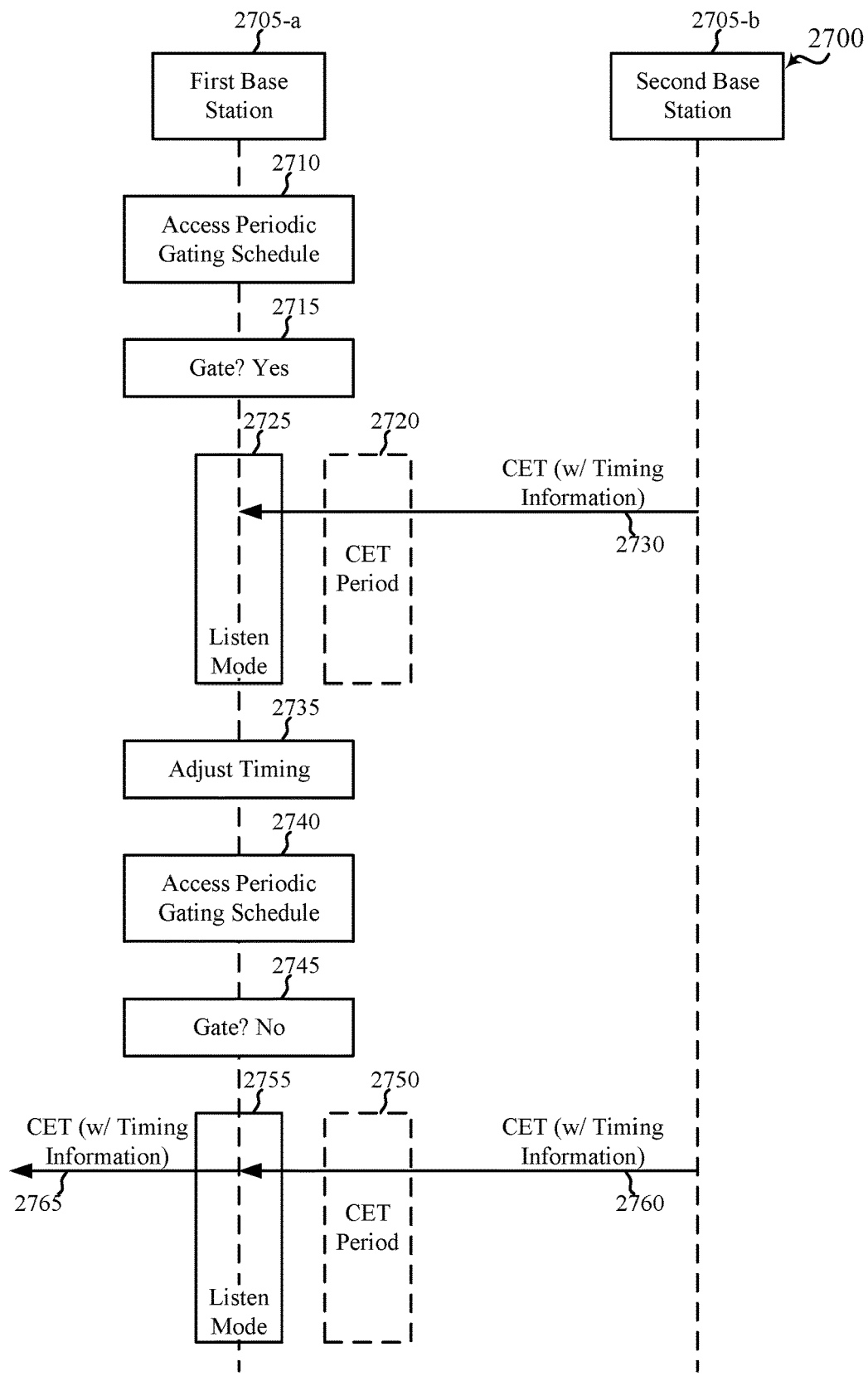
FIG. 27 is a message flow diagrams showing wireless communications between a first base station and a second base station, to exchange CET-based timing information, in accordance with various aspects of the present disclosure.

FIG. 27 is a message flow diagram 2700 illustrating wireless communication between a first base station 2705-*a* and a second base station 2705-*b*. The first base station 2705-*a* may in some cases be associated with a higher timing stratum (e.g., TS2) than the timing stratum (e.g., TS1) of the second base station 2705-*b*. In some cases, the first base station 2705-*a* and the second base station 2705-*b* may be members of a common PLMN. In other cases, the first base station 2705-*a* and the second base station 2705-*b* may be members of different PLMNs associated with different operators. The different PLMNs may be synchronized with each other.

In some examples, each of the first base station 2705-*a* or the second base station 2705-*b* may be an example of one or more aspects of the base station 105 or 205 described with reference to FIG. 1 or 2, or the device 1305, 1405, or 1805 described with reference to FIG. 13, 14, or 18.

The message flow diagram 2700 presumes that the first base station 2705-*a* and the second base station 2705-*b* share a periodic CET timing. Because of the shared CET timing, the transmission of a CET by the first base station 2705-*a* may interfere with the first base station's receipt of a CET of the second base station 2705-*b* (e.g., because the respective CETs may be received and transmitted concurrently).

By way of example, the message flow may begin at block 2710 with the first base station 2705-*a* accessing a periodic gating schedule to determine whether a CET of the first base station 2705-*a* should be gated (i.e., not transmitted) during a next CET period 2720. The periodic gating schedule may indicate particular CET period(s) in which the CET of the first base station 2705-*a* should be gated to mitigate interference with the first base station's receipt of a CET of at least the second base station 2705-*b*. At block 2715, it may be determined that the CET of the first base station 2705-*a* should be gated during the next CET period 2720.

During the next CET period 2720, the first base station 2705-*a* may be in a listen mode 2725. While in the listen mode 2725, the first base station 2705-*a* may receive at least one CET indicating timing information of at least the second base station 2705-*b* over a shared spectrum. The at least one CET may also indicate a timing stratum of at least the second base station 2705-*b*. The at least one CET may include a CET 2730 of the second base station 2705-*b*.

The first base station 2705-*a* may in some cases receive a CET of a third base station or other base stations during the CET period 2720. The CET of the third base station may be received concurrently with, or at a different time than, the CET 2730 of the second base station 2705-*b*.

At block 2735, a timing of the first base station 2705-*a* may be adjusted based on the received timing information of at least the second base station 2705-*b*. In some cases, the timing adjustment may include synchronizing a timing of the first base station 2705-*a* to a timing of at least the second base station 2705-*b* based on the received timing information. The timing of the first base station 2705-*a* may also be synchronized with other base stations, such as the third base station.

At block 2740, the first base station 2705-*a* may once again access the periodic gating schedule to determine whether a CET of the first base station 2705-*a* should be gated (i.e., not transmitted) during a next CET period 2750. At block 2745, it may be determined that the CET of the first base station 2705-*a* should be gated during the next CET period 2750.

During the next CET period 2750, the first base station 2705-*a* may be in a listen mode 2755. While in the listen mode 2755, the first base station 2705-*a* may receive at least one CET indicating timing information of at least the second base station 2705-*b* over a shared spectrum. The at least one CET may also indicate a timing stratum of at least the second base station 2705-*b*. The at least one CET may include a CET 2760 of the second base station 2705-*b*. Concurrent with its receipt of the CET 2760, the first base station 2705-*a* may transmit its own CET 2765.

The first base station 2705-*a* may in some cases receive a CET of a third base station or other base stations during the CET period 2750. The CET of the third base station may be received concurrently with, or at a different time than, the CET 2760 of the second base station 2705-*b*.

Figure 28:
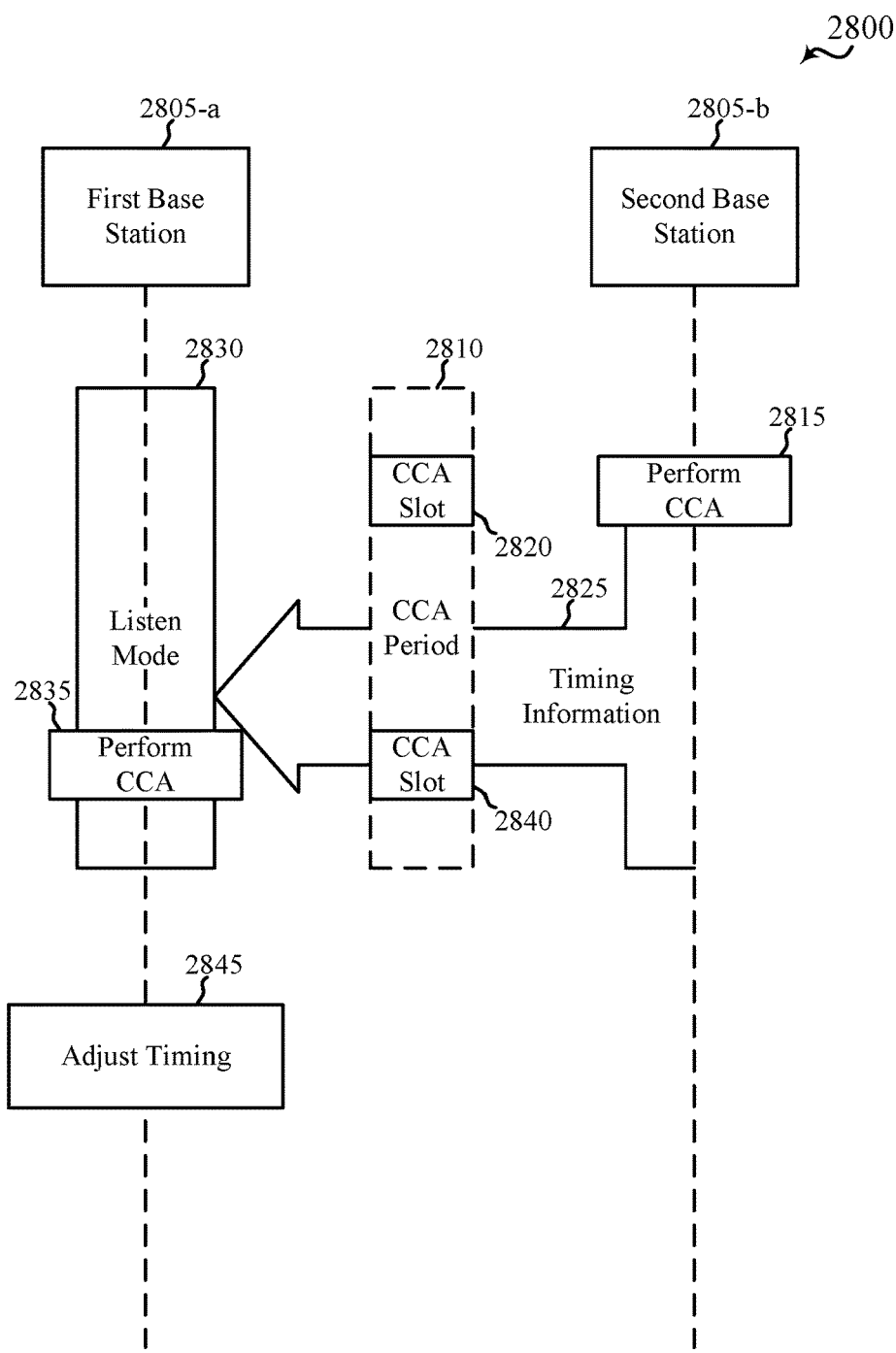
FIG. 28 is a message flow diagram illustrating wireless communication between a first base station and a second base station, to exchange CCA-based timing information, in accordance with various aspects of the present disclosure.

FIG. 28 is a message flow diagram 2800 illustrating wireless communication between a first base station 2805-*a* and a second base station 2805-*b*. The first base station 2805-*a* may in some cases be associated with a higher timing stratum (e.g., TS2) than the timing stratum (e.g., TS1) of the second base station 2805-*b*. In some cases, the first base station 2805-*a* and the second base station 2805-*b* may be members of a common PLMN. In other cases, the first base station 2805-*a* and the second base station 2805-*b* may be members of different PLMNs associated with different operators. The different PLMNs may be synchronized with each other.

In some examples, each of the first base station 2805-*a* or the second base station 2805-*b* may be an example of one or more aspects of the base station 105 or 205 described with reference to FIG. 1 or 2, or the device 1305, 1905, 2005, or 2105 described with reference to FIG. 13, 19, 20, or 21.

Prior to or during a CCA period 2810, the first base station 2805-*a* may identify a CCA slot 2840 for performing a CCA for the CCA period 2810, and the second base station 2805-*b* may identify a CCA slot 2820 for performing a CCA for the CCA period 2810. The CCA slots 2840 and 2820 may be identified based on the respective timing stratums of the first and second base stations 2805-*a*, 2805-*b*, and may be used for purposes of time or frequency synchronization over a shared spectrum. All base stations sharing a particular timing stratum may perform CCA in a CCA slot associated with the particular timing stratum.

By way of example, the message flow begins with the second base station 2805-*b* performing its CCA, at block 2815, during the CCA slot 2820 of the CCA period 2810. Upon a successful CCA, the second base station 2805-*b* may transmit timing information 2825, which timing information 2825 may be received by the first base station 2805-*a* while in a listen mode 2830.

While in the listen mode 2830, the first base station 2805-*a* may perform a CCA in a CCA slot 2840 of the CCA period 2810. However, because the second base station 2805-*b* successfully performed a CCA in CCA slot 2820 of the CCA period 2810, before CCA was performed during the CCA slot 2840, the CCA performed during the CCA slot 2840 may be unsuccessful.

At block 2845, a timing of the first base station 2805-*a* may be adjusted based on the received timing information of at least the second base station 2805-*b*. In some cases, the timing adjustment may include synchronizing a timing of the first base station 2805-*a* to a timing of at least the second base station 2805-*b* based on the received timing information. The timing of the first base station 2805-*a* may also be synchronized with other base stations, including base stations that perform a CCA in the CCA slot 2820 or base stations that successfully perform CCA and transmit timing information in other CCA periods.

Figure 29:
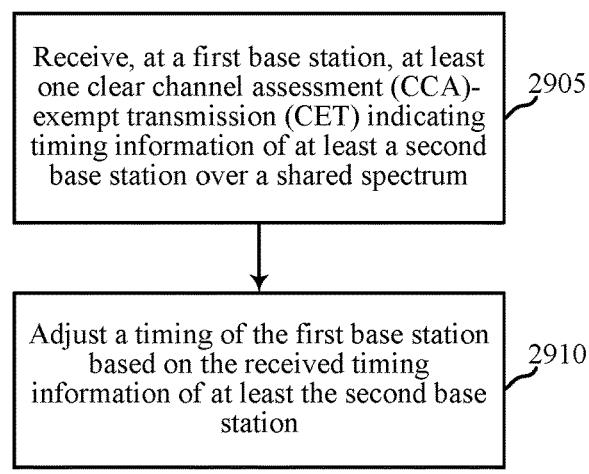
FIG. 29 is a flow chart showing an illustrative method of wireless communication, and more particularly a CET-based method usable for timing synchronization, in accordance with various aspects of the present disclosure.

FIG. 29 is a flow chart illustrating an example of a method 2900 of wireless communication, in accordance with various aspects of the present disclosure. For clarity, the method 2900 is described below with reference to aspects of one or more of the base stations 105 or 205 described with reference to FIG. 1, 2A, or 2B, or one of the devices 1305, 1405, 1505, 1605, 1705, or 1805 described with reference to FIG. 13, 14, 15, 16, 17, or 18. In some examples, a base station or device such as one of the base stations 105 or 205 or one of the devices 1305, 1405, 1505, 1605, 1705, or 1805 may execute one or more sets of codes to control the functional elements of the device to perform the functions described below.

At block 2905, at least one CET may be received at a first base station. The at least one CET may indicate timing information of at least a second base station over a shared spectrum. The at least one CET may also indicate a timing stratum of at least the second base station. The operation(s) at block 2905 may be performed by the timing management module 1315, 1415, 1515, 1615, 1715, or 1815 described with reference to FIG. 13, 14, 15, 16, 17, or 18, or the CET timing information analysis module 1425, 1525, 1625, 1725, or 1825 described with reference to FIG. 14, 15, 16, 17, or 18.

At block 2910, a timing of the first base station may be adjusted based on the received timing information of at least the second base station. The operation(s) at block 2910 may be performed by the timing management module 1315, 1415, 1515, 1615, 1715, or 1815 described with reference to FIG. 13, 14, 15, 16, 17, or 18, or the timing adjustment module 1430, 1530, 1630, 1730, or 1830 described with reference to FIG. 14, 15, 16, 17, or 18.

In some examples, the at least one CET may be received during a CET period.

In some examples, the timing adjustment made at block 2910 may include synchronizing a timing of the first base station to a timing of at least the second based station based on the received timing information.

In some examples, the at least one CET received at block 2905 may include a first CET indicating the timing information of the second base station over the shared spectrum and a second CET indicating timing information of a third base station over the shared spectrum. The first CET and the second CET may be received at the first base station concurrently or at different times.

In some examples, the at least one CET may further indicate timing information for a third base station over the shared spectrum. In these examples, the timing of the first base station may in some cases be adjusted based on the timing information of the second base station and the timing information of the third base station. More generally, the timing of the first base station may be adjusted based on the timing information of any number of base stations.

In some cases, the first base station and the second base station may be members of a common PLMN. In other cases, the first base station and the second base station may be members of different PLMNs associated with different operators. The different PLMNs may be synchronized with each other.

In some examples, the first base station may transmit its own CET. The CET of the first base station may indicate timing information of the first base station over the shared spectrum, as well as provide an indication of the timing stratum of the first base station.

In some examples, the at least one CET may be received during a particular CET period of a plurality of periodically scheduled CET periods. Each of the CET periods may include at least one PLMN-specific region and a common transmission region. In some cases, the timing information of at least the second base station may be received during the common transmission region of the particular CET period, or a CET of the first base station may be transmitted during the common transmission region.

Thus, the method 2900 may provide for wireless communication. It should be noted that the method 2900 is just one implementation and that the operations of the method 2900 may be rearranged or otherwise modified such that other implementations are possible.

Figure 30:
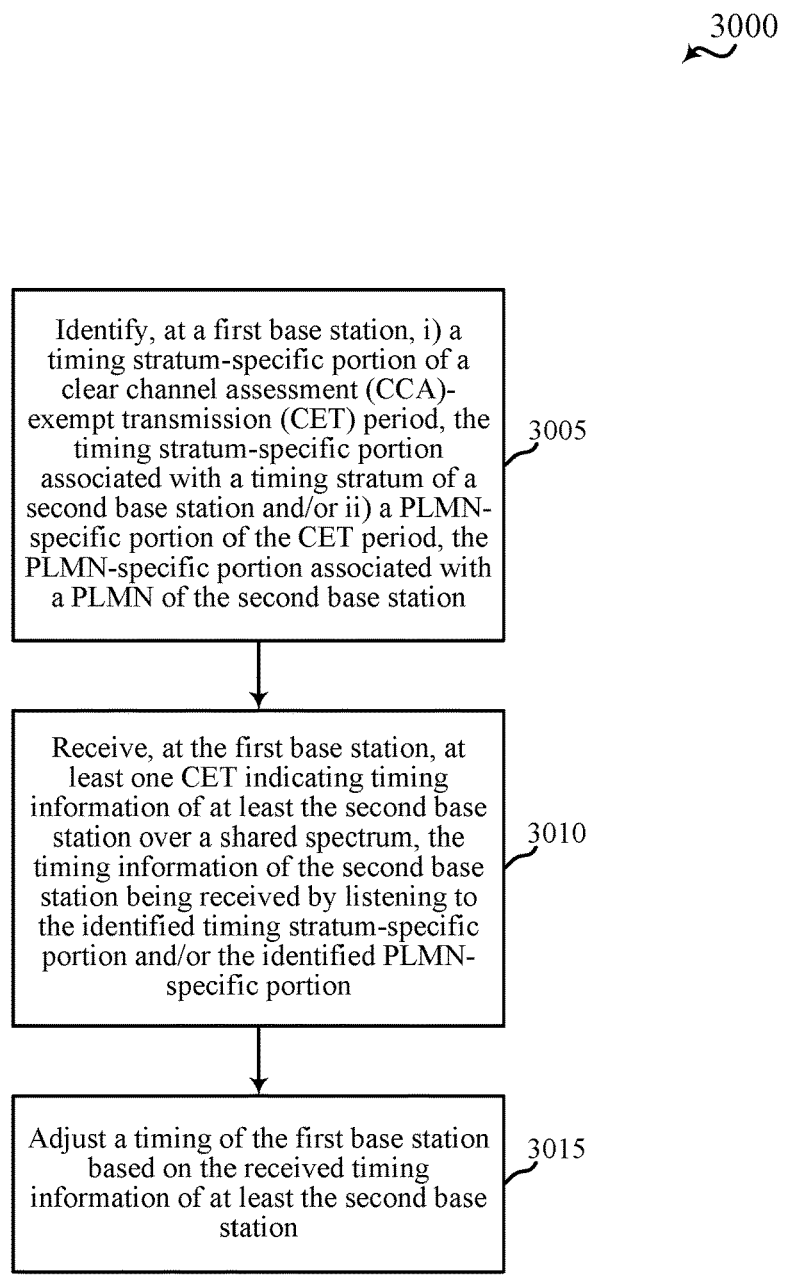
FIG. 30 is a flow chart showing an illustrative method of wireless communication, and more particularly a CET-based method usable for timing synchronization, in accordance with various aspects of the present disclosure.

FIG. 30 is a flow chart illustrating an example of a method 3000 of wireless communication, in accordance with various aspects of the present disclosure. For clarity, the method 3000 is described below with reference to aspects of one or more of the base stations 105 or 205 described with reference to FIG. 1, 2A, or 2B, or one of the devices 1305, 1405, or 1505 described with reference to FIG. 13, 14, or 15. In some examples, a base station or device such as one of the base stations 105 or 205 or one of the devices 1305, 1405, or 1505 may execute one or more sets of codes to control the functional elements of the device to perform the functions described below.

The method 3000 presumes that CETs are transmitted or received during a CET period, as described with reference to FIG. 8. The CET period may include a plurality of timing stratum-specific portions or a plurality of PLMN-specific portions. When a CET period includes a plurality of timing stratum-specific portions, each of the timing stratum-specific portions may be assigned to one of a plurality of timing stratums. The timing stratums may include a timing stratum associated with a second base station. When a CET period includes a plurality of PLMN-specific portions, each of the PLMN-specific portions may be assigned to one of a plurality of PLMNs. The plurality of PLMNs may include a PLMN associated with the second base station.

At block 3005, and for the CET period, a first base station may identify a timing stratum-specific portion associated with a timing stratum of a second base station or a PLMN-specific portion associated with a PLMN of the second base station (i.e., both a timing stratum-specific portion associated with the timing stratum of the second base station and a PLMN-specific portion associated with the PLMN of the second base station, when both are available). The operation(s) at block 3005 may be performed by the timing management module 1315, 1415, or 1515 described with reference to FIG. 13, 14, or 15, the CET timing information analysis module 1425 or 1525 described with reference to FIG. 14 or 15, or the CET period portion identification module 1540 described with reference to FIG. 15.

In some examples, the timing stratum-specific portion associated with the timing stratum of the second base station or the PLMN-specific portion associated with the PLMN of the second base station may be identified because the timing stratum associated with the second base station is a lower stratum than the timing stratum associated with the first base station. In some cases, the timing stratum associated with the second base station may be a next lower stratum than the timing stratum associated with the first base station.

At block 3010, at least one CET may be received at the first base station. Each of the at least one CET may be received during a timing stratum-specific portion or a PLMN-specific portion of the CET period. The at least one CET may indicate timing information of at least the second base station over a shared spectrum. The at least one CET may also indicate a timing stratum of at least the second base station. The timing information of the second base station may be received by listening to the identified timing stratum-specific portion or the identified PLMN-specific portion (i.e., both the timing stratum-specific portion associated with the timing stratum of the second base station and the PLMN-specific portion associated with the PLMN of the second base station, when both are available).

The operation(s) at block 3010 may be performed by the timing management module 1315, 1415, or 1515 described with reference to FIG. 13, 14, or 15, or the CET timing information analysis module 1425 or 1525 described with reference to FIG. 14 or 15.

At block 3015, a timing of the first base station may be adjusted based on the received timing information of at least the second base station. The operation(s) at block 3015 may be performed by the timing management module 1315, 1415, or 1515 described with reference to FIG. 13, 14, or 15, or the timing adjustment module 1430 or 1530 described with reference to FIG. 14 or 15.

In some examples, the timing adjustment made at block 3015 may include synchronizing a timing of the first base station to a timing of at least the second based station based on the received timing information.

In some examples, the at least one CET received at block 3010 may include a first CET indicating the timing information of the second base station over the shared spectrum and a second CET indicating timing information of a third base station over the shared spectrum. The first CET and the second CET may be received at the first base station concurrently (e.g., in the same timing stratum-specific portion or PLMN-specific portion of a CET period (i.e., both the same timing stratum-specific portion and PLMN-specific portion, when both are available)) or at different times (e.g., in different timing stratum-specific portions or different PLMN-specific portions).

In some examples, the at least one CET may further indicate timing information for a third base station over the shared spectrum. In these examples, the timing of the first base station may in some cases be adjusted based on the timing information of the second base station and the timing information of the third base station. More generally, the timing of the first base station may be adjusted based on the timing information of any number of base stations.

In some examples, the first base station may transmit its own CET. The CET of the first base station may indicate timing information of the first base station over the shared spectrum, as well as provide an indication of the timing stratum of the first base station.

Thus, the method 3000 may provide for wireless communication. It should be noted that the method 3000 is just one implementation and that the operations of the method 3000 may be rearranged or otherwise modified such that other implementations are possible.

Figure 31:
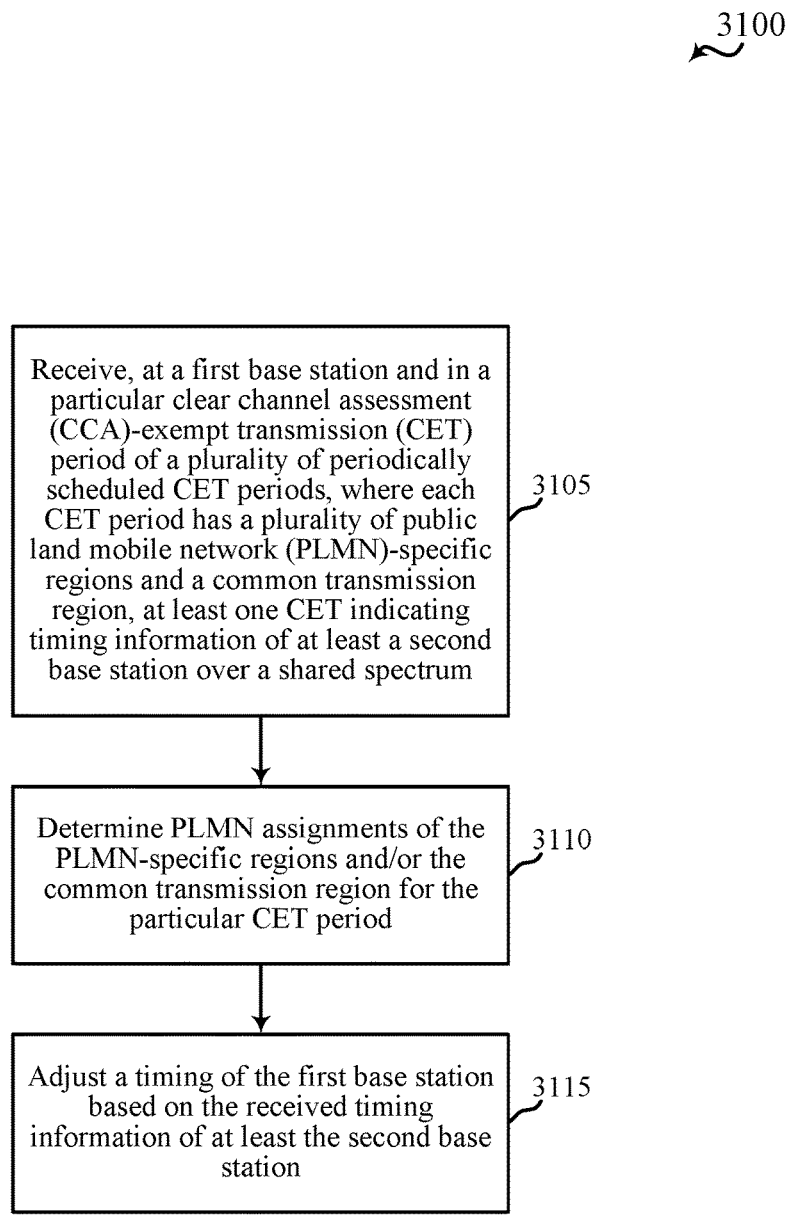
FIG. 31 is a flow chart showing an illustrative method of wireless communication, and more particularly a CET-based method usable for timing synchronization, in accordance with various aspects of the present disclosure.

FIG. 31 is a flow chart illustrating an example of a method 3100 of wireless communication, in accordance with various aspects of the present disclosure. For clarity, the method 3100 is described below with reference to aspects of one or more of the base stations 105 or 205 described with reference to FIG. 1, 2A, or 2B, or one of the devices 1305, 1405, or 1605 described with reference to FIG. 13, 14, or 16. In some examples, a base station or device such as one of the base stations 105 or 205 or one of the devices 1305, 1405, or 1605 may execute one or more sets of codes to control the functional elements of the device to perform the functions described below.

The method 3100 presumes that CETs are transmitted or received during a CET period. The CET period may be one of a plurality of periodically scheduled CET periods, in which each of the plurality of periodically scheduled CET periods may include a plurality of PLMN-specific regions and a common transmission region, as described with reference to FIG. 10. The PLMN-specific regions of each CET period may have a time rank order, and PLMN-specific regions of different time rank may be assigned to different PLMNs in different CET periods. Likewise, the common transmission regions of different CET periods may be assigned to different PLMNs in different CET periods. In some cases, the PLMN-specific regions or the common transmission regions may be assigned to different PLMNs in different CET periods on a rotating basis.

At block 3105, at least one CET may be received at a first base station. The at least one CET may be received during a particular CET period of the plurality of periodically scheduled CET periods. The at least one CET may indicate timing information of at least a second base station over a shared spectrum. The at least one CET may also indicate a timing stratum of at least the second base station. In some cases, the timing information of at least the second base station may be received during one of the PLMN-specific regions. In other cases, the timing information of at least the second base station may be received during the common transmission region. The operation(s) at block 3105 may be performed by the timing management module 1315, 1415, or 1615 described with reference to FIG. 13, 14, or 16, or the CET timing information analysis module 1425 or 1625 described with reference to FIG. 14 or 16.

At block 3110, the PLMN assignments of the PLMN-specific regions or common transmission region may be determined for a particular CET period. The determination may include a determination of which PLMN-specific region is assigned to the PLMN of the second base station, as well as a determination of whether the common transmission region is assigned to the PLMN of the second base station. In some cases, it may be determined (e.g., inferred) that the common transmission region is assigned to the PLMN of the second base station based on an assignment of a PLMN-specific region having a particular time rank (e.g., the last PLMN-specific region in time rank order) to the PLMN of the second base station for the particular CET period. The operation(s) at block 3110 may be performed by the timing management module 1315, 1415, or 1615 described with reference to FIG. 13, 14, or 16, the CET timing information analysis module 1425 or 1625 described with reference to FIG. 14 or 16, or the PLMN assignment determination module 1640 described with reference to FIG. 16.

At block 3115, a timing of the first base station may be adjusted based on the received timing information of at least the second base station. The operation(s) at block 3115 may be performed by the timing management module 1315, 1415, or 1615 described with reference to FIG. 13, 14, or 16, or the timing adjustment module 1430 or 1630 described with reference to FIG. 14 or 16.

In some examples, the timing adjustment made at block 3115 may include synchronizing a timing of the first base station to a timing of at least the second based station based on the received timing information.

In some examples, the at least one CET received at block 3110 may include a first CET indicating the timing information of the second base station over the shared spectrum and a second CET indicating timing information of a third base station over the shared spectrum. The first CET and the second CET may be received at the first base station concurrently or at different times.

In some examples, the at least one CET may further indicate timing information for a third base station over the shared spectrum. In these examples, the timing of the first base station may in some cases be adjusted based on the timing information of the second base station and the timing information of the third base station. More generally, the timing of the first base station may be adjusted based on the timing information of any number of base stations.

In some cases, the first base station and the second base station may be members of a common PLMN. In other cases, the first base station and the second base station may be members of different PLMNs associated with different operators. The different PLMNs may be synchronized with each other.

In some examples, the first base station may transmit its own CET. The CET of the first base station may indicate timing information of the first base station over the shared spectrum, as well as provide an indication of the timing stratum of the first base station.

Thus, the method 3100 may provide for wireless communication. It should be noted that the method 3100 is just one implementation and that the operations of the method 3100 may be rearranged or otherwise modified such that other implementations are possible.

Figure 32:
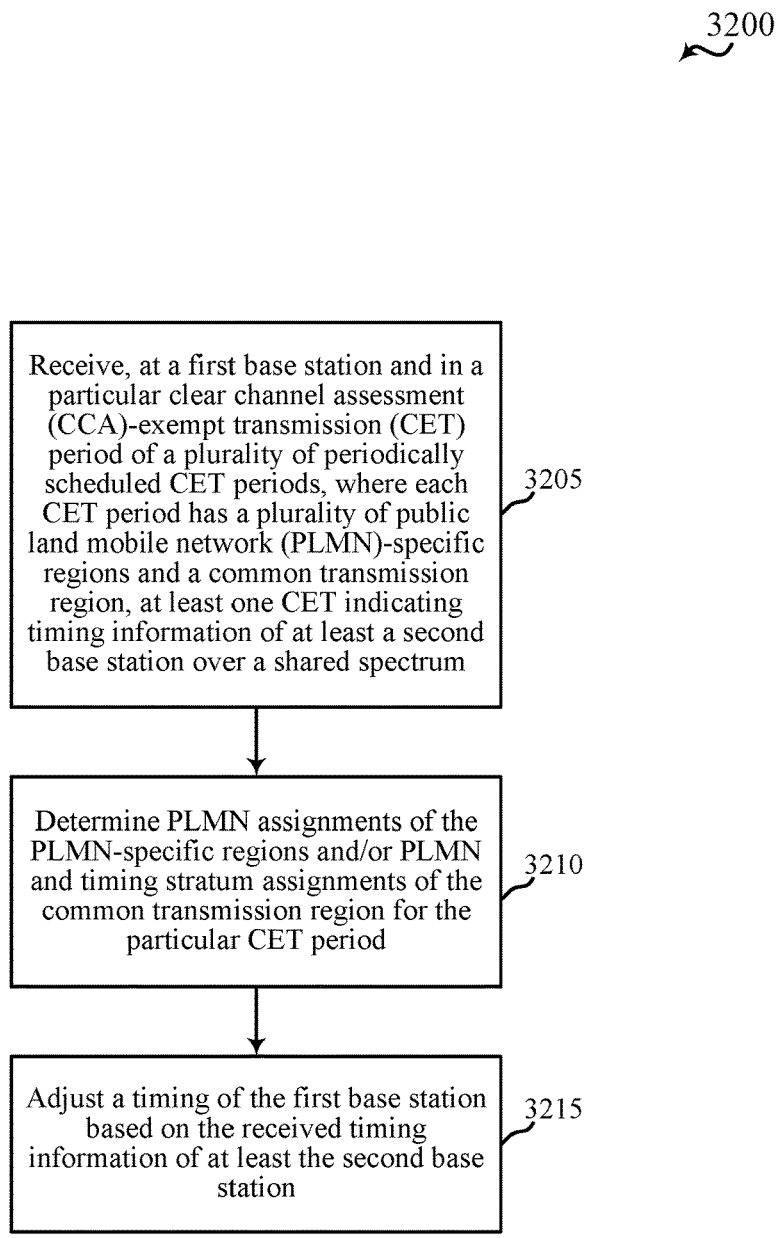
FIG. 32 is a flow chart showing an illustrative method of wireless communication, and more particularly a CET-based method usable for timing synchronization, in accordance with various aspects of the present disclosure.

FIG. 32 is a flow chart illustrating an example of a method 3200 of wireless communication, in accordance with various aspects of the present disclosure. For clarity, the method 3200 is described below with reference to aspects of one or more of the base stations 105 or 205 described with reference to FIG. 1, 2A, or 2B, or one of the devices 1305, 1405, or 1605 described with reference to FIG. 13, 14, or 17. In some examples, a base station or device such as one of the base stations 105 or 205 or one of the devices 1305, 1405, or 1705 may execute one or more sets of codes to control the functional elements of the device to perform the functions described below.

The method 3200 presumes that CETs are transmitted or received during a CET period. The CET period may be one of a plurality of periodically scheduled CET periods, in which each of the plurality of periodically scheduled CET periods may include a plurality of PLMN-specific regions and a common transmission region. The PLMN-specific regions of each CET period may have a time rank order, and PLMN-specific regions of different time rank may be assigned to different PLMNs in different CET periods. The common transmission regions of different CET periods may be assigned to different combinations of PLMNs and timing stratums in different CET periods. In some cases, the PLMN-specific regions may be assigned to different PLMNs in different CET periods on a rotating basis. Likewise, the common transmission regions may be assigned to different combinations of PLMNs and timing stratums in different CET periods on a rotating basis.

At block 3205, at least one CET may be received at a first base station. The at least one CET may be received during a particular CET period of the plurality of periodically scheduled CET periods. The at least one CET may indicate timing information of at least a second base station over a shared spectrum. The at least one CET may also indicate a timing stratum of at least the second base station. In some cases, the timing information of at least the second base station may be received during one of the PLMN-specific regions. In other cases, the timing information of at least the second base station may be received during the common transmission region. The operation(s) at block 3205 may be performed by the timing management module 1315, 1415, or 1715 described with reference to FIG. 13, 14, or 17, or the CET timing information analysis module 1425 or 1725 described with reference to FIG. 14 or 17.

At block 3210, the PLMN assignments of the PLMN-specific regions or the PLMN and timing stratum assignments of the common transmission region may be determined for the particular CET period. The determination may include a determination of which PLMN-specific region is assigned to the PLMN of the second base station, as well as a determination of whether the common transmission region is assigned to the PLMN and timing stratum of the second base station. In some cases, it may be determined (e.g., inferred) that the common transmission region is assigned to the PLMN of the second base station based on an assignment of a PLMN-specific region having a particular time rank (e.g., the last PLMN-specific region in time rank order) to the PLMN of the second base station for the particular CET period. The operation(s) at block 3210 may be performed by the timing management module 1315, 1415, or 1715 described with reference to FIG. 13, 14, or 17, the CET timing information analysis module 1425 or 1725 described with reference to FIG. 14 or 17, or the PLMN assignment determination module 1740 described with reference to FIG. 17.

At block 3215, it may be determined that the second base station includes a compatible timing stratum synchronization source for the first base station. In some cases, the second base station may be determined to include a compatible timing stratum synchronization source because the timing stratum associated with the second base station is a lower stratum than the timing stratum associated with the first base station. In some cases, the second base station may be determined to include a compatible timing stratum synchronization source because the timing stratum associated with the second base station is a next lower stratum than the timing stratum associated with the first base station.

At block 3220, the second base station may be selected as a basis for adjusting the timing of the first base station. The second base station may be selected in response to the determination(s) made at block 3215.

The operation(s) at block 3215 or block 3220 may be performed by the timing management module 1315, 1415, or 1715 described with reference to FIG. 13, 14, or 17, the CET timing information analysis module 1425 or 1725 described with reference to FIG. 14 or 17, or the timing source selection module 1745 described with reference to FIG. 17.

At block 3225, a timing of the first base station may be adjusted based on the received timing information of at least the second base station. The operation(s) at block 3225 may be performed by the timing management module 1315, 1415, or 1715 described with reference to FIG. 13, 14, or 17, or the timing adjustment module 1430 or 1730 described with reference to FIG. 14 or 17.

In some examples, the timing adjustment made at block 3225 may include synchronizing a timing of the first base station to a timing of at least the second based station based on the received timing information.

In some examples, the at least one CET received at block 3205 may include a first CET indicating the timing information of the second base station over the shared spectrum and a second CET indicating timing information of a third base station over the shared spectrum. The first CET and the second CET may be received at the first base station concurrently or at different times.

In some examples, the at least one CET may further indicate timing information for a third base station over the shared spectrum. In these examples, the timing of the first base station may in some cases be adjusted based on the timing information of the second base station and the timing information of the third base station. More generally, the timing of the first base station may be adjusted based on the timing information of any number of base stations.

In some cases, the first base station and the second base station may be members of a common PLMN. In other cases, the first base station and the second base station may be members of different PLMNs associated with different operators. The different PLMNs may be synchronized with each other.

In some examples, the first base station may transmit its own CET. The CET of the first base station may indicate timing information of the first base station over the shared spectrum, as well as provide an indication of the timing stratum of the first base station.

Thus, the method 3200 may provide for wireless communication. It should be noted that the method 3200 is just one implementation and that the operations of the method 3200 may be rearranged or otherwise modified such that other implementations are possible.

Figure 33:
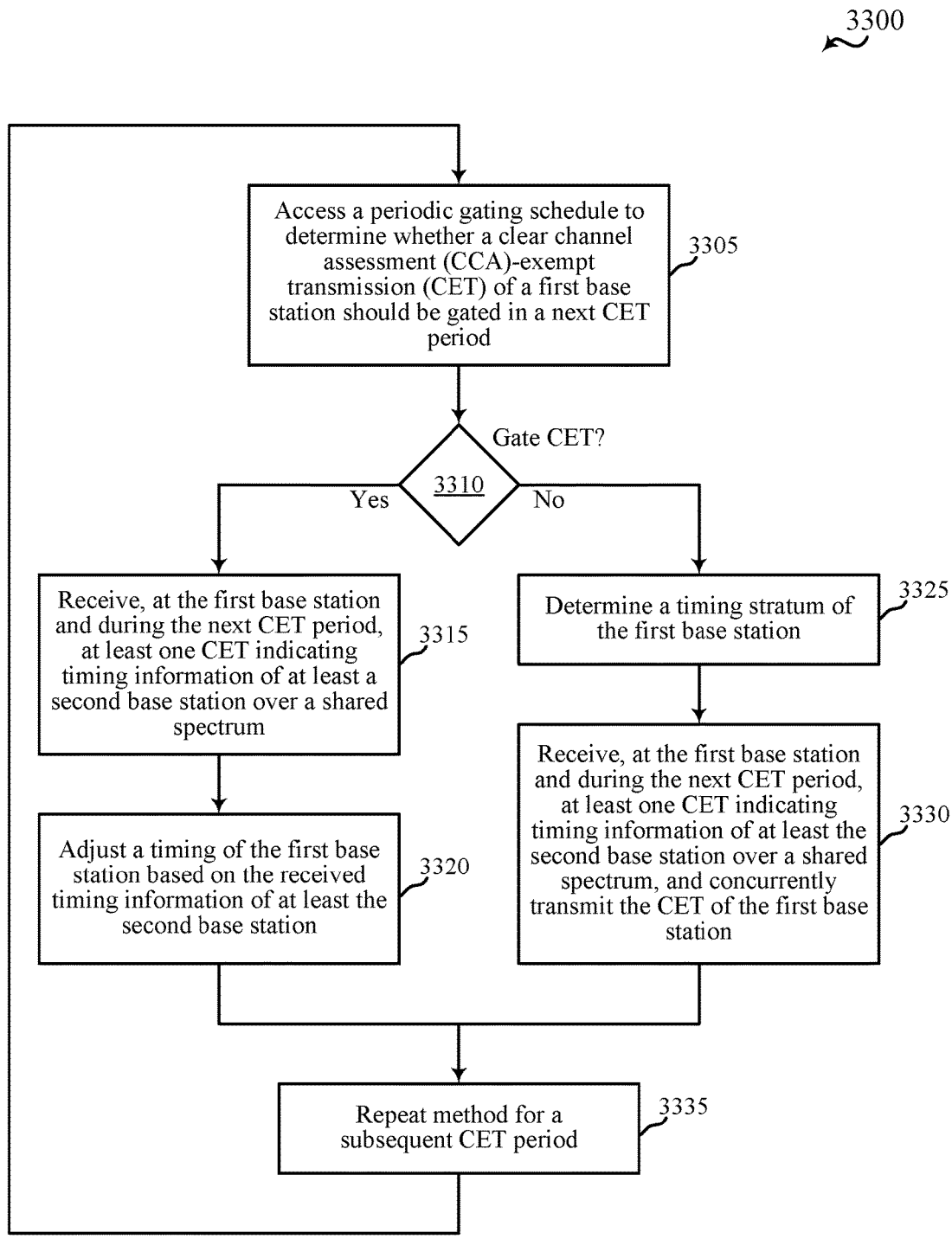
FIG. 33 is a flow chart showing an illustrative method of wireless communication, and more particularly a CET-based method usable for timing synchronization, in accordance with various aspects of the present disclosure.

FIG. 33 is a flow chart illustrating an example of a method 3300 of wireless communication, in accordance with various aspects of the present disclosure. For clarity, the method 3300 is described below with reference to aspects of one or more of the base stations 105 or 205 described with reference to FIG. 1, 2A, or 2B, or one of the devices 1305, 1405, or 1805 described with reference to FIG. 13, 14, or 18. In some examples, a base station or device such as one of the base stations 105 or 205 or one of the devices 1305, 1405, or 1805 may execute one or more sets of codes to control the functional elements of the device to perform the functions described below.

The method 3300 presumes that a first base station and at least a second base station share a periodic CET timing. Because of the shared CET timing, the transmission of a CET by the first base station may interfere with the first base station's receipt of a CET of at least the second base station (e.g., because the respective CETs may be received and transmitted concurrently).

At block 3305, a periodic gating schedule may be accessed to determine, at block 3310, whether the CET of the first base station should be gated (i.e., not transmitted) in a next CET period. The periodic gating schedule may indicate particular CET period(s) in which the CET of the first base station should be gated to mitigate interference with the first base station's receipt of the CET of at least the second base station. When it is determined that the CET of the first base station should be gated in the current CET period, processing may proceed to block 3315. When it is determined that the CET of the first base station should be transmitted in the current CET period, processing may proceed to block 3320. The operation(s) at block 3305 or 3310 may be performed by the timing management module 1315, 1415, or 1815 described with reference to FIG. 13, 14, or 18, the CET timing information analysis module 1425 or 1825 described with reference to FIG. 14 or 18, or the gating module 1840 described with reference to FIG. 18.

At block 3315, at least one CET may be received at the first base station while the first base station refrains from transmitting its own CET. The at least one CET may indicate timing information of at least the second base station over a shared spectrum. The at least one CET may also indicate a timing stratum of at least the second base station. The operation(s) at block 3315 may be performed by the timing management module 1315, 1415, or 1815 described with reference to FIG. 13, 14, or 18, or the CET timing information analysis module 1425 or 1825 described with reference to FIG. 14 or 18.

At block 3320, a timing of the first base station may be adjusted based on the received timing information of at least the second base station. The operation(s) at block 3320 may be performed by the timing management module 1315, 1415, or 1815 described with reference to FIG. 13, 14, or 18, or the timing adjustment module 1430 or 1830 described with reference to FIG. 14 or 18.

In some examples, the timing adjustment made at block 3320 may include synchronizing a timing of the first base station to a timing of at least the second based station based on the received timing information.

At block 3325, a timing stratum of the first base station may be determined. The operation(s) at block 3325 may be performed by the timing management module 1315, 1415, or 1815 described with reference to FIG. 13, 14, or 18, the CET timing information analysis module 1425 or 1825 described with reference to FIG. 14 or 18, or the timing stratum determination module 1845 described with reference to FIG. 18.

At block 3330, at least one CET may be received at the first base station while the first base station concurrently transmits its own CET. The at least one CET received at the first base station may indicate timing information of at least a second base station over a shared spectrum. The CET of the first base station may indicate timing information of the first base station over the shared spectrum and an indication of the timing stratum of the first base station. The operation(s) at block 3330 may be performed by the timing management module 1315, 1415, or 1815 described with reference to FIG. 13, 14, or 18, or the CET timing information analysis module 1425 or 1825 described with reference to FIG. 14 or 18.

In some examples, the at least one CET received at block 3315 may include a first CET indicating the timing information of the second base station over the shared spectrum and a second CET indicating timing information of a third base station over the shared spectrum. The first CET and the second CET may be received at the first base station concurrently or at different times.

In some examples, the at least one CET may further indicate timing information for a third base station over the shared spectrum. In these examples, the timing of the first base station may in some cases be adjusted based on the timing information of the second base station and the timing information of the third base station. More generally, the timing of the first base station may be adjusted based on the timing information of any number of base stations.

In some cases, the first base station and the second base station may be members of a common PLMN. In other cases, the first base station and the second base station may be members of different PLMNs associated with different operators. The different PLMNs may be synchronized with each other.

In some examples, the at least one CET may be received during a particular CET period of a plurality of periodically scheduled CET periods. Each of the CET periods may include at least one PLMN-specific region and a common transmission region. In some cases, the timing information of at least the second base station may be received during the common transmission region of the particular CET period or a CET of the first base station may be transmitted during the common transmission region.

Thus, the method 3300 may provide for wireless communication. It should be noted that the method 3300 is just one implementation and that the operations of the method 3300 may be rearranged or otherwise modified such that other implementations are possible.

Figure 34:
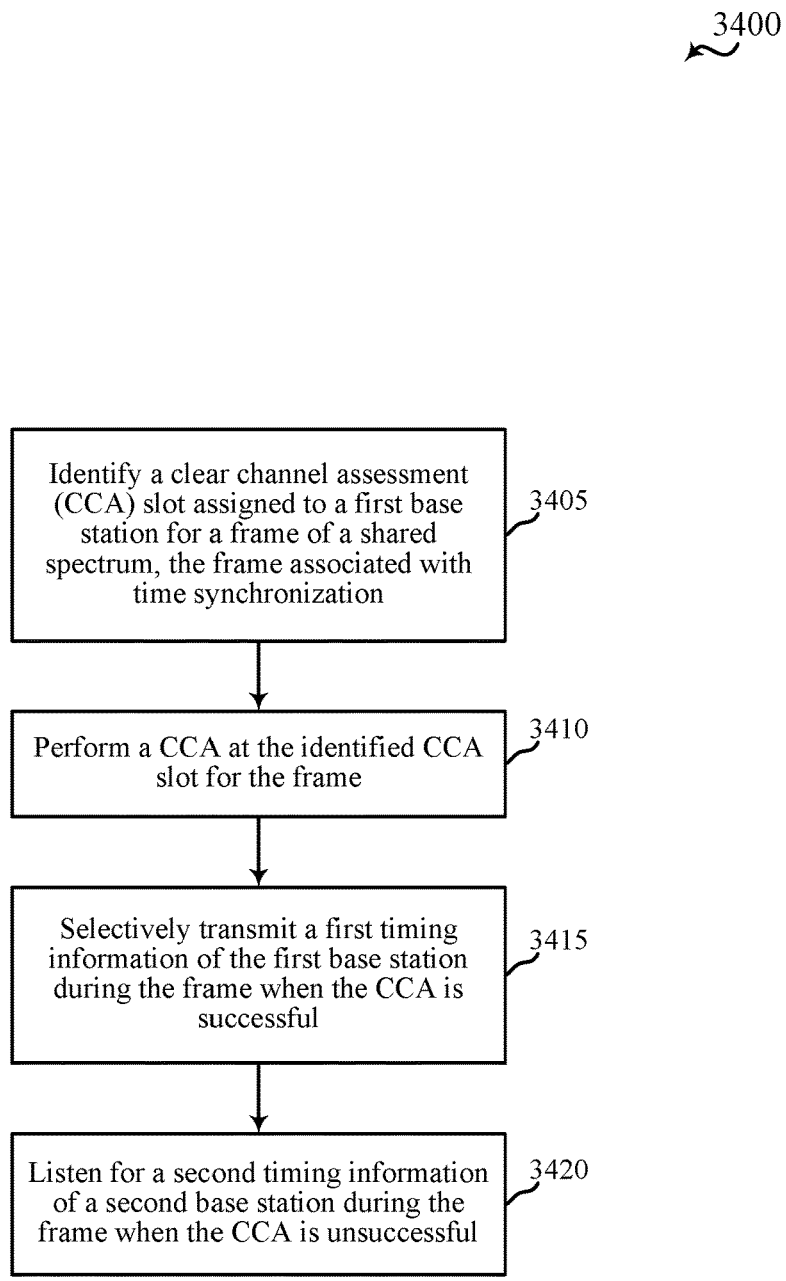
FIG. 34 is a flow chart showing an illustrative method of wireless communication, and more particularly a CCA-based method usable for timing synchronization, in accordance with various aspects of the present disclosure.

FIG. 34 is a flow chart illustrating an example of a method 3400 of wireless communication, in accordance with various aspects of the present disclosure. For clarity, the method 3400 is described below with reference to aspects of one or more of the base stations 105 or 205 described with reference to FIG. 1, 2A, or 2B, or one of the devices 1305, 1905, 2005, or 2105 described with reference to FIG. 13, 19, 20, or 21. In some examples, a base station or device such as one of the base stations 105 or 205 or one of the devices 1305, 1905, 2005, or 2105 may execute one or more sets of codes to control the functional elements of the device to perform the functions described below.

At block 3405, a CCA slot assigned to a first base station for a frame (e.g., a synchronization frame) of a shared spectrum may be identified. The frame may be a frame associated with time synchronization, as described, for example, with reference to FIG. 11. In some cases, the frame may be one of a plurality of periodic sync frames. The operation(s) at block 3405 may be performed by the timing management module 1315, 1915, 2015, or 2115 described with reference to FIG. 13, 19, 20, or 21, or the CCA slot identification module 1925, 2025, or 2125 described with reference to FIG. 19, 20, or 21.

In some examples, the CCA slot assigned to the first base station in a frame of the shared spectrum may be identified based on a timing stratum of the first base station.

In some examples, the CCA slot assigned to the first base station may occur earlier in a frame than one or more CCA slots associated with timing stratums that are higher than the timing stratum of the first base station (e.g., if the first base station is associated with a lower timing stratum and is a GPS source, or is associated with a timing stratum that is closer to a GPS source in a synchronization stratum than other base stations, the first base station may perform CCA in a CCA slot that occurs earlier in a frame than one or more other CCA slots). In general, base stations associated with lower timing stratums may be assigned CCA slots that occur earlier in a frame.

At block 3410, a CCA may be performed at the identified CCA slot for the frame. The operation(s) at block 3410 may be performed by the timing management module 1315, 1915, 2015, or 2015 described with reference to FIG. 13, 19, 20, or 21, or the CCA module 1930, 2030, or 2130 described with reference to FIG. 19, 20, or 21.

At block 3415, and when the CCA is successful, a first timing information of the first base station may be selectively transmitted. The operation(s) at block 3415 may be performed by the timing management module 1315, 1915, 2015, or 2115 described with reference to FIG. 13, 19, 20, or 21, or the timing transmission module 1935, 2035, or 2135 described with reference to FIG. 19, 20, or 21.

At block 3420, and when the CCA is unsuccessful, the first base station may listen for a second timing information of a second base station during the frame. The operation(s) at block 3420 may be performed by the timing management module 1315, 1915, 2015, or 2115 described with reference to FIG. 13, 19, 20, or 21, or the timing reception module 1940, 2040, or 2140 described with reference to FIG. 19, 20, or 21.

In some examples, and when the CCA is unsuccessful, the first base station may further listen for a third timing information of a third base station during the frame. The second timing information and the third timing information may in some cases be received concurrently. The first base station may also, and concurrently, listen for and receive additional timing information of additional base stations.

In some examples, a CCA frequency of the first base station may be gated for a plurality of frames associated with timing synchronization (i.e., CCA may not be performed in certain timing synchronization frames). A periodicity of the gating may be based on the timing stratum of the first base stratum. In some cases, the CCAs of base stations associated with higher timing stratums may be gated more often than the CCAs of base stations associated with lower timing stratums. In some cases, the CCAs of base stations associated with a lowest timing stratum, such as GPS sources, may never be gated.

Thus, the method 3400 may provide for wireless communication. It should be noted that the method 3400 is just one implementation and that the operations of the method 3400 may be rearranged or otherwise modified such that other implementations are possible.

Figure 35:
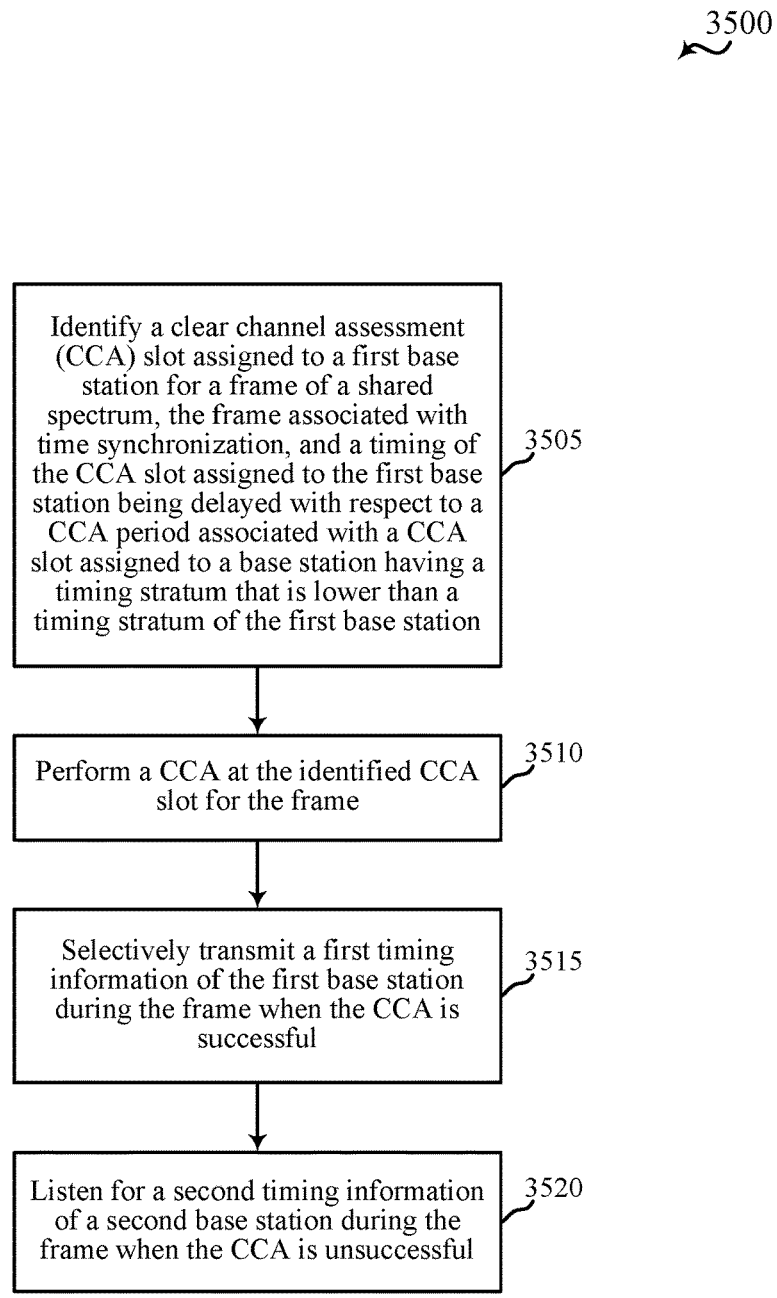
FIG. 35 is a flow chart showing an illustrative method of wireless communication, and more particularly a CCA-based method usable for timing synchronization, in accordance with various aspects of the present disclosure.

FIG. 35 is a flow chart illustrating an example of a method 3500 of wireless communication, in accordance with various aspects of the present disclosure. For clarity, the method 3500 is described below with reference to aspects of one or more of the base stations 105 or 205 described with reference to FIG. 1, 2A, or 2B, or one of the devices 1305, 1905, or 2105 described with reference to FIG. 13, 19, or 21. In some examples, a base station or device such as one of the base stations 105 or 205 or one of the devices 1305, 1905, or 2105 may execute one or more sets of codes to control the functional elements of the device to perform the functions described below.

In some examples, a CCA slot timing of the first base station may be delayed based on a timing stratum of the first base station.

At block 3505, a CCA slot assigned to a first base station for a frame (e.g., a synchronization frame) of a shared spectrum may be identified. The frame may be a frame associated with time synchronization. In some cases, the frame may be one of a plurality of periodic sync frames. In some cases, a timing of the CCA slot assigned to the first base station may be delayed with respect to a CCA period associated with a CCA slot assigned to a base station having a timing stratum that is lower than a timing stratum of the first base station, as described, for example, with reference to FIG. 12. The operation(s) at block 3505 may be performed by the timing management module 1315, 1915, 2015, or 2115 described with reference to FIG. 13, 19, 20, or 21, or the CCA slot identification module 2025 described with reference to FIG. 20.

In some examples, the CCA slot assigned to the first base station in a frame of the shared spectrum may be identified based on a timing stratum of the first base station.

In some examples, the CCA slot assigned to the first base station may occur earlier in a frame than one or more CCA slots associated with timing stratums that are higher than the timing stratum of the first base station (e.g., if the first base station is associated with a lower timing stratum and is a GPS source, or is associated with a timing stratum that is closer to a GPS source in a synchronization stratum than other base stations, the first base station may perform CCA in a CCA slot that occurs earlier in a frame than one or more other CCA slots). In general, base stations associated with lower timing stratums may be assigned CCA slots that occur earlier in a frame. However, when the first base station is associated with a higher stratum and the timing of the CCA slot assigned to the first base station is delayed with respect to a CCA period associated with a CCA slot assigned to a base station having a lower timing stratum, the delay may enable the first base station to gain access to the shared spectrum regardless of another base station gaining access to the shared spectrum during an earlier part of the frame.

At block 3510, a CCA may be performed at the identified CCA slot for the frame. The operation(s) at block 3510 may be performed by the timing management module 1315, 1915, 2015, or 2015 described with reference to FIG. 13, 19, 20, or 21, or the CCA module 1930, 2030, or 2130 described with reference to FIG. 19, 20, or 21.

At block 3515, and when the CCA is successful, a first timing information of the first base station may be selectively transmitted. The operation(s) at block 3515 may be performed by the timing management module 1315, 1915, 2015, or 2115 described with reference to FIG. 13, 19, 20, or 21, or the timing transmission module 1935, 2035, or 2135 described with reference to FIG. 19, 20, or 21.

At block 3520, and when the CCA is unsuccessful, the first base station may listen for a second timing information of a second base station during the frame. The operation(s) at block 3520 may be performed by the timing management module 1315, 1915, 2015, or 2115 described with reference to FIG. 13, 19, 20, or 21, or the timing reception module 1940, 2040, or 2140 described with reference to FIG. 19, 20, or 21.

In some examples, and when the CCA is unsuccessful, the first base station may further listen for a third timing information of a third base station during the frame. The second timing information and the third timing information may in some cases be received concurrently. The first base station may also, and concurrently, listen for and receive additional timing information of additional base stations.

In some examples, a CCA frequency of the first base station may be gated for a plurality of frames associated with timing synchronization (i.e., CCA may not be performed in certain timing synchronization frames). A periodicity of the gating may be based on the timing stratum of the first base stratum. In some cases, the CCAs of base stations associated with higher timing stratums may be gated more often than the CCAs of base stations associated with lower timing stratums. In some cases, the CCAs of base stations associated with a lowest timing stratum, such as GPS sources, may never be gated.

Thus, the method 3500 may provide for wireless communication. It should be noted that the method 3500 is just one implementation and that the operations of the method 3500 may be rearranged or otherwise modified such that other implementations are possible.

Figure 36:
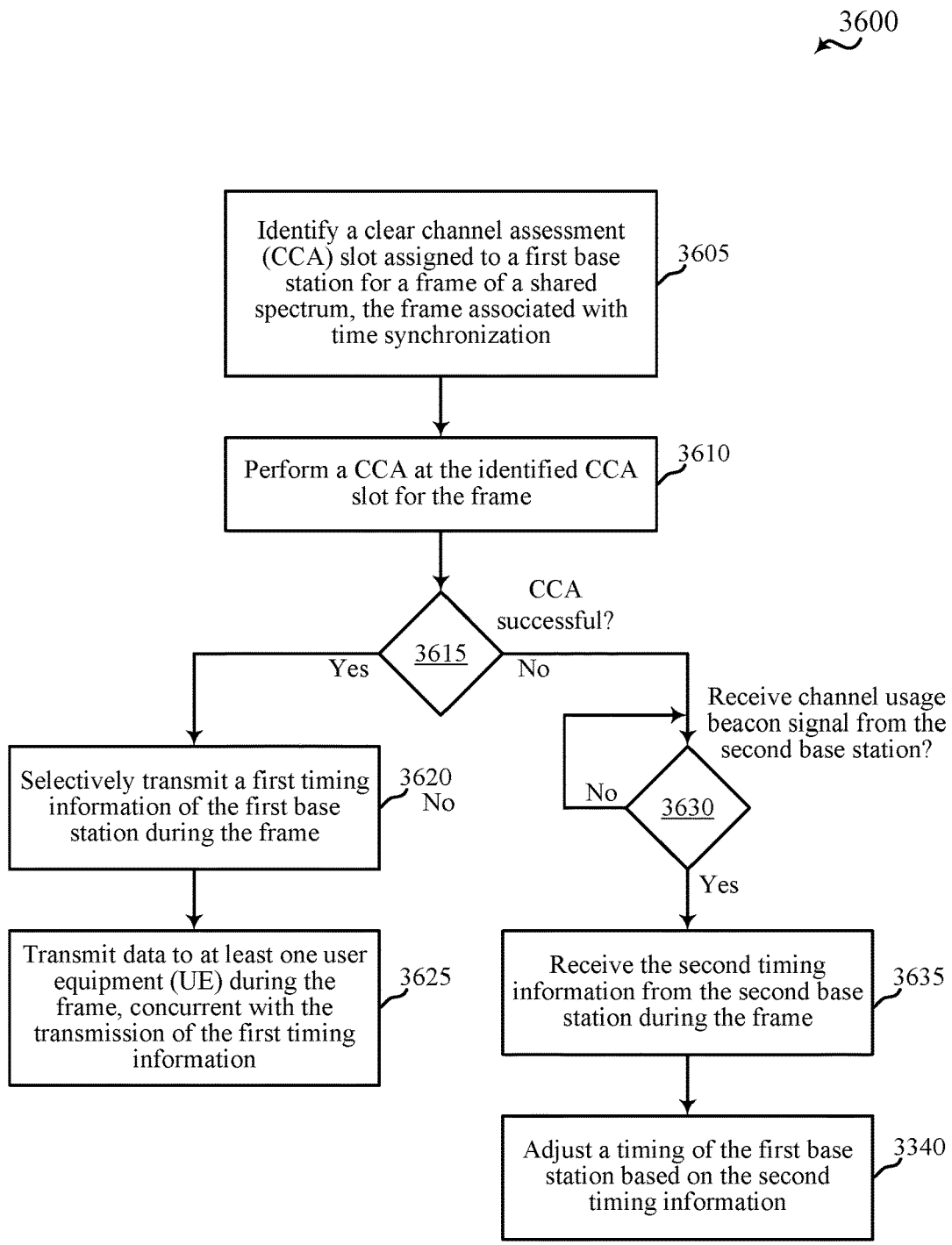
FIG. 36 is a flow chart showing an illustrative method of wireless communication, and more particularly a CCA-based method usable for timing synchronization, in accordance with various aspects of the present disclosure.

FIG. 36 is a flow chart illustrating an example of a method 3600 of wireless communication, in accordance with various aspects of the present disclosure. For clarity, the method 3600 is described below with reference to aspects of one or more of the base stations 105 or 205 described with reference to FIG. 1, 2A, or 2B, or one of the devices 1305, 1905, 2005, or 2105 described with reference to FIG. 13, 19, 20, or 21. In some examples, a base station or device such as one of the base stations 105 or 205 or one of the devices 1305, 1905, 2005, or 2105 may execute one or more sets of codes to control the functional elements of the device to perform the functions described below.

At block 3605, a CCA slot assigned to a first base station for a frame of a shared spectrum may be identified. The frame may be a frame associated with time synchronization. The operation(s) at block 3605 may be performed by the timing management module 1315, 1915, 2015, or 2115 described with reference to FIG. 13, 19, 20, or 21, or the CCA slot identification module 1925, 2025, or 2125 described with reference to FIG. 19, 20, or 21.

In some examples, the CCA slot assigned to the first base station in a frame of the shared spectrum may be identified based on a timing stratum of the first base station In some examples, the CCA slot assigned to the first base station may occur earlier in a frame than one or more CCA slots associated with timing stratums that are higher than the timing stratum of the first base station (e.g., if the first base station is associated with a lower timing stratum and is a GPS source, or is associated with a timing stratum that is closer to a GPS source in a synchronization stratum than other base stations, the first base station may perform CCA in a CCA slot that occurs earlier in a frame than one or more other CCA slots). In general, base stations associated with lower timing stratums may be assigned CCA slots that occur earlier in a frame.

At block 3610, a CCA may be performed at the identified CCA slot for the frame. The operation(s) at block 3610 may be performed by the timing management module 1315, 1915, 2015, or 2015 described with reference to FIG. 13, 19, 20, or 21, or the CCA module 1930, 2030, or 2130 described with reference to FIG. 19, 20, or 21.

At block 3615, it may be determined whether the CCA performed at block 3610 is successful. When the CCA is successful, processing may proceed to block 3620. When the CCA is unsuccessful, processing may proceed to block 3630. The operation(s) at block 3615 may be performed by the timing management module 1315, 1915, 2015, or 2015 described with reference to FIG. 13, 19, 20, or 21, or the CCA module 1930, 2030, or 2130 described with reference to FIG. 19, 20, or 21.

At block 3620, a first timing information of the first base station may be selectively transmitted. The first timing information may in some cases be transmitted during at least one reference signal resource element of the frame. The operation(s) at block 3620 may be performed by the timing management module 1315, 1915, 2015, or 2115 described with reference to FIG. 13, 19, 20, or 21, or the timing transmission module 1935, 2035, or 2135 described with reference to FIG. 19, 20, or 21.

At block 3625, the first base station may transmit data to at least one UE during the frame. The data may in some cases be transmitted to the at least one UE concurrent with the transmission of the first timing information at block 3620. The operation(s) at block 3620 may be performed by the timing management module 1315, 1915, 2015, or 2115 described with reference to FIG. 13, 19, 20, or 21, or the data transmission module 2145 described with reference to FIG. 21.

At block 3630, and while listening for a second timing information of a second base station during the frame, the first base station may receive a channel usage beacon signal from the second base station. Until the channel usage beacon signal is received, the method 3600 may loop at block 3630. Upon receipt of the channel usage beacon signal, the method 3600 may proceed to block 3635. The operation(s) at block 3420 may be performed by the timing management module 1315, 1915, 2015, or 2115 described with reference to FIG. 13, 19, 20, or 21, or the timing reception module 1940, 2040, or 2140 described with reference to FIG. 19, 20, or 21.

At block 3635, the second timing information may be received from the second base station during the frame, and at block 3640, a timing of the first base station may be adjusted based on the second timing information. In some cases, the timing of the first base station may also be adjusted based on a third timing information received from a third base station, or on timing information received from any number of base stations. The timing information received from the third base station may be received during the same or a different frame in which the second timing information is received. The operation(s) at block 3635 or block 3640 may be performed by the timing management module 1315, 1915, 2015, or 2115 described with reference to FIG. 13, 19, 20, or 21, or the timing reception module 1940, 2040, or 2140 described with reference to FIG. 19, 20, or 21. The operation(s) at block 3640 may also be performed by the timing adjustment module 2150 described with reference to FIG. 21.

In some examples, a timing of the second base station may be determined based on the second timing information, and the timing of the first base station may be adjusted by synchronizing the timing of the first base station to the timing of the second base station.

In some examples, a CCA frequency of the first base station may be gated for a plurality of frames associated with timing synchronization (i.e., CCA may not be performed in certain timing synchronization frames). A periodicity of the gating may be based on the timing stratum of the first base stratum. In some cases, the CCAs of base stations associated with higher timing stratums may be gated more often than the CCAs of base stations associated with lower timing stratums. In some cases, the CCAs of base stations associated with a lowest timing stratum, such as GPS sources, may never be gated.

Thus, the method 3600 may provide for wireless communication. It should be noted that the method 3600 is just one implementation and that the operations of the method 3600 may be rearranged or otherwise modified such that other implementations are possible.

In some cases, one or more aspects of the method 2900, 3000, 3100, 3200, 3300, 3400, 3500, or 3600 described in FIG. 29, 30, 31, 32, 33, 34, 35, or 36 may be combined.

In addition to time synchronizing base stations, base stations may need to be frequency synchronized. However, in the case of base stations communicating over a shared spectrum, there may be no master base station. Furthermore, the deployment of base stations may be ad-hoc, with no predefined physical placement or arrangement of base stations. Still further, there may be scenarios where a GPS source or backhaul connection to a trusted synchronization source may be unavailable, requiring an ability to frequency synchronize a set of base stations in the absence of such a source.

When frequency synchronizing a set of N access points (e.g., base stations), a frequency control loop may be created to maintain overall frequency synchronization across the N access points. During the frequency synchronization process, an access point may have disjoint state information. In other words, an access point may know its own state information and may acquire state information from nearby access points, but because state information may not be routed through the network, an access point may not have state information for more distant access points.

A given access point ($AP_i$) may have the ability to receive frequency information from another local $AP_j$ and measure a frequency error $\Delta f_{ij}$ between its own frequency oscillator and that of $AP_j$. For a set of APs that are within reception of $AP_i$, a set of $\Delta f_{ij}$ may be measured for the set of j APs. These frequency errors may be used to estimate the relative frequency estimates of neighboring APs such that $AP_i$'s estimate of $AP_j$'s frequency is given by:

$$f_j = f_i + \Delta f_{ij}$$

Where $f_i$ is $AP_i$'s local oscillator (LO) frequency offset and $\Delta f_{ij}$ is the $AP_i$'s measurement of the relative error between its LO and $AP_j$'s LO frequency. For simplicity, it may be assumed that the measurement is noise free and that $AP_i$'s estimate of $AP_j$ equals the true frequency of $AP_j$. This restriction may be relaxed in some examples. Given these frequency estimates as input, an AP can formulate a revision to its own frequency oscillator in an attempt to synchronize its frequency with that of its local neighbor APs.

Figure 37:
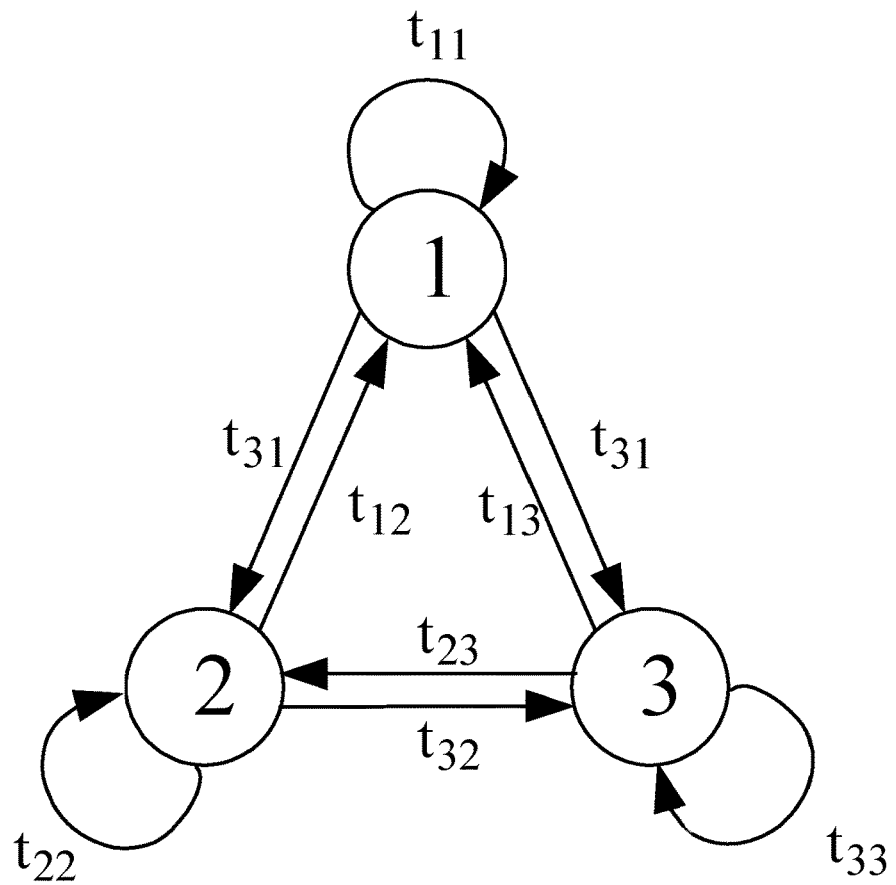
FIG. 37 is a diagram of an illustrative network for which frequency synchronization may be performed using recursive iterations of frequency adjustments.

FIG. 37 illustrates an example network 3700 of N=3 deployed APs. For the case of N=3, each of the three APs may use the frequency estimates of the other two APs to formulate an adjustment in its own frequency.

An equivalent set of recursion functions may be created for the example network 3700:

$$f_{1,n+1} = t_{11} f_{1,n} + t_{12} f_{2,n} + t_{13} f_{3,n}$$

$f_{2,n+1} = t_{21}f_{1,n} + t_{22}f_{2,n} + t_{23}f_{3,n}$ $f_{3,n+1} = t_{31}f_{1,n} + t_{32}f_{2,n} + t_{33}f_{3,n}$

Where n is the iteration number and $t_{ij}$ equals the coefficient multiplier used by $AP_i$ on the estimate of $AP_j$. Equivalently, in matrix formulation:

$f_{n+1} = T f_n$

For the case where each AP is limited to averaging of the input frequencies, each row of matrix T may sum to 1 and by definition is a stochastic matrix. Some useful properties of stochastic matrices may be the following:

All stochastic matrices have at least one maximum absolute eigenvalue of $\lambda=1$.

For the case where T has a single eigenvalue occurrence of $|\lambda|=1$ then as $n \to \infty$, $f_n$ approaches the eigenvector corresponding to $\lambda$.

Convergence rate of elements of f are bounded by $|\lambda_2|^n$ where $\lambda_2$ is the subdominant eigenvalue denoting the second largest eigenvalue in absolute magnitude.

For the example network 3700 of N=3, four cases may be considered to illustrate four distinct scenarios where analysis can be done in closed form.

Figure 38:
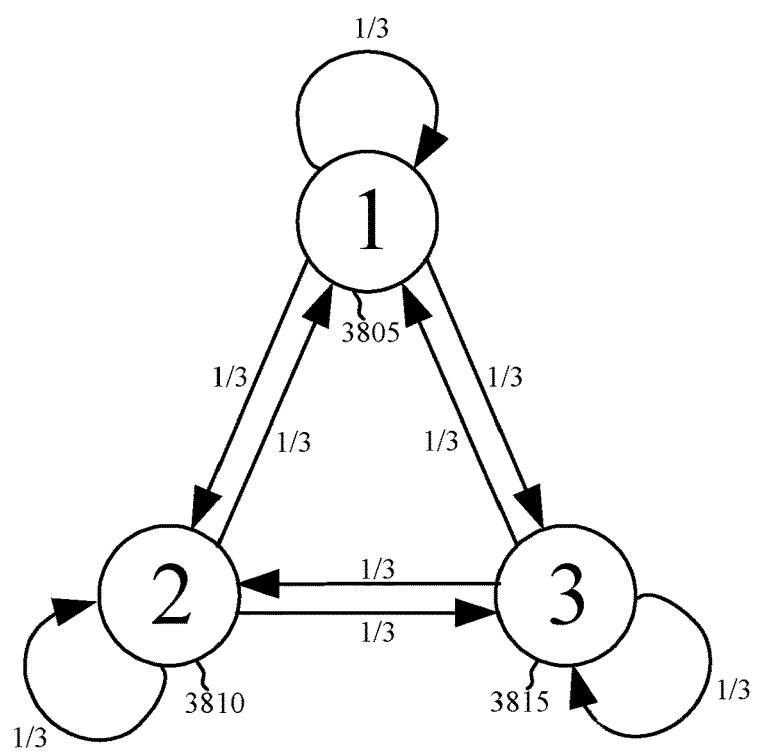
FIG. 38 is a diagram of an illustrative network for which frequency synchronization may be performed using recursive iterations of frequency adjustments, in accordance with various aspects of the present disclosure.

FIG. 38 illustrates an example network 3800 of N=3 deployed APs. The APs are fully connected, with each AP having the ability to receive from the other two APs. Each AP may measure the frequency error at time n; form a direct average of the three frequencies; and apply that frequency to its own LO at time n+1.

Direct averaging of the received signals may be applied to form the following relation:

$$f_{n+1} = T \cdot f_n = \begin{bmatrix} 1/3 & 1/3 & 1/3 \\ 1/3 & 1/3 & 1/3 \\ 1/3 & 1/3 & 1/3 \end{bmatrix} f_n$$

Where T is the transition probability matrix. Given that the rows of T are guaranteed to sum to 1, T is a stochastic matrix with the unique property that at least one eigenvalue of T equals 1 and the absolute value of all of the other eigenvalues are less than or equal to 1. Additionally, the convergence rate over time will be determined by the magnitude of the second largest absolute valued eigenvalue and steady state frequency will converge to a scalar multiple of the eigenvector corresponding to the largest absolute eigenvalue of 1, which in this case is $[1\ 1\ 1]^T$. For the case of a stochastic matrix, this will be the vector containing all elements identical to each other.

For this particular case, the eigenvalues are 1, 0, 0 with (approximate) eigenvectors of [0.5774, 0.5774, 0.5774]. Steady state is reached after one iteration, or equivalently stated, $T = T^2 = T^3 = \ldots = T^\infty$. This immediate convergence results from the fact that the second largest eigenvalue is equal to 0. No change in matrix f occurs with any repeated application of matrix T. The final solution therefore has all three frequencies converged to a single average value vector that is a scalar multiple of the eigenvector corresponding to the largest eigenvalue.

Figure 39:
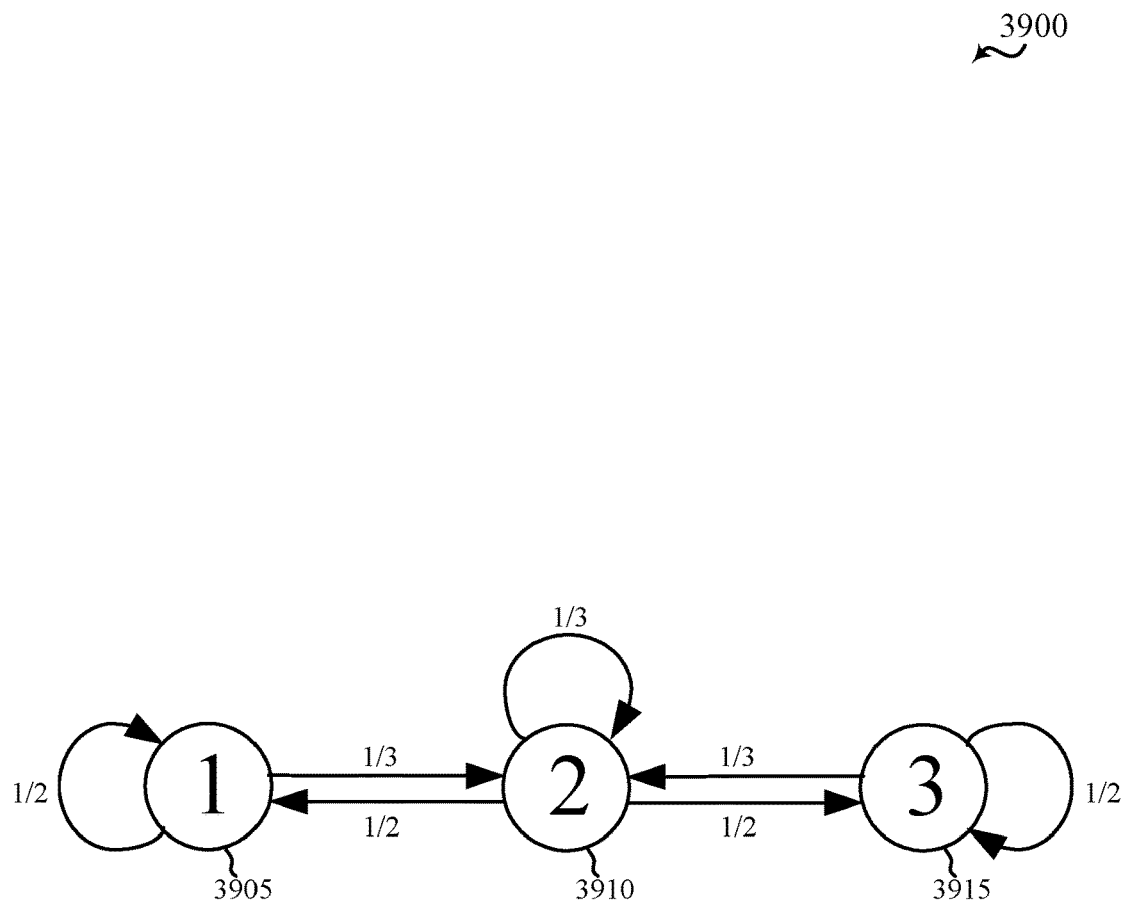
FIG. 39 is a diagram of an illustrative network for which frequency synchronization may be performed using recursive iterations of frequency adjustments, in accordance with various aspects of the present disclosure.

FIG. 39 illustrates an example network 3900 of N=3 deployed APs, where the three APs are deployed in a single line formation, with AP 1 and AP 3 connected to different sides of AP 2.

Direct averaging of the received signals may be applied to form the following relation:

$$f_{n+1} = T \cdot f_n = \begin{bmatrix} 1/2 & 1/2 & 0 \\ 1/3 & 1/3 & 1/3 \\ 0 & 1/2 & 1/2 \end{bmatrix} f_n$$

In the above matrix, the entries per row sum to 1 and have values dependent on each AP's number of local connections. The matrix T in this case is a tridiagonal stochastic matrix with eigenvalues of 1, 0.5, −0.1667. As in the case described with reference to FIG. 38, the frequency converges to a steady state value of $f = k \cdot [1\ 1\ 1]^T$. However, for this case, convergence is not immediate. As long as the initial frequency state $f_0 \neq k \cdot [1\ 1\ 1]^T$, the rate of convergence will be bounded by $\lambda_2^n = (0.5)^n$.

One may compute the combining weights at steady state to determine the proportion of each AP's frequency contribution to the final equilibrium frequency. This is equal to the top row vector of $T^\infty$. For the case of the 3×3 T matrix above, the proportion for each node is 28.6%, 42.9% and 28.6%, for APs 1, 2, and 3, respectively. A general statement that can be made is that APs that have a larger number of connections to other APs will contribute a greater proportion to the final equilibrium frequency.

The case of APs being deployed in a single line formation should depict the worst case convergence rates due to its lack of interconnectedness. Frequency information from an AP on one side of the network needs to be communicated through all of the other APs to reach the other side of the network. One can compute the subdominant eigenvalue for this configuration for varying N and show that $\kappa_2 = 0.5, 0.91$, and 0.99 for N=3, 7, and 19, respectively. These large values of $\lambda_2$ for large values of N will result in slow convergence of the LO oscillators across the network.

Figure 40:
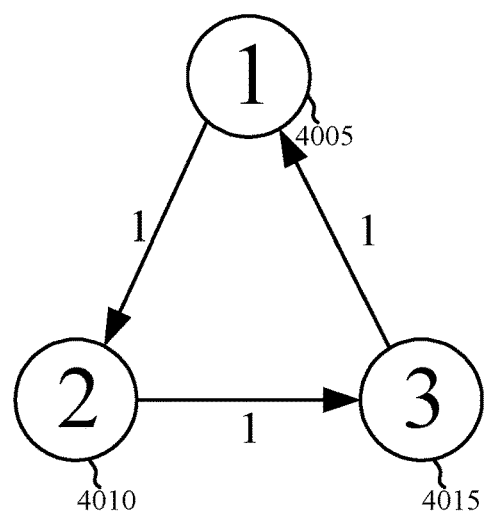
FIG. 40 is a diagram of an illustrative network for which frequency synchronization may be performed using recursive iterations of frequency adjustments, in accordance with various aspects of the present disclosure.

FIG. 40 illustrates another example network 4000 of N=3 deployed APs. However, there are asymmetric signal connections between the APs of the example network 4000.

A recursion equation for the example network 4000 may be given by:

$$f_{n+1} = T \cdot f_n = \begin{bmatrix} 0 & 0 & 1 \\ 1 & 0 & 0 \\ 0 & 1 & 0 \end{bmatrix} f_n$$

For this case, the frequency estimates are transferred from AP to AP in a ring with no direct symmetry of transfer between any pair of APs. While the matrix is stochastic, it is no longer symmetric, thereby resulting in complex eigenvalues. As a result, there is no convergence of $(T)^\infty$. This results from the fact that there are multiple eigenvalues with an absolute value of 1. In this particular case, the eigenvalues are 1, $-0.5 + j \cdot 0.866$, $-0.5 - j \cdot 0.866$, which all have absolute value of 1. Steady state convergence of frequency will only result if all APs have the same LO frequency, implying that the initial $f_0$ vector is a scalar multiple of the eigenvector [1 1 1] corresponding to the largest absolute eigenvalue of $\lambda_1 = 1$. For all other initial conditions, there will be continuous frequency oscillations for each AP in the network.

Figure 41:
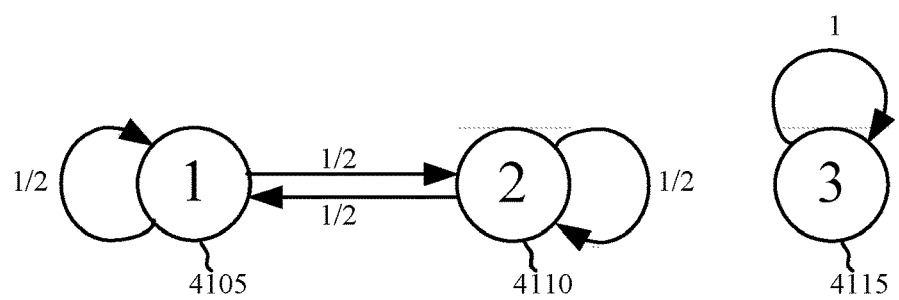
FIG. 41 is a diagram of an illustrative network for which frequency synchronization may be performed using recursive iterations of frequency adjustments, in accordance with various aspects of the present disclosure.

FIG. 41 illustrates an example disjoint network 4100 of N=3 deployed APs. However, there are asymmetric signal connections between the APs of the example network 4000.

A recursion equation for the example network 4000 may be given by:

$$f_{n+1} = T \cdot f_n = \begin{bmatrix} 1/2 & 1/2 & 0 \\ 1/2 & 1/2 & 0 \\ 0 & 0 & 1 \end{bmatrix} f_n$$

Or more generally:

$$T = \begin{bmatrix} B_{k \times k} & & 0 \\ & B_{l \times l} & \\ 0 & & B_{m \times m} \end{bmatrix}$$

Where k+l+m=N.

This is a degenerate case where T has the form of a diagonal block matrix, with each block B being a stochastic matrix. For the 3×3 matrix above, the eigenvalues are 1, 1, 0. The repeated occurrence of λ=1 implies that the network is disjoint. This generally applies to any T matrix that can be put into this diagonal block form by swapping any number of pairs of rows with each other. The number of eigenvalues with λ=1 will equal the number of blocks B.

In all of the cases described with reference to FIGS. 38-41, and for all stochastic T matrices in general, frequency stability across the network may be guaranteed when perfect information is assumed. For larger values of N, simulation is required to evaluate the convergence properties of the network. A reasonable model of an AP deployment along with specification of pairwise connections is required. A probabilistic model may be created to specify these connections, and to try to reasonably take into account the proximity of the APs with one another.

Figure 42:
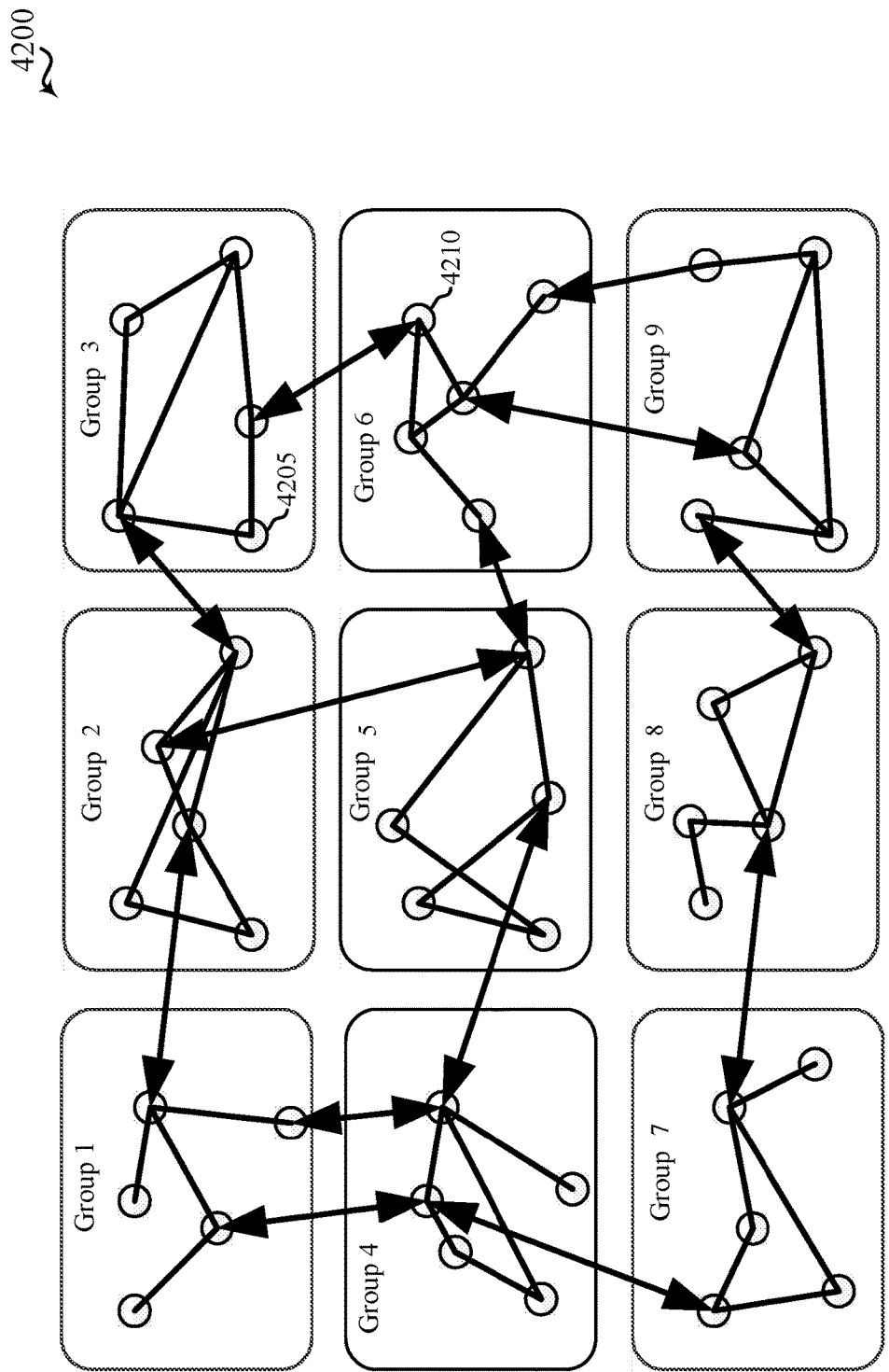
FIG. 42 is a diagram of an illustrative network for which frequency synchronization may be performed using recursive iterations of frequency adjustments, in accordance with various aspects of the present disclosure.

FIG. 42 illustrates an example network 4200 of 45 APs (e.g., APs 4205, 4210, etc.). The APs may be divided into nine groups of five (Group 1, Group 2, . . . Group 9). These numbered groups are shown with an example relative placement of APs within each group. Amongst the five APs within a group, their pairwise probability of being bidirectionally connected is given by probability $P_{wg}$ and depicted with a line having no arrows. Additionally, across two sets of adjacent groups, a connection may be made between APs with a pairwise probability of $P_g$ and depicted with a line having at least one arrow. Additionally, this group-to-group connection is allowed to be unidirectional or bidirectional based on the probability of being unidirectional, $P_u$. Note that as $P_{wg}$ and $P_g$ values that approach the value of 1 and $P_u=0$, the network will become fully and bidirectionally connected across all 45 APs.

Thousands of 45×45 dimensioned matrices T may be created in simulation based on the example network 4200 shown in FIG. 42, in order to analyze the frequency convergence properties of the network 4200. Assuming first that $P_u=0$, the T matrix becomes stochastic and symmetric, where all row entries sum to 1 and $t_{ij}=t_{ji}$ representing bidirectional connections between APs. Assuming that $p_{wg}>p_g$, the matrix will be more populated with nonzero elements towards the main diagonal. Toward the off-diagonal portions of the matrix there will be non-zero entries possible where one group is collated with another. For entries corresponding to groups that are not collocated, the value of 0 is placed.

Taking 5000 of these T matrices, statistics may be collected of the second largest eigenvalue in absolute magnitude. This distribution gives an idea of the convergence rate of the LO frequencies across the network. The higher the magnitude, the longer the convergence time required.

The equations used in FIGS. 37-41 may be modified as disclosed below to include Additive White Gaussian Noise (AWGN) terms that indicate the measurement error that $AP_i$ makes when estimating $AP_j$'s frequency offset:

$$f_{1,n+1}=t_{11}f_{1,n}+t_{12}f_{2,n}+n_{12}+t_{13}f_{3,n}+n_{13}$$

$$f_{2,n+1}=t_{21}f_{1,n}+n_{21}+t_{22}f_{2,n}+t_{23}f_{3,n}+n_{23}$$

$$f_{3,n+1}=t_{31}f_{1,n}+n_{31}+t_{32}f_{2,n}+n_{32}+t_{33}f_{3,n}$$

Where $n_{ij}$ is the noise introduced in $AP_i$'s frequency estimate of $AP_j$. While the noise will vary based on the $AP_j$ frequency that is estimated, the analysis may be simplified by using a single noise term per AP. For large N, this should be a reasonable assumption, and therefore the recursion equation simplifies to:

$$f_{n+1}=T\cdot f_n+n_n$$

Where $n_n$ is a noise vector of AWGN random variables with standard deviation σ. Entries for each vector vary across both APs as well as time.

Figure 43:
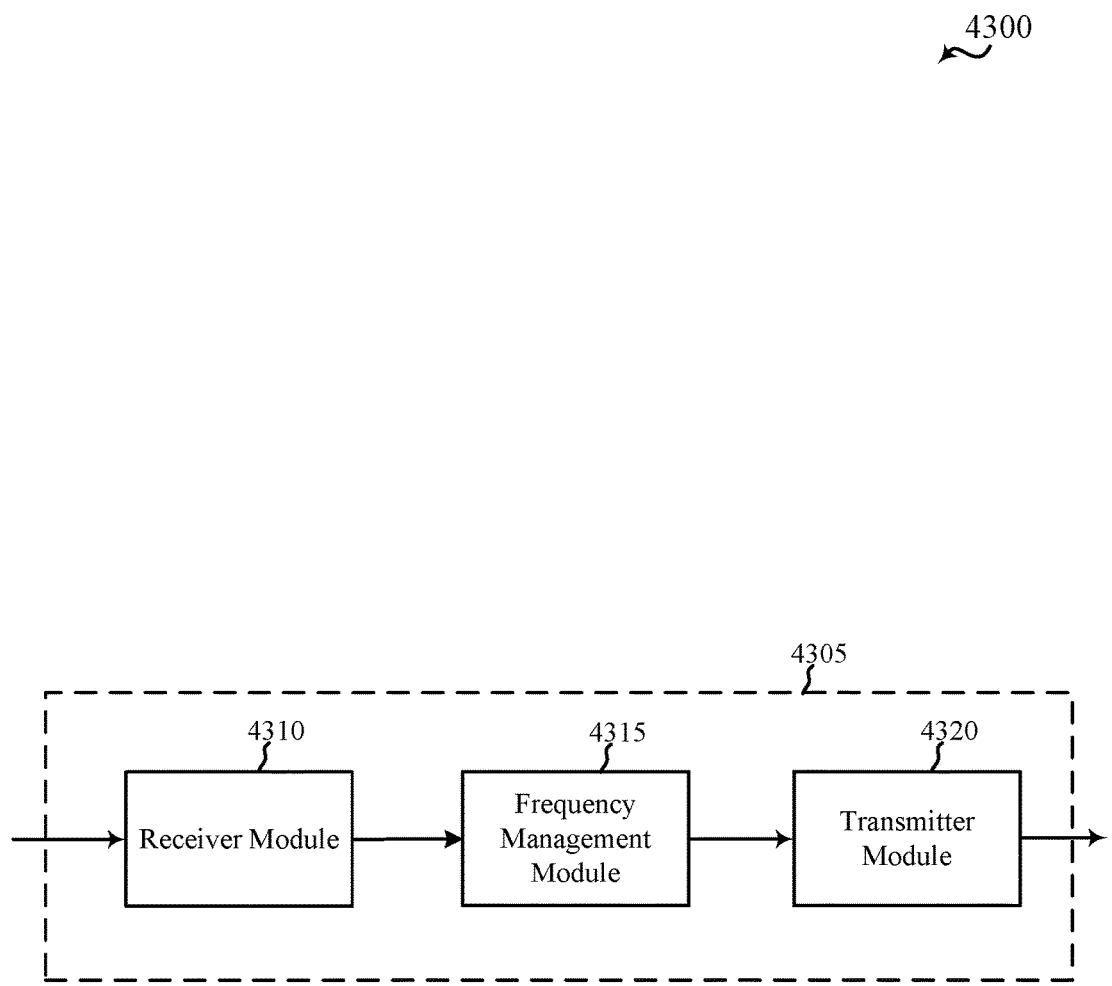
FIG. 43 is a block diagram of an illustrative device for use in wireless communication in a network including a plurality of devices configured to communicate data over an unlicensed spectrum, in accordance with various aspects of the present disclosure.

FIG. 43 shows a block diagram 4300 of a device 4305 for use in wireless communication in a network including a plurality of device configured to communicate data over an unlicensed spectrum, in accordance with various aspects of the present disclosure. In some examples, the device 4305 may be an example of one or more aspects of one of the base stations 105 or 205 described with reference to FIG. 1, 2A, or 2B. The device 4305 may also be a processor. The device 4305 may include a receiver module 4310, a frequency management module 4315, and a transmitter module 4320. Each of these components may be in communication with each other.

The components of the device 4305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 4310 may be or include a radio frequency (RF) receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The receiver module 4310 may be used to receive various types of data or control signals (i.e., transmissions) over one or more communication links of a wireless communications system including the first and second spectrums, such as one or more communication links of the wireless communications system 100, 200, or 250 described with reference to FIG. 1, 2A, or 2B.

In some examples, the transmitter module 4320 may be or include an RF transmitter, such as an RF transmitter operable to transmit in the first spectrum or the second spectrum. The transmitter module 4320 may be used to transmit various types of data or control signals (i.e., transmissions) over one or more communication links of the wireless communications system including the first spectrum and the second spectrum.

In some examples, the frequency management module 4315 may receive frequency information from at least one neighboring device (e.g., at least one neighboring base station) over an unlicensed spectrum. The frequency management module 4315 may use the received frequency information to iteratively adjust the frequency of the device 4305.

Figure 44:
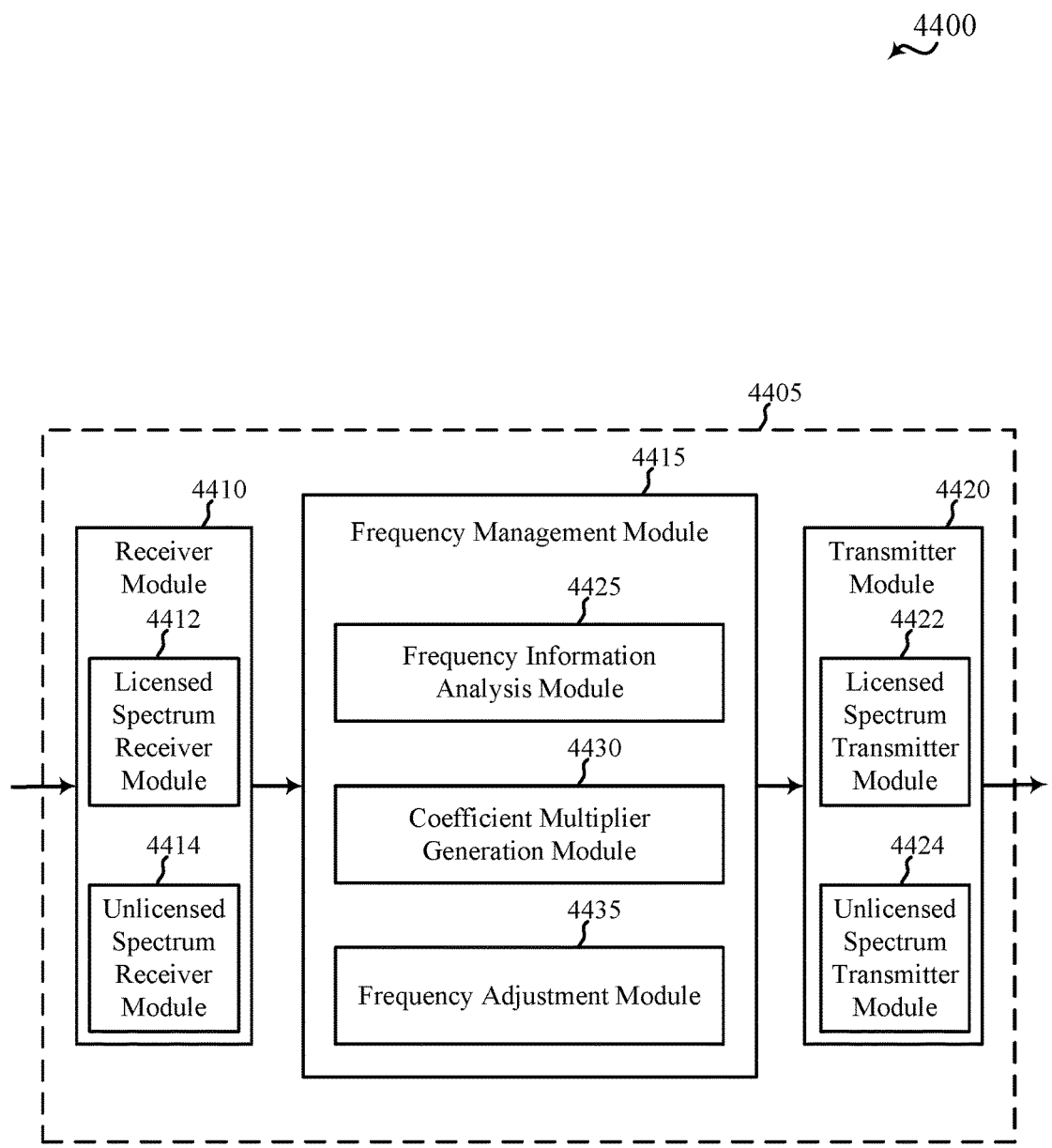
FIG. 44 is a block diagram of an illustrative device for use in wireless communication in a network including a plurality of devices configured to communicate data over an unlicensed spectrum, in accordance with various aspects of the present disclosure.

FIG. 44 shows a block diagram 4400 of a device 4405 for use in wireless communication in a network including a plurality of device configured to communicate data over an unlicensed spectrum, in accordance with various aspects of the present disclosure. In some examples, the device 4405 may be an example of one or more aspects of one of the base stations 105 or 205 described with reference to FIG. 1 or 2, or the device 4305 described with reference to FIG. 43. The device 4405 may also be a processor. The device 4405 may include a receiver module 4410, a frequency management module 4415, and a transmitter module 4420. Each of these components may be in communication with each other.

The components of the device 4405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 4410 may be or include an RF receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The RF receiver may include separate receivers for the first spectrum and the second spectrum. The separate receivers may in some cases take the form of a licensed spectrum receiver module 4412 for communicating over the first spectrum, and an unlicensed spectrum receiver module 4414 for communicating over the second spectrum. The receiver module 4410, including the licensed spectrum receiver module 4412 or the unlicensed spectrum receiver module 4414, may be used to receive various types of data or control signals (i.e., transmissions) over one or more communication links of a wireless communications system including the licensed and unlicensed spectrums, such as one or more communication links of the wireless communications system 100, 200, or 250 described with reference to FIG. 1, 2A, or 2B.

In some examples, the transmitter module 4420 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 4422 for communicating over the first spectrum, and an unlicensed spectrum transmitter module 4424 for communicating over the second spectrum. The transmitter module 4420, including the licensed spectrum transmitter module 4422 or the unlicensed spectrum transmitter module 4424, may be used to transmit various types of data or control signals (i.e., transmissions) over one or more communication links of the wireless communications system including the licensed spectrum and the unlicensed spectrum.

In some examples, the frequency management module 4415 may be an example of one or more aspects of the frequency management module 4315 described with reference to FIG. 43 and may include a frequency information analysis module 4425, a coefficient multiplier generation module 4430, or a frequency adjustment module 4435.

In some examples, the frequency information analysis module 4425 may be used to receive frequency information from at least one neighboring device (e.g., at least one neighboring base station) of the network. In some cases, the frequency information may be received from the at least one neighboring device of the network during a periodic CET, such as one of the CETs described with reference to FIG. 7, 8, 9, 10, 13, 14, 15, 16, 17, 18, 22, 23, 24, 25, 26, 27, 29, 30, 31, or 32. In other cases, the frequency information may be received from the at least one neighboring device of the network during a periodic frame associated with time synchronization, such as one of the CCAs described with reference to FIG. 11, 12, 13, 19, 20, 21, 28, 34, 35, or 36.

In some examples, the coefficient multiplier generation module 4430 may be used to generate a plurality of coefficient multipliers including a separate coefficient multiplier for the device 4405 and each of the at least one neighboring device. The coefficient multipliers may be based at least in part on a quantity of the at least one neighboring device. The plurality of coefficient multipliers may define a stochastic matrix.

In some examples, the coefficient multipliers may be held constant for a plurality (i.e., two or more) of recursive iterations through the operations of the frequency information analysis module 4425, the coefficient multiplier generation module 4430, or the frequency adjustment module 4435. Holding the coefficient multipliers through multiple recursive iterations can increase the stability of frequency adjustments and frequency convergence (e.g., frequency convergence among the device 4405 and the at least one neighboring device).

In some examples, the frequency adjustment module 4435 may adjust a frequency of the device 4405 based on the received frequency information and the coefficient multipliers. The frequency adjustment may include synchronizing a frequency of the device 4405 to a frequency of an unlicensed network over which the device 4405 and the at least one neighboring device communicate.

Figure 45:
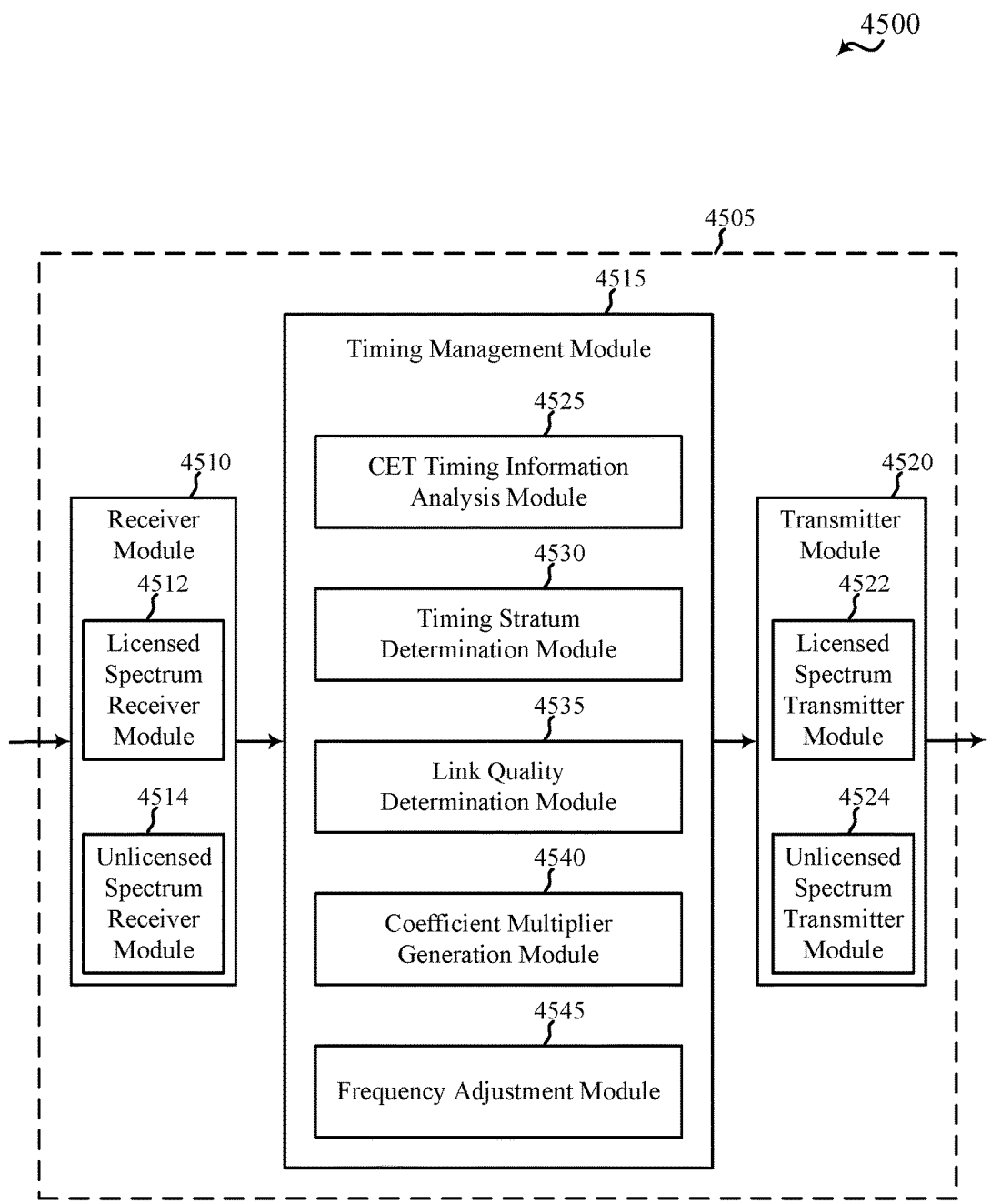
FIG. 45 is a block diagram of an illustrative device for use in wireless communication in a network including a plurality of devices configured to communicate data over an unlicensed spectrum, in accordance with various aspects of the present disclosure.

FIG. 45 shows a block diagram 4500 of a device 4505 for use in wireless communication in a network including a plurality of device configured to communicate data over an unlicensed spectrum, in accordance with various aspects of the present disclosure. In some examples, the device 4505 may be an example of one or more aspects of one of the base stations 105 or 205 described with reference to FIG. 1 or 2, or the device 4305 described with reference to FIG. 43. The device 4505 may also be a processor. The device 4505 may include a receiver module 4510, a frequency management module 4515, and a transmitter module 4520. Each of these components may be in communication with each other.

The components of the device 4505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 4510 may be or include an RF receiver, such as an RF receiver operable to receive transmissions in a first spectrum (e.g., a licensed LTE spectrum) or a second spectrum (e.g., a "shared spectrum" used by devices operating under different transmission protocols, such as an unlicensed spectrum). The RF receiver may include separate receivers for the first spectrum and the second spectrum. The separate receivers may in some cases take the form of a licensed spectrum receiver module 4512 for communicating over the first spectrum, and an unlicensed spectrum receiver module 4514 for communicating over the second spectrum. The receiver module 4510, including the licensed spectrum receiver module 4512 or the unlicensed spectrum receiver module 4514, may be used to receive various types of data or control signals (i.e., transmissions) over one or more communication links of a wireless communications system including the licensed and unlicensed spectrums, such as one or more communication links of the wireless communications system 100, 200, or 250 described with reference to FIG. 1, 2A, or 2B.

In some examples, the transmitter module 4520 may be or include an RF transmitter, such as an RF transmitter operable to transmit in the first spectrum or the second spectrum. The RF transmitter may include separate transmitters for the first spectrum and the second spectrum. The separate transmitters may in some cases take the form of a licensed spectrum transmitter module 4522 for communicating over the first spectrum, and an unlicensed spectrum transmitter module 4524 for communicating over the second spectrum. The transmitter module 4520, including the licensed spectrum transmitter module 4522 or the unlicensed spectrum transmitter module 4524, may be used to transmit various types of data or control signals (i.e., transmissions) over one or more communication links of the wireless communications system including the licensed spectrum and the unlicensed spectrum.

In some examples, the frequency management module 4515 may be an example of one or more aspects of the frequency management module 4315 or 4415 described with reference to FIG. 43 or 44 and may include a frequency information analysis module 4525, a timing stratum determination module 4530, a link quality determination module 4335, a coefficient multiplier generation module 4540, or a frequency adjustment module 4545.

In some examples, the frequency information analysis module 4525 may be used to receive frequency information from at least one neighboring device (e.g., at least one neighboring base station) of the network. In some cases, the frequency information may be received from the at least one neighboring device of the network during a periodic CET, such as one of the CETs described with reference to FIG. 7, 8, 9, 10, 13, 14, 15, 16, 17, 18, 22, 23, 24, 25, 26, 27, 29, 30, 31, or 32. In other cases, the frequency information may be received from the at least one neighboring device of the network during a periodic frame associated with time synchronization, such as one of the CCAs described with reference to FIG. 11, 12, 13, 19, 20, 21, 28, 34, 35, or 36.

In some examples, the timing stratum determination module 4530 may be used to determine a timing stratum of each of the at least one neighboring device. By way of example, the timing stratum may be determined from the received frequency information or from information received in one or more messages over the unlicensed spectrum or another spectrum (e.g., an LTE spectrum).

In some examples, the link quality determination module 4535 may be used to a determine a link quality of each of the at least one neighboring device. By way of example, the link quality may be determined from the received frequency information.

In some examples, the coefficient multiplier generation module 4540 may be used to generate a plurality of coefficient multipliers including a separate coefficient multiplier for the device 4505 and each of the at least one neighboring device. The coefficient multipliers may be based at least in part on a quantity of the at least one neighboring device. The coefficient multiplier generated for each of the at least one neighboring base station may be further based on the timing stratum associated with that neighboring base station (e.g., to give higher weight to a base station associated with a lower stratum, such as a GPS source (which in some cases may be assigned a coefficient multiplier of one)). The coefficient multiplier generated for each of the at least one neighboring base station may be further based on the link quality associated with that neighboring base station (e.g., to give higher weight to better link qualities). The plurality of coefficient multipliers may define a stochastic matrix.

In some examples, the coefficient multipliers may be held constant for a plurality (i.e., two or more) of recursive iterations through the operations of the frequency information analysis module 4525, the timing stratum determination module 4530, the link quality determination module 4535, the coefficient multiplier generation module 4540, or the frequency adjustment module 4545. Holding the coefficient multipliers through multiple recursive iterations can increase the stability of frequency adjustments and frequency convergence (e.g., frequency convergence among the device 4505 and the at least one neighboring device).

In some examples, the frequency adjustment module 4545 may adjust a frequency of the device 4505 based on the received frequency information and the coefficient multipliers. The frequency adjustment may include synchronizing a frequency of the device 4505 to a frequency of an unlicensed network over which the device 4505 and the at least one neighboring device communicate.

Figure 46:
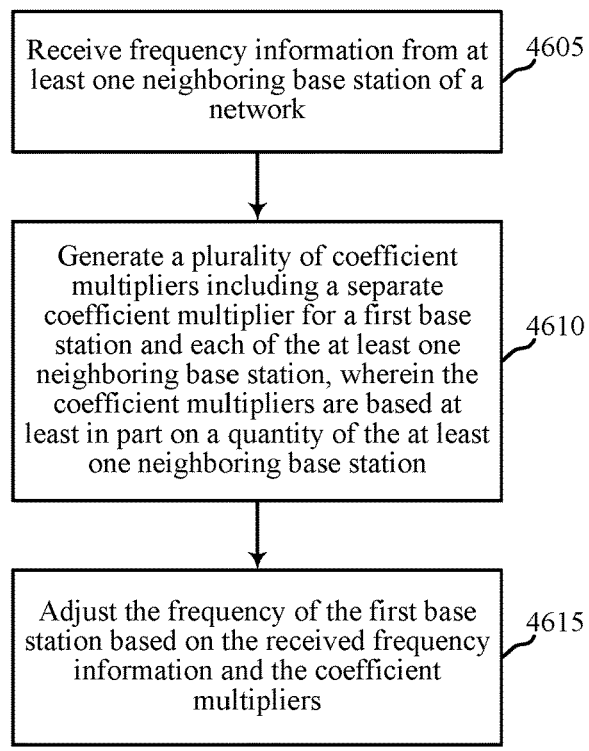
FIG. 46 is a flow chart of an illustrative method of wireless communication in a network including a plurality of base stations configured to communicate data over an unlicensed spectrum, in accordance with various aspects of the present disclosure.

FIG. 46 is a flow chart illustrating an example of a method 4600 of wireless communication in a network including a plurality of base stations configured to communicate data over an unlicensed spectrum, in accordance with various aspects of the present disclosure. For clarity, the method 4600 is described below with reference to aspects of one or more of the base stations 105 or 205 described with reference to FIG. 1, 2A, or 2B, or one of the devices 4305, 4405, or 4505 described with reference to FIG. 43, 44, or 45. In some examples, a base station or device such as one of the base stations 105 or 205 or one of the devices 4305, 4405, or 4505 may execute one or more sets of codes to control the functional elements of the device to perform the functions described below.

The blocks 4605, 4610, and 4615 illustrated in FIG. 46 provide an example set of operations to be performed in a plurality of recursive iterations to synchronize a frequency of at least a first base station in a network (which in some cases may be a network having properties of one or more of the networks described with reference to FIGS. 37-42.

At block 4605, frequency information may be received from at least one neighboring base station of the network. In some cases, the frequency information may be received from the at least one neighboring base station of the network during a periodic CET, such as one of the CETs described with reference to FIG. 7, 8, 9, 10, 13, 14, 15, 16, 17, 18, 22, 23, 24, 25, 26, 27, 29, 30, 31, or 32. In other cases, the frequency information may be received from the at least one neighboring base station of the network during a periodic frame associated with time synchronization, such as one of the CCAs described with reference to FIG. 11, 12, 13, 19, 20, 21, 28, 34, 35, or 36.

The operation(s) at block 4605 may be performed by the frequency management module 4315, 4415, or 4515 described with reference to FIG. 43, 44, or 45, or the frequency information analysis module 4425 or 4525 described with reference to FIG. 44 or 45.

At block 4610, a plurality of coefficient multipliers including a separate coefficient multiplier for the first base station and each of the at least one neighboring base station are generated. The coefficient multipliers may be based at least in part on a quantity of the at least one neighboring base station. The plurality of coefficient multipliers may define a stochastic matrix. The operation(s) at block 4610 may be performed by the frequency management module 4315, 4415, or 4515 described with reference to FIG. 43, 44, or 45, or the coefficient multiplier generation module 4430 or 4540 described with reference to FIG. 44 or 45.

At block 4615, the frequency of the first base station may be adjusted based on the received frequency information and the coefficient multipliers. The operation(s) at block 4615 may be performed by the frequency management module 4315, 4415, or 4515 described with reference to FIG. 43, 44, or 45, or the frequency adjustment module 4435 or 4545 described with reference to FIG. 44 or 45.

In some examples, the coefficient multipliers may be held constant for a plurality (i.e., two or more) of the recursive iterations through blocks 4605, 4610, and 4615. Holding the coefficient multipliers through multiple iterations can increase the stability of frequency adjustments and frequency convergence (e.g., frequency convergence among multiple base stations).

Thus, the method 4600 may provide for wireless communication. It should be noted that the method 4600 is just one implementation and that the operations of the method 4600 may be rearranged or otherwise modified such that other implementations are possible.

Figure 47:
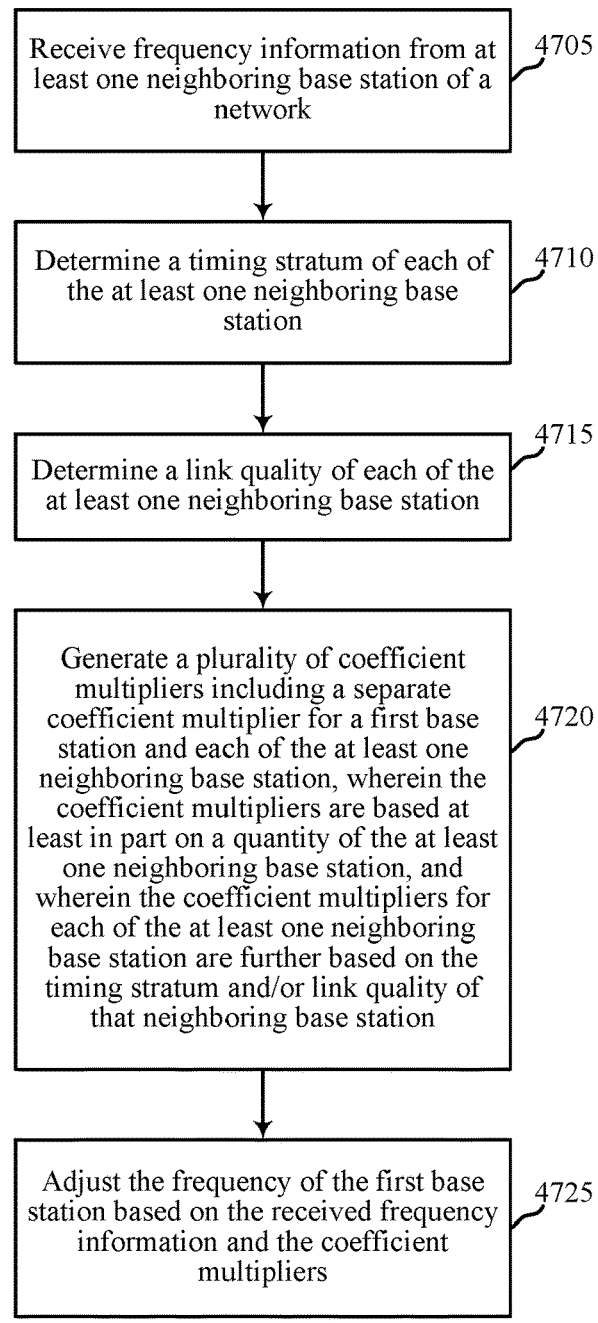
FIG. 47 is a flow chart of an illustrative method of wireless communication in a network including a plurality of base stations configured to communicate data over an unlicensed spectrum, in accordance with various aspects of the present disclosure.

FIG. 47 is a flow chart illustrating an example of a method 4700 of wireless communication in a network including a plurality of base stations configured to communicate data over an unlicensed spectrum, in accordance with various aspects of the present disclosure. For clarity, the method 4700 is described below with reference to aspects of one or more of the base stations 105 or 205 described with reference to FIG. 1, 2A, or 2B, or one of the devices 4305, 4405, or 4505 described with reference to FIG. 43, 44, or 45. In some examples, a base station or device such as one of the base stations 105 or 205 or one of the devices 4305, 4405, or 4505 may execute one or more sets of codes to control the functional elements of the device to perform the functions described below.

The blocks 4705, 4710, 4715, 4720, and 4725 illustrated in FIG. 47 provide an example set of operations to be performed in a plurality of recursive iterations to synchronize a frequency of at least a first base station in a network (which in some cases may be a network having properties of one or more of the networks described with reference to FIGS. 37-42.

At block 4705, frequency information may be received from at least one neighboring base station of the network. In some cases, the frequency information may be received from the at least one neighboring base station of the network during a periodic CET, such as one of the CETs described with reference to FIG. 7, 8, 9, 10, 13, 14, 15, 16, 17, 18, 22, 23, 24, 25, 26, 27, 29, 30, 31, or 32. In other cases, the frequency information may be received from the at least one neighboring base station of the network during a periodic frame associated with time synchronization, such as one of the CCAs described with reference to FIG. 11, 12, 13, 19, 20, 21, 28, 34, 35, or 36.

The operation(s) at block 4705 may be performed by the frequency management module 4315, 4415, or 4515 described with reference to FIG. 43, 44, or 45, or the frequency information analysis module 4425 or 4525 described with reference to FIG. 44 or 45.

At block 4710, a timing stratum of each of the at least one neighboring base stations may be determined. By way of example, the timing stratum may be determined from the received frequency information or from information received in one or more messages over the unlicensed spectrum or another spectrum (e.g., an LTE spectrum). The operation(s) at block 4710 may be performed by the frequency management module 4315, 4415, or 4515 described with reference to FIG. 43, 44, or 45, or the timing stratum determination module 4530 described with reference to FIG. 45.

At block 4715, a link quality of each of the at least one neighboring base stations may be determined. By way of example, the link quality may be determined from the received frequency information. The operation(s) at block 4715 may be performed by the frequency management module 4315, 4415, or 4515 described with reference to FIG. 43, 44, or 45, or the link quality determination module 4535 described with reference to FIG. 45.

At block 4720, a plurality of coefficient multipliers including a separate coefficient multiplier for the first base station and each of the at least one neighboring base station are generated. The coefficient multipliers may be based at least in part on a quantity of the at least one neighboring base station. The coefficient multiplier generated for each of the at least one neighboring base station may be further based on the timing stratum associated with that neighboring base station (e.g., to give higher weight to a base station associated with a lower stratum, such as a GPS source (which in some cases may be assigned a coefficient multiplier of one)). The coefficient multiplier generated for each of the at least one neighboring base station may be further based on the link quality associated with that neighboring base station (e.g., to give higher weight to better link qualities). The plurality of coefficient multipliers may define a stochastic matrix. The operation(s) at block 4720 may be performed by the frequency management module 4315, 4415, or 4515 described with reference to FIG. 43, 44, or 45, or the coefficient multiplier generation module 4430 or 4540 described with reference to FIG. 44 or 45.

At block 4725, the frequency of the first base station may be adjusted based on the received frequency information and the coefficient multipliers. The operation(s) at block 4725 may be performed by the frequency management module 4315, 4415, or 4515 described with reference to FIG. 43, 44, or 45, or the frequency adjustment module 4435 or 4545 described with reference to FIG. 44 or 45.

In some examples, the coefficient multipliers may be held constant for a plurality (i.e., two or more) of the recursive iterations through blocks 4705, 4710, 4715, 4720, and 4725. Holding the coefficient multipliers through multiple iterations can increase the stability of frequency adjustments and frequency convergence (e.g., frequency convergence among multiple base stations).

Thus, the method 4700 may provide for wireless communication. It should be noted that the method 4700 is just one implementation and that the operations of the method 4700 may be rearranged or otherwise modified such that other implementations are possible.

In some cases, one or more aspects of the method 4600 and the method 4700 may be combined. One or more aspects of the method 4600 or 4700 may also be combined with one or more aspects of the method 2900, 3000, 3100, 3200, 3300, 3400, 3500, or 3600 described in FIG. 29, 30, 31, 32, 33, 34, 35, or 36.

Figure 48:
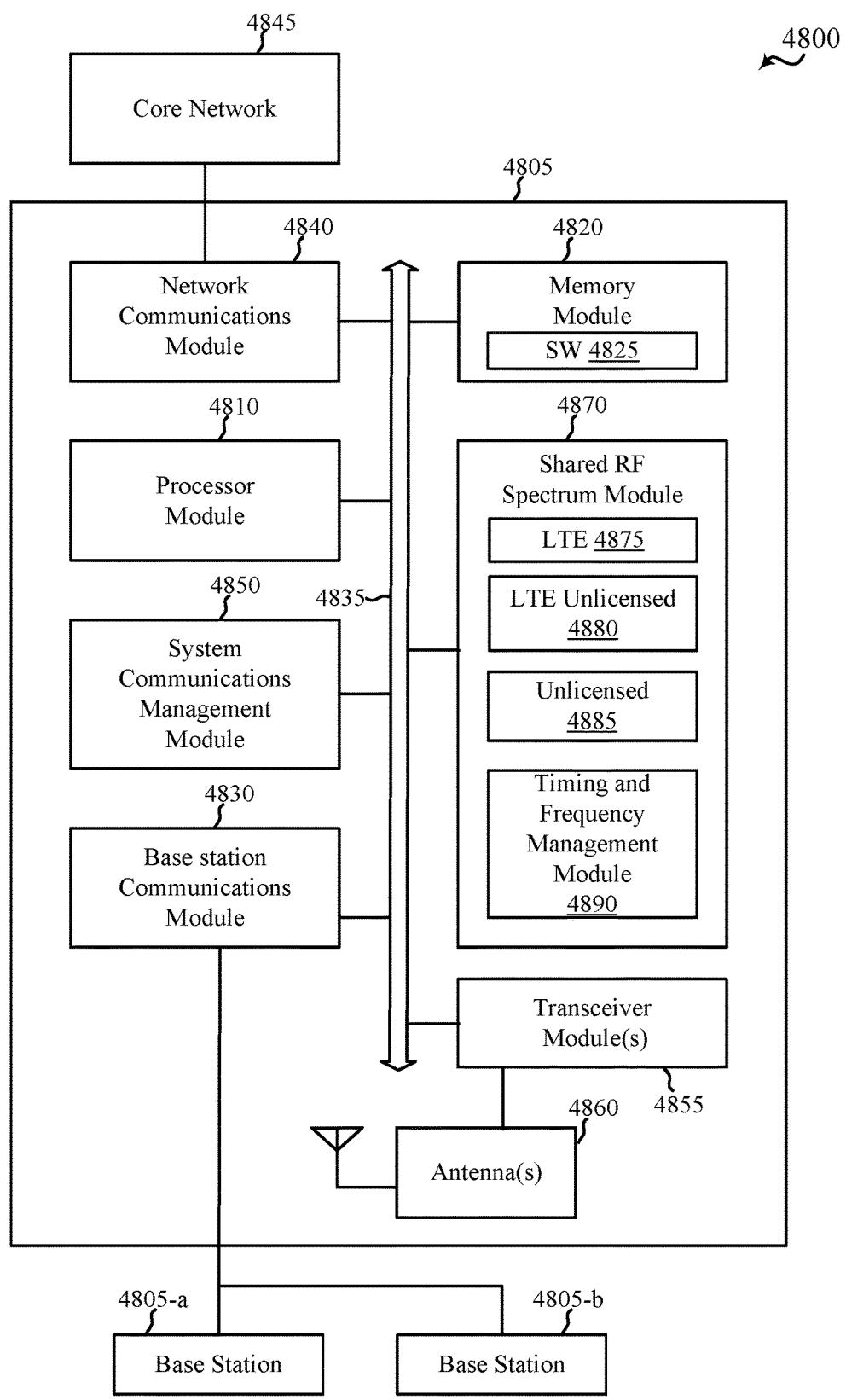
FIG. 48 shows a block diagram illustrating a base station configured for wireless communication, in accordance with various aspects of the present disclosure.

FIG. 48 shows a block diagram 4800 illustrating a base station 4805 configured for wireless communication, in accordance with various aspects of the present disclosure. In some examples, the base station 4805 may be an example of one or more aspects of one of the base stations 105 or 205 described with reference to FIG. 1, 2A, or 2B, or one of the devices 1305, 1405, 1505, 1605, 1705, 1805, 1905, 2005, 2105, 4305, 4405, or 4505 described with reference to FIG. 13, 14,15, 16, 17, 18, 19, 20, 21, 43, 44, or 45. The base station 4805 may be configured to implement at least some of the features and functions described herein relating to timing adjustments, frequency adjustments, or wireless communication. The base station 4805 may include a processor module 4810, a memory module 4820, at least one transceiver module (represented by transceiver module(s) 4855), at least one antenna (represented by antenna(s) 4860), and a shared RF spectrum module 4870. The base station 4805 may also include one or more of a base station communications module 4830, a network communications module 4840, and a system communications management module 4850. Each of these components may be in communication with each other, directly or indirectly, over one or more buses 4835.

The memory module 4820 may include random access memory (RAM) or read-only memory (ROM). The memory module 4820 may store computer-readable, computer-executable software (SW) code 4825 containing instructions that are configured to, when executed, cause the processor module 4810 to perform various functions described herein for communicating over a first radio frequency spectrum (e.g., an LTE/LTE-A or licensed radio frequency spectrum) or a second radio frequency spectrum (e.g., a "shared spectrum" such as an unlicensed radio frequency spectrum), and for transmitting and receiving timing or frequency information and making timing or frequency adjustments for wireless communication over the second radio frequency spectrum. Alternatively, the software code 4825 may not be directly executable by the processor module 4810 but be configured to cause the base station 4805 (e.g., when compiled and executed) to perform various of the functions described herein.

The processor module 4810 may include an intelligent hardware device, e.g., a central processing unit (CPU), a microcontroller, an ASIC, etc. The processor module 4810 may process information received through the transceiver module(s) 4855, the base station communications module 4830, or the network communications module 4840. The processor module 4810 may also process information to be sent to the transceiver module(s) 4855 for transmission through the antenna(s) 4860, to the base station communications module 4830 for transmission to one or more other base stations 4805-a and 4805-b (e.g., eNBs), or to the network communications module 4840 for transmission to a core network 4845, which may be an example of aspects of the core network 130 described with reference to FIG. 1. The processor module 4810 may handle, alone or in connection with the shared RF spectrum module 4870, various aspects of communicating over the first radio frequency spectrum or the second radio frequency spectrum, including aspects of transmitting and receiving timing or frequency information and making timing or frequency adjustments for wireless communication over the second radio frequency spectrum.

The transceiver module(s) 4855 may include a modem configured to modulate packets and provide the modulated packets to the antenna(s) 4860 for transmission, and to demodulate packets received from the antenna(s) 4860. The transceiver module(s) 4855 may in some cases be implemented as one or more transmitter modules and one or more separate receiver modules. The transceiver module(s) 4855 may support communications in the first radio frequency spectrum or the second radio frequency spectrum. The transceiver module(s) 4855 may be configured to communicate bi-directionally, via the antenna(s) 4860, with one or more of the UEs 115 or 215 described with reference to FIG. 1, 2A, or 2B, for example. The base station 4805 may typically include multiple antennas 4860 (e.g., an antenna array). The base station 4805 may communicate with the core network 4845 through the network communications module 4840. The base station 4805 may also communicate with other base stations, such as the base stations 4805-a and 4805-b, using the base station communications module 4830. In some cases, the base station 4805 may communicate with the other base stations 4805-a and 4805-b for the purpose of exchanging timing or frequency information and making timing or frequency adjustments for wireless communication over the second radio frequency spectrum.

According to the architecture of FIG. 48, the system communications management module 4850 may manage communications with other base stations, eNBs, or devices. In some cases, functionality of the system communications management module 4850 may be implemented as a component of the transceiver module(s) 4855, as a computer program product, or as one or more controller elements of the processor module 4810.

The shared RF spectrum module 4870 may be configured to perform or control some or all of the features or functions described with reference to any or all of FIGS. 1, 2A, 2B, and 3-47 related to wireless communication in a first radio frequency spectrum or a second radio frequency spectrum, including the exchange of timing or frequency information and the making of timing or frequency adjustments for wireless communication over the second radio frequency spectrum. In some cases, the shared RF spectrum module 4870 may be configured to support a supplemental downlink mode, a carrier aggregation mode, or a standalone mode of operation in the second radio frequency spectrum. The shared RF spectrum module 4870 may include an LTE module 4875 configured to handle LTE/LTE-A communications in licensed spectrum, an LTE unlicensed module 4880 configured to handle LTE/LTE-A communications in unlicensed spectrum, or an unlicensed module 4885 configured to handle communications other than LTE/LTE-A in an unlicensed spectrum. The shared RF spectrum module 4870 may also include a timing and frequency management module 4890. The timing and frequency management module 4890 may be an example of one or more aspects of the timing management module 1315, 1415, 1515, 1615, 1715, 1815, 1915, 2015, or 2115 described with reference to FIG. 13, 14, 15, 16, 17, 18, 19, 20, or 21, or the frequency management module 4315, 4415, or 4515 described with reference to FIG. 43, 44, or 45. The shared RF spectrum module 4870, or portions of it, may include a processor, or some or all of the functionality of the shared RF spectrum module 4870 may be performed by the processor module 4810 or in connection with the processor module 4810.

The detailed description set forth above in connection with the appended drawings describes exemplary embodiments and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
   receiving, at a first base station, at least one clear channel assessment (CCA)-exempt transmission (CET) indicating timing information of at least a second base station over a shared spectrum, wherein each of the at least one CETs is received in one of a plurality of operator-specific portions of a CET period, each of the operator-specific portions is assigned to one of a plurality of operators in the shared spectrum, and the plurality of operators comprises an operator associated with the second base station; and
   adjusting a timing of the first base station based on the received timing information of at least the second base station.

2. The method of claim 1, wherein each of the plurality of operators is a public land mobile network (PLMN) such that each of the at least one CETs is received in one of a plurality of PLMN-specific portions of the CET period, each of the PLMN-specific portions is assigned to one of a plurality of PLMNs, and the plurality of PLMNs comprises a PLMN associated with the second base station.

3. The method of claim 2, further comprising:
   identifying one of the PLMN-specific portions associated with the PLMN of the second base station,
   wherein receiving the at least one CET comprises listening to the identified PLMN-specific portion associated with the PLMN of the second base station for the timing information of the second base station.

4. The method of claim 1, wherein the first base station and the second base station are members of different PLMNs associated with different operators and the PLMNs are time synchronized with each other.

5. The method of claim 1, wherein the at least one CET is received during a CET period of a plurality of periodically scheduled CET periods, and wherein each of the plurality of periodically scheduled CET periods comprises a plurality of PLMN-specific regions and a common transmission region.

6. The method of claim 5, wherein common transmission regions of different CET periods are assigned to different PLMNs on a rotating basis, the different PLMNs comprising a PLMN associated with the second base station.

7. The method of claim 1, wherein the at least one CET includes a first CET indicating the timing information of the second base station over the shared spectrum and a second CET indicating timing information of a third base station over the shared spectrum; and wherein the first CET and the second CET are received concurrently.

8. The method of claim 1, wherein the at least one CET further indicates timing information of a third base station over the shared spectrum, the method further comprising:
adjusting the timing of the first base station based on the timing information of the third base station.

9. An apparatus for wireless communication, comprising:
a processor; and
memory coupled to the processor, wherein the processor is configured to:
receive, at a first base station, at least one clear channel assessment (CCA)-exempt transmission (CET) indicating timing information of at least a second base station over a shared spectrum, wherein each of the at least one CETs is received in one of a plurality of operator-specific portions of a CET period, each of the operator-specific portions is assigned to one of a plurality of operators in the shared spectrum, and the plurality of operators comprises an operator associated with the second base station; and
adjust a timing of the first base station based on the received timing information of at least the second base station.

10. The apparatus of claim 9, wherein each of the plurality of operators is a public land mobile network (PLMN) such that each of the at least one CETs is received in one of a plurality of PLMN-specific portions of the CET period, each of the PLMN-specific portions is assigned to one of a plurality of PLMNs, and the plurality of PLMNs comprises a PLMN associated with the second base station.

11. The apparatus of claim 10, wherein the processor is further configured to:
identify one of the PLMN-specific portions associated with the PLMN of the second base station;
wherein receiving the at least one CET comprises listening to the identified PLMN-specific portion associated with the PLMN of the second base station for the timing information of the second base station.

12. The apparatus of claim 9, wherein the first base station and the second base station are members of different PLMNs associated with different operators and the PLMNs are time synchronized with each other.

13. The apparatus of claim 9, wherein the at least one CET is received during a CET period of a plurality of periodically scheduled CET periods, and wherein each of the plurality of periodically scheduled CET periods comprises a plurality of PLMN-specific regions and a common transmission region.

14. The apparatus of claim 13, wherein common transmission regions of different CET periods are assigned to different PLMNs on a rotating basis, the different PLMNs comprising a PLMN associated with the second base station.

15. The apparatus of claim 9, wherein the at least one CET includes a first CET indicating the timing information of the second base station over the shared spectrum and a second CET indicating timing information of a third base station over the shared spectrum; and wherein the first CET and the second CET are received concurrently.

16. The apparatus of claim 9, wherein the at least one CET further indicates timing information of a third base station over the shared spectrum, the processor is further configured to:
adjust the timing of the first base station based on the timing information of the third base station.

17. An apparatus for wireless communication, comprising:
means for receiving, at a first base station, at least one clear channel assessment (CCA)-exempt transmission (CET) indicating timing information of at least a second base station over a shared spectrum, wherein each of the at least one CETs is received in one of a plurality of operator-specific portions of a CET period, each of the operator-specific portions is assigned to one of a plurality of operators in the shared spectrum, and the plurality of operators comprises an operator associated with the second base station; and
means for adjusting a timing of the first base station based on the received timing information of at least the second base station.

18. The apparatus of claim 17, wherein each of the plurality of operators is a public land mobile network (PLMN) such that each of the at least one CETs is received in one of a plurality of PLMN-specific portions of the CET period, each of the PLMN-specific portions is assigned to one of a plurality of PLMNs, and the plurality of PLMNs comprises a PLMN associated with the second base station.

19. The apparatus of claim 18, further comprising:
means for identifying one of the PLMN-specific portions associated with the PLMN of the second base station, wherein receiving the at least one CET comprises listening to the identified PLMN-specific portion associated with the PLMN of the second base station for the timing information of the second base station.

20. The apparatus of claim 17, wherein the first base station and the second base station are members of different PLMNs associated with different operators and the PLMNs are time synchronized with each other.

21. The apparatus of claim 17, wherein the at least one CET is received during a CET period of a plurality of periodically scheduled CET periods, and wherein each of the plurality of periodically scheduled CET periods comprises a plurality of PLMN-specific regions and a common transmission region.

22. The apparatus of claim 21, wherein common transmission regions of different CET periods are assigned to different PLMNs on a rotating basis, the different PLMNs comprising a PLMN associated with the second base station.

23. The apparatus of claim 17, wherein the at least one CET includes a first CET indicating the timing information of the second base station over the shared spectrum and a second CET indicating timing information of a third base station over the shared spectrum; and wherein the first CET and the second CET are received concurrently.

24. The apparatus of claim 17, wherein the at least one CET further indicates timing information of a third base station over the shared spectrum, the apparatus further comprising:
means for adjusting the timing of the first base station based on the timing information of the third base station.

25. A non-transitory computer-readable medium storing code for wireless communication, the code comprising instructions executable by a processor to:

receive, at a first base station, at least one clear channel assessment (CCA)-exempt transmission (CET) indicating timing information of at least a second base station over a shared spectrum, wherein each of the at least one CETs is received in one of a plurality of operator-specific portions of a CET period, each of the operator-specific portions is assigned to one of a plurality of operators in the shared spectrum, and the plurality of operators comprises an operator associated with the second base station; and adjust a timing of the first base station based on the received timing information of at least the second base station.

26. The non-transitory computer-readable medium of claim 25, wherein each of the plurality of operators is a public land mobile network (PLMN) such that each of the at least one CETs is received in one of a plurality of PLMN-specific portions of the CET period, each of the PLMN-specific portions is assigned to one of a plurality of PLMNs, and the plurality of PLMNs comprises a PLMN associated with the second base station.

27. The non-transitory computer-readable medium of claim 26, wherein the instructions are further executable by the processor to:

identify one of the PLMN-specific portions associated with the PLMN of the second base station, wherein receiving the at least one CET comprises listening to the identified PLMN-specific portion associated with the PLMN of the second base station for the timing information of the second base station.

28. The non-transitory computer-readable medium of claim 25, wherein the first base station and the second base station are members of different PLMNs associated with different operators and the PLMNs are time synchronized with each other.

29. The non-transitory computer-readable medium of claim 25, wherein the at least one CET is received during a CET period of a plurality of periodically scheduled CET periods, and wherein each of the plurality of periodically scheduled CET periods comprises a plurality of PLMN-specific regions and a common transmission region.

30. The non-transitory computer-readable medium of claim 29, wherein common transmission regions of different CET periods are assigned to different PLMNs on a rotating basis, the different PLMNs comprising a PLMN associated with the second base station.

* * * * *